(12) United States Patent
Chayot et al.

(10) Patent No.: US 12,497,635 B2
(45) Date of Patent: Dec. 16, 2025

(54) MEANS AND METHODS FOR PRODUCING ISOBUTENE FROM ACETYL-CoA

(71) Applicant: GLOBAL BIOENERGIES, Evry (FR)

(72) Inventors: Romain Chayot, Paris (FR); Maria Anissimova, Nozay (FR); Florence Martin, Aix les Bains (FR); Florent Collas, Aachen (DE); Osama Mahmoud, Duesseldorf (DE)

( * ) Notice: Subject to any disclaimer, the term of this patent is extended or adjusted under 35 U.S.C. 154(b) by 958 days.

(21) Appl. No.: 17/440,561

(22) PCT Filed: Mar. 19, 2020

(86) PCT No.: PCT/EP2020/057607
§ 371 (c)(1),
(2) Date: Sep. 17, 2021

(87) PCT Pub. No.: WO2020/188033
PCT Pub. Date: Sep. 24, 2020

(65) Prior Publication Data
US 2022/0145336 A1    May 12, 2022

(30) Foreign Application Priority Data

Mar. 20, 2019 (EP) .................................... 19163981
Nov. 14, 2019 (EP) .................................... 19209153

(51) Int. Cl.
| | |
|---|---|
| *C12P 7/40* | (2006.01) |
| *C12N 9/00* | (2006.01) |
| *C12N 9/12* | (2006.01) |
| *C12N 9/88* | (2006.01) |
| *C12N 15/52* | (2006.01) |
| *C12P 5/02* | (2006.01) |

(52) U.S. Cl.
CPC .............. *C12P 7/40* (2013.01); *C12N 9/1205* (2013.01); *C12N 9/1241* (2013.01); *C12N 9/88* (2013.01); *C12N 9/93* (2013.01); *C12N 15/52* (2013.01); *C12P 5/026* (2013.01); *C12Y 203/01008* (2013.01); *C12Y 203/01019* (2013.01); *C12Y 203/0301* (2013.01); *C12Y 207/02001* (2013.01); *C12Y 207/02007* (2013.01); *C12Y 207/02014* (2013.01); *C12Y 207/02015* (2013.01); *C12Y 301/02028* (2013.01); *C12Y 401/01006* (2013.01); *C12Y 401/01033* (2013.01); *C12Y 401/01063* (2013.01); *C12Y 402/01017* (2013.01); *C12Y 402/01018* (2013.01); *C12Y 402/01055* (2013.01); *C12Y 604/01004* (2013.01); *C12Y 604/01005* (2013.01)

(58) Field of Classification Search
None
See application file for complete search history.

(56) References Cited

FOREIGN PATENT DOCUMENTS

| WO | WO 2013/007786 A1 | 1/2013 |
| WO | WO 2016/042012 A1 | 3/2016 |
| WO | WO 2017/085167 A2 | 5/2017 |

OTHER PUBLICATIONS

Singh et al. Curr Protein Pept Sci. 2017, 18, 1-11 (Year: 2017).*
Chica et al. Curr Opin Biotechnol. Aug. 2005;16(4):378-84. (Year: 2005).*
Augagneur et al. J Biol Chem. May 31, 2013;288(28):20558-20567 (Year: 2013).*

\* cited by examiner

*Primary Examiner* — Christian L Fronda
(74) *Attorney, Agent, or Firm* — PERDUE IP LAW, APC; Donna O. Perdue

(57) ABSTRACT

Described is a recombinant organism or microorganism which is capable of enzymatically converting acetyl-CoA into isobutene, (A) wherein in said organism or microorganism: (i) acetyl-CoA is enzymatically converted into acetoacetyl-CoA, (ii) acetoacetyl-CoA is enzymatically converted into 3-hydroxy-3-methylglutaryl-CoA, (iii) 3-hydroxy-3-methylglutaryl-CoA is enzymatically converted into 3-methylglutaconyl-CoA, (iv) 3-methylglutaconyl-CoA is enzymatically converted into 3-methylcrotonyl-CoA, and (v) wherein said 3-methylcrotonyl-CoA is converted into isobutene by: (a) enzymatically converting 3-methylcrotonyl-CoA into 3-methylcrotonic acid which is then further enzymatically converted into said isobutene; or (b) enzymatically converting 3-methylcrotonyl-CoA into 3-hydroxy-3-methylbutyryl-CoA which is then further enzymatically converted into 3-hydroxy-3-methylbutyric acid which is then further enzymatically converted into 3-phosphonoxy-3-methylbutyric acid which is then further enzymatically converted into said isobutene; (B) wherein said recombinant organism or microorganism has an increased pool of coenzyme A (CoA) over the organism or microorganism from which it is derived due to: (i) an increased uptake of pantothenate; and/or (ii) an increased conversion of pantothenate into CoA. Moreover, described is the use of such a recombinant organism or microorganism for the production of isobutene. Further, described is a method for the production of isobutene by culturing such a recombinant organism or microorganism in a suitable culture medium under suitable conditions.

Figure 1:
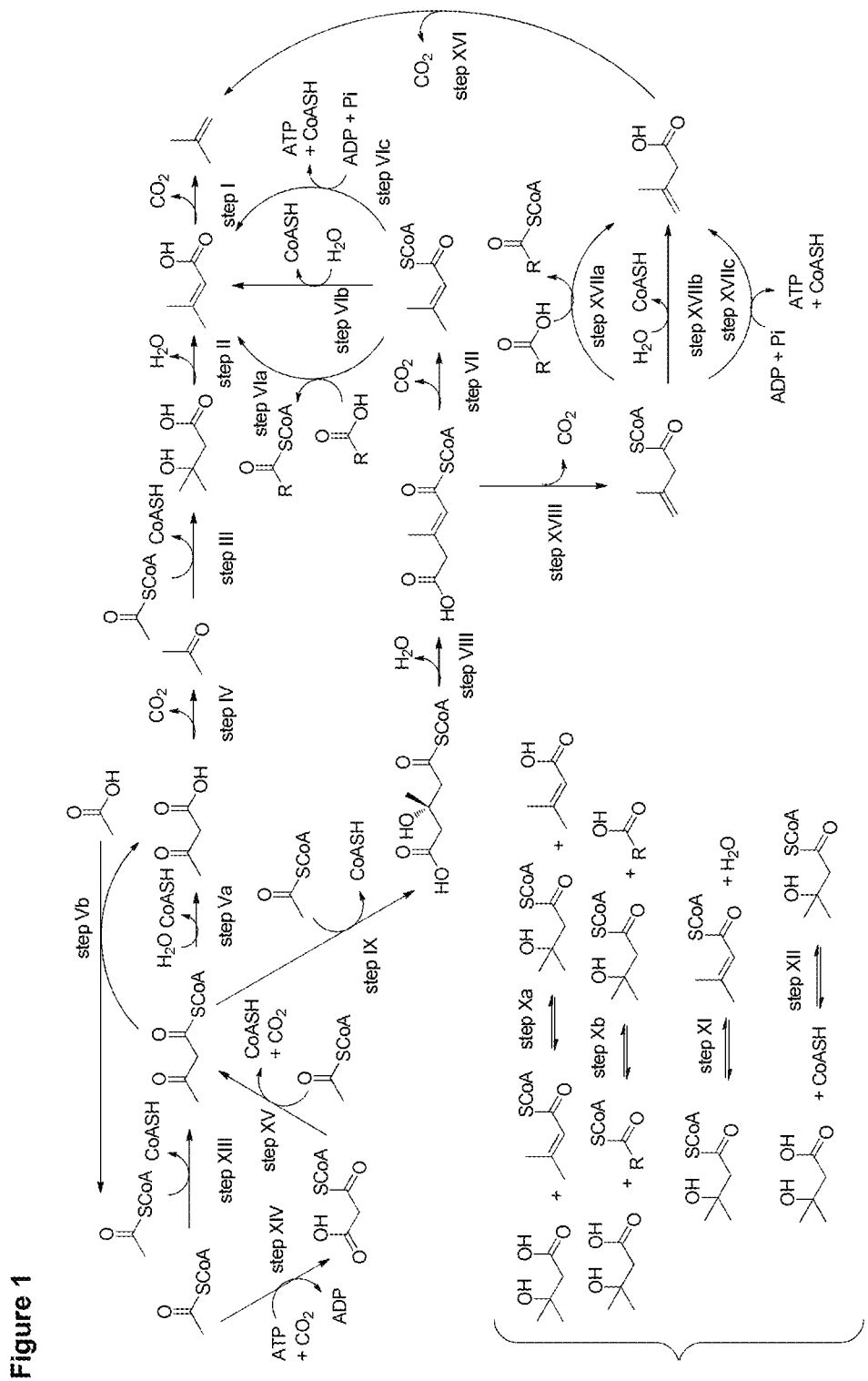

8 Claims, 10 Drawing Sheets
Specification includes a Sequence Listing.

SEQUENCE LISTING

```
<160> NUMBER OF SEQ ID NOS: 26

<210> SEQ ID NO 1
<211> LENGTH: 483
<212> TYPE: PRT
<213> ORGANISM: Escherichia coli
<220> FEATURE:
<223> OTHER INFORMATION: strain K12

<400> SEQUENCE: 1

Met Gln Leu Glu Val Ile Leu Pro Leu Val Ala Tyr Leu Val Val
1               5                   10                  15

Phe Gly Ile Ser Val Tyr Ala Met Arg Lys Arg Ser Thr Gly Thr Phe
                20                  25                  30

Leu Asn Glu Tyr Phe Leu Gly Ser Arg Ser Met Gly Gly Ile Val Leu
            35                  40                  45

Ala Met Thr Leu Thr Ala Thr Tyr Ile Ser Ala Ser Ser Phe Ile Gly
        50                  55                  60

Gly Pro Gly Ala Ala Tyr Lys Tyr Gly Leu Gly Trp Val Leu Leu Ala
65                  70                  75                  80

Met Ile Gln Leu Pro Ala Val Trp Leu Ser Leu Gly Ile Leu Gly Lys
                85                  90                  95

Lys Phe Ala Ile Leu Ala Arg Arg Tyr Asn Ala Val Thr Leu Asn Asp
                100                 105                 110

Met Leu Phe Ala Arg Tyr Gln Ser Arg Leu Leu Val Trp Leu Ala Ser
            115                 120                 125

Leu Ser Leu Leu Val Ala Phe Val Gly Ala Met Thr Val Gln Phe Ile
        130                 135                 140

Gly Gly Ala Arg Leu Leu Glu Thr Ala Ala Gly Ile Pro Tyr Glu Thr
145                 150                 155                 160

Gly Leu Leu Ile Phe Gly Ile Ser Ile Ala Leu Tyr Thr Ala Phe Gly
                165                 170                 175

Gly Phe Arg Ala Ser Val Leu Asn Asp Thr Met Gln Gly Leu Val Met
                180                 185                 190

Leu Ile Gly Thr Val Val Leu Leu Ile Gly Val Val His Ala Ala Gly
            195                 200                 205

Gly Leu Ser Asn Ala Val Gln Thr Leu Gln Thr Ile Asp Pro Gln Leu
        210                 215                 220

Val Thr Pro Gln Gly Ala Asp Asp Ile Leu Ser Pro Ala Phe Met Thr
225                 230                 235                 240

Ser Phe Trp Val Leu Val Cys Phe Gly Val Ile Gly Leu Pro His Thr
                245                 250                 255

Ala Val Arg Cys Ile Ser Tyr Lys Asp Ser Lys Ala Val His Arg Gly
                260                 265                 270

Ile Ile Ile Gly Thr Ile Val Val Ala Ile Leu Met Phe Gly Met His
            275                 280                 285

Leu Ala Gly Ala Leu Gly Arg Ala Val Ile Pro Asp Leu Thr Val Pro
        290                 295                 300

Asp Leu Val Ile Pro Thr Leu Met Val Lys Val Leu Pro Pro Phe Ala
305                 310                 315                 320
```

-continued

```
Ala Gly Ile Phe Leu Ala Ala Pro Met Ala Ile Met Ser Thr Ile
            325                 330                 335

Asn Ala Gln Leu Leu Gln Ser Ser Ala Thr Ile Ile Lys Asp Leu Tyr
            340                 345                 350

Leu Asn Ile Arg Pro Asp Gln Met Gln Asn Glu Thr Arg Leu Lys Arg
            355                 360                 365

Met Ser Ala Val Ile Thr Leu Val Leu Gly Ala Leu Leu Leu Leu Ala
            370                 375                 380

Ala Trp Lys Pro Pro Glu Met Ile Ile Trp Leu Asn Leu Leu Ala Phe
385                 390                 395                 400

Gly Gly Leu Glu Ala Val Phe Leu Trp Pro Leu Val Leu Gly Leu Tyr
            405                 410                 415

Trp Glu Arg Ala Asn Ala Lys Gly Ala Leu Ser Ala Met Ile Val Gly
            420                 425                 430

Gly Val Leu Tyr Ala Val Leu Ala Thr Leu Asn Ile Gln Tyr Leu Gly
            435                 440                 445

Phe His Pro Ile Val Pro Ser Leu Leu Leu Ser Leu Leu Ala Phe Leu
            450                 455                 460

Val Gly Asn Arg Phe Gly Thr Ser Val Pro Gln Ala Thr Val Leu Thr
465                 470                 475                 480

Thr Asp Lys

<210> SEQ ID NO 2
<211> LENGTH: 512
<212> TYPE: PRT
<213> ORGANISM: Saccharomyces cerevisiae
<220> FEATURE:
<223> OTHER INFORMATION: strain ATCC 204508 / S288c

<400> SEQUENCE: 2

Met Met Lys Glu Ser Lys Ser Ile Thr Gln His Glu Val Arg Glu
1               5                   10                  15

Ser Val Ser Ser Lys Arg Ala Ile Lys Lys Arg Leu Leu Leu Phe Lys
            20                  25                  30

Ile Asp Leu Phe Val Leu Ser Phe Val Cys Leu Gln Tyr Trp Ile Asn
            35                  40                  45

Tyr Val Asp Arg Val Gly Phe Thr Asn Ala Tyr Ile Ser Gly Met Lys
            50                  55                  60

Glu Asp Leu Lys Met Val Gly Asn Asp Leu Thr Val Ser Asn Thr Val
65                  70                  75                  80

Phe Met Ile Gly Tyr Ile Val Gly Met Val Pro Asn Asn Leu Met Leu
            85                  90                  95

Leu Cys Val Pro Pro Arg Ile Trp Leu Ser Phe Cys Thr Phe Ala Trp
            100                 105                 110

Gly Leu Leu Thr Leu Gly Met Tyr Lys Val Thr Ser Phe Lys His Ile
            115                 120                 125

Cys Ala Ile Arg Phe Phe Gln Ala Leu Phe Glu Ser Cys Thr Phe Ser
            130                 135                 140

Gly Thr His Phe Val Leu Gly Ser Trp Tyr Lys Glu Asp Glu Leu Pro
145                 150                 155                 160

Ile Arg Ser Ala Ile Phe Thr Gly Ser Gly Leu Val Gly Ser Met Phe
            165                 170                 175

Ser Gly Phe Met Gln Thr Ser Ile Phe Thr His Leu Asn Gly Arg Asn
            180                 185                 190
```

```
Gly Leu Ala Gly Trp Arg Trp Leu Phe Ile Ile Asp Phe Cys Ile Thr
            195                 200                 205

Leu Pro Ile Ala Ile Tyr Gly Phe Ile Phe Pro Gly Leu Pro Asp
    210                 215                 220

Gln Thr Ser Ala Val Ser Lys Phe Ser Met Thr Arg Tyr Ile Phe Asn
225                 230                 235                 240

Glu Gln Glu Leu His Tyr Ala Arg Arg Leu Pro Ala Arg Asp Glu
            245                 250                 255

Ser Thr Arg Leu Asp Trp Ser Thr Ile Pro Arg Val Leu Lys Arg Trp
            260                 265                 270

His Trp Trp Met Phe Ser Leu Val Trp Val Leu Gly Gly Glu Asn Leu
            275                 280                 285

Gly Phe Ala Ser Asn Ser Thr Phe Ala Leu Trp Leu Gln Asn Gln Lys
    290                 295                 300

Tyr Thr Leu Ala Gln Arg Asn Asn Tyr Pro Ser Gly Ile Phe Ala Val
305                 310                 315                 320

Gly Ile Val Ser Thr Leu Cys Ser Ala Val Tyr Met Ser Lys Ile Pro
            325                 330                 335

Arg Ala Arg His Trp His Val Ser Val Phe Ile Ser Leu Val Met Val
            340                 345                 350

Ile Val Ala Val Leu Ile Arg Ala Asp Pro Leu Asn Pro Lys Val Val
            355                 360                 365

Phe Ser Ala Gln Tyr Leu Gly Gly Val Ala Tyr Ala Gly Gln Ala Val
    370                 375                 380

Phe Phe Ser Trp Ala Asn Ile Ile Cys His Ala Asp Leu Gln Glu Arg
385                 390                 395                 400

Ala Ile Val Leu Ala Ser Met Asn Met Phe Ser Gly Ala Val Asn Ala
            405                 410                 415

Trp Trp Ser Ile Leu Phe Phe Ala Ser Asp Met Val Pro Lys Phe Glu
            420                 425                 430

Arg Gly Cys Tyr Ala Leu Leu Ala Thr Ala Ile Ser Ser Gly Ile Val
            435                 440                 445

Ser Val Val Ile Arg Ser Leu Gln Ile Lys Glu Asn Leu Ser Lys Lys
450                 455                 460

Gln Val Pro Tyr Ile Asp Ala Asn Asp Met Pro Gly Glu Asp Asp Asp
465                 470                 475                 480

Asp Asp Asn Gln Asp Asn Glu Asn Asp Asp Gly Asp Glu Ser Met Glu
            485                 490                 495

Val Glu Leu His Asn Glu Glu Met Ala Glu Ile Ser Asn Pro Phe Arg
            500                 505                 510

<210> SEQ ID NO 3
<211> LENGTH: 514
<212> TYPE: PRT
<213> ORGANISM: Schizosaccharomyces pombe
<220> FEATURE:
<223> OTHER INFORMATION: strain 972 / ATCC 24843

<400> SEQUENCE: 3

Met Ala Leu Leu Asn Arg Leu Ala Lys Thr Phe Ser Pro Tyr Tyr Gly
1               5                   10                  15

Leu Asn Lys Val Glu Gln Lys Leu Leu Ile Lys Ile Asp Trp Phe Ile
            20                  25                  30

Leu Ser Tyr Cys Cys Val Ser Tyr Phe Ile Asn Tyr Leu Asp Arg Ser
        35                  40                  45
```

```
Ser Ile Asn Asn Ala Tyr Leu Ser Gly Met Gln Glu Asp Leu Lys Met
    50                  55                  60

His Gly Asn Glu Leu Gln Asp Ile Asn Val Val Phe Thr Cys Gly Tyr
 65                  70                  75                  80

Ile Ile Gly Gln Leu Pro Gly Ser Tyr Ala Leu Gln Arg Val Pro Ala
                 85                  90                  95

Arg Leu Trp Phe Ser Val Met Asn Ile Leu Trp Gly Leu Met Thr Ile
            100                 105                 110

Phe Ser Phe Ala Val His Ser Val Arg Ala Leu Met Ile Leu Arg Phe
        115                 120                 125

Phe Met Ala Val Ala Glu Ala Ser Thr Phe Ala Gly Thr His Tyr Ile
    130                 135                 140

Leu Gly Ala Trp Tyr Lys Glu Ser Glu Leu Cys Lys Arg Ala Gly Ile
145                 150                 155                 160

Phe Ser Ala Ser Gly Leu Val Gly Thr Met Phe Ala Gly Tyr Leu Gln
                165                 170                 175

Thr Ala Val His Ser Ser Leu Asn Gly Lys Gly Gly Leu Ser Gly Trp
            180                 185                 190

Arg Trp Leu Phe Ile Ile Asp Gly Ile Leu Thr Ile Pro Leu Ser Leu
        195                 200                 205

Tyr Gly Leu Phe Leu Phe Pro Asp Val Pro Glu Thr Thr Lys Ala Pro
    210                 215                 220

Tyr Phe Thr Glu Gln Glu Lys Glu Leu Ser Phe Lys Arg Leu Pro Ala
225                 230                 235                 240

Arg Pro Lys Lys Lys Pro Leu Thr Leu Lys Ala Ile Lys Asp Ile Val
                245                 250                 255

Arg Ser Trp Arg Ile Tyr Gly Leu Cys Ile Leu Trp Ile Phe Ser Gly
            260                 265                 270

Glu Thr Gln Ala Ile Ala Val Asn Val Leu Met Gly Gln Trp Met Lys
        275                 280                 285

Trp Ser Asn Lys Phe Ser Val Ala Gln Ile Asn Asn Tyr Pro Thr Val
    290                 295                 300

Ile Thr Ala Val Gly Val Val Ser Thr Leu Gly Ala Ser Val Ile Ser
305                 310                 315                 320

Asp Lys Leu Ala Gly Asn Pro Arg Trp Pro Phe Gly Leu Phe Leu Cys
                325                 330                 335

Val Ile Thr Thr Val Ser Ala Thr Ile Leu Leu Ala Trp Asn Val Pro
            340                 345                 350

Asp Gly Ala Lys Phe Phe Ala Tyr Phe Ala Ser Gly Cys Thr Tyr Ala
        355                 360                 365

Gly Gln Ala Val Trp Phe Ser Trp Ala Asn Asp Ile Cys Arg Asp Asn
    370                 375                 380

Asp Gln Glu Arg Gly Val Val Phe Leu Met Asn Met Cys Gln Asn
385                 390                 395                 400

Ile Trp His Ile Trp Trp Ala Pro Ile Met Tyr Pro Asn Thr Asp Thr
                405                 410                 415

Pro Arg Phe Ile Lys Gly Leu Ile Gly Leu Leu Val Val Gly Gly Ile
            420                 425                 430

Val Phe Val Ser Ser Cys Ile Val Ser Tyr Met Gln Ile Arg Asp Lys
        435                 440                 445

Arg Ile Lys Arg Ser Ile Gln Asp Ala Lys Asp Phe Asp Asp Val Phe
450                 455                 460

Thr Glu His Glu Ser Leu Glu Leu Lys Lys Ile Gly Lys Asn Asp Glu
```

```
                465                 470                 475                 480
        Glu Ser Leu Asn Thr Thr Asn Ala Val Lys Glu Ile Ser Ser Pro Gly
                            485                 490                 495

Leu Val Ile Thr Arg Gln Arg Ile Ser Met Pro Lys Glu Thr Asn Ala
                        500                 505                 510

Gln Asp

<210> SEQ ID NO 4
<211> LENGTH: 196
<212> TYPE: PRT
<213> ORGANISM: Lactococcus lactis subsp. cremoris
<220> FEATURE:
<223> OTHER INFORMATION: strain MG1363

<400> SEQUENCE: 4

Met Lys Lys Ser Lys Ala Ser Asp Val Ala Ile Leu Ala Ile Phe Ile
1               5                   10                  15

Ala Ile Met Val Val Val Gln Leu Phe Thr Gln Phe Val Ile Asn Val
            20                  25                  30

Trp Pro Phe Pro Val Lys Pro Thr Leu Leu His Leu Pro Val Ile Ile
        35                  40                  45

Gly Ser Ile Ile Leu Gly Trp Arg Lys Gly Ala Phe Leu Gly Leu Val
    50                  55                  60

Trp Gly Leu Ile Ser Phe Val Thr Ala Thr Ile Val Thr Thr Pro Thr
65                  70                  75                  80

Ser Phe Leu Phe Ser Pro Phe Gln Pro Val Ile Gly Thr His His Gly
                85                  90                  95

Ser Pro Trp Gly Leu Phe Ile Ala Phe Ile Pro Arg Ile Leu Val Gly
            100                 105                 110

Ile Leu Pro Tyr Phe Val Tyr Lys Ile Ala Asn Asn Arg Leu Gly Ala
        115                 120                 125

Gly Leu Ala Ala Phe Ala Gly Thr Ala Thr Asn Thr Val Leu Val Leu
    130                 135                 140

Thr Ser Ile Phe Leu Phe Phe Gly Ser Thr Leu Lys Trp Ser Leu Ser
145                 150                 155                 160

Tyr Leu Leu Gly Ala Ile Val Ala Thr Asn Ser Leu Thr Glu Val Ile
                165                 170                 175

Ile Ala Val Ile Leu Thr Thr Ala Ile Val Pro Ala Leu Thr Lys Ala
            180                 185                 190

Arg Asn Asn Ser
        195

<210> SEQ ID NO 5
<211> LENGTH: 316
<212> TYPE: PRT
<213> ORGANISM: Escherichia coli
<220> FEATURE:
<223> OTHER INFORMATION: strain K12

<400> SEQUENCE: 5

Met Ser Ile Lys Glu Gln Thr Leu Met Thr Pro Tyr Leu Gln Phe Asp
1               5                   10                  15

Arg Asn Gln Trp Ala Ala Leu Arg Asp Ser Val Pro Met Thr Leu Ser
            20                  25                  30

Glu Asp Glu Ile Ala Arg Leu Lys Gly Ile Asn Glu Asp Leu Ser Leu
        35                  40                  45

Glu Glu Val Ala Glu Ile Tyr Leu Pro Leu Ser Arg Leu Leu Asn Phe
```

```
                50                  55                  60
Tyr Ile Ser Ser Asn Leu Arg Arg Gln Ala Val Leu Glu Gln Phe Leu
 65                  70                  75                  80

Gly Thr Asn Gly Gln Arg Ile Pro Tyr Ile Ile Ser Ile Ala Gly Ser
                 85                  90                  95

Val Ala Val Gly Lys Ser Thr Thr Ala Arg Val Leu Gln Ala Leu Leu
                100                 105                 110

Ser Arg Trp Pro Glu His Arg Arg Val Glu Leu Ile Thr Thr Asp Gly
                115                 120                 125

Phe Leu His Pro Asn Gln Val Leu Lys Glu Arg Gly Leu Met Lys Lys
                130                 135                 140

Lys Gly Phe Pro Glu Ser Tyr Asp Met His Arg Leu Val Lys Phe Val
145                 150                 155                 160

Ser Asp Leu Lys Ser Gly Val Pro Asn Val Thr Ala Pro Val Tyr Ser
                165                 170                 175

His Leu Ile Tyr Asp Val Ile Pro Asp Gly Asp Lys Thr Val Val Gln
                180                 185                 190

Pro Asp Ile Leu Ile Leu Glu Gly Leu Asn Val Leu Gln Ser Gly Met
                195                 200                 205

Asp Tyr Pro His Asp Pro His His Val Phe Val Ser Asp Phe Val Asp
                210                 215                 220

Phe Ser Ile Tyr Val Asp Ala Pro Glu Asp Leu Leu Gln Thr Trp Tyr
225                 230                 235                 240

Ile Asn Arg Phe Leu Lys Phe Arg Glu Gly Ala Phe Thr Asp Pro Asp
                245                 250                 255

Ser Tyr Phe His Asn Tyr Ala Lys Leu Thr Lys Glu Glu Ala Ile Lys
                260                 265                 270

Thr Ala Met Thr Leu Trp Lys Glu Ile Asn Trp Leu Asn Leu Lys Gln
                275                 280                 285

Asn Ile Leu Pro Thr Arg Glu Arg Ala Ser Leu Ile Leu Thr Lys Ser
                290                 295                 300

Ala Asn His Ala Val Glu Glu Val Arg Leu Arg Lys
305                 310                 315

<210> SEQ ID NO 6
<211> LENGTH: 316
<212> TYPE: PRT
<213> ORGANISM: Escherichia coli
<220> FEATURE:
<223> OTHER INFORMATION: strain K12 variant R106A

<400> SEQUENCE: 6

Met Ser Ile Lys Glu Gln Thr Leu Met Thr Pro Tyr Leu Gln Phe Asp
 1                   5                  10                  15

Arg Asn Gln Trp Ala Ala Leu Arg Asp Ser Val Pro Met Thr Leu Ser
                 20                  25                  30

Glu Asp Glu Ile Ala Arg Leu Lys Gly Ile Asn Glu Asp Leu Ser Leu
                 35                  40                  45

Glu Glu Val Ala Glu Ile Tyr Leu Pro Leu Ser Arg Leu Leu Asn Phe
 50                  55                  60

Tyr Ile Ser Ser Asn Leu Arg Arg Gln Ala Val Leu Glu Gln Phe Leu
 65                  70                  75                  80

Gly Thr Asn Gly Gln Arg Ile Pro Tyr Ile Ile Ser Ile Ala Gly Ser
                 85                  90                  95

Val Ala Val Gly Lys Ser Thr Thr Ala Ala Val Leu Gln Ala Leu Leu
```

```
                    100                 105                 110
Ser Arg Trp Pro Glu His Arg Val Glu Leu Ile Thr Thr Asp Gly
            115                 120                 125

Phe Leu His Pro Asn Gln Val Leu Lys Glu Arg Gly Leu Met Lys Lys
            130                 135                 140

Lys Gly Phe Pro Glu Ser Tyr Asp Met His Arg Leu Val Lys Phe Val
145                 150                 155                 160

Ser Asp Leu Lys Ser Gly Val Pro Asn Val Thr Ala Pro Val Tyr Ser
                165                 170                 175

His Leu Ile Tyr Asp Val Ile Pro Asp Gly Asp Lys Thr Val Val Gln
                180                 185                 190

Pro Asp Ile Leu Ile Leu Glu Gly Leu Asn Val Leu Gln Ser Gly Met
                195                 200                 205

Asp Tyr Pro His Asp Pro His His Val Phe Val Ser Asp Phe Val Asp
                210                 215                 220

Phe Ser Ile Tyr Val Asp Ala Pro Glu Asp Leu Leu Gln Thr Trp Tyr
225                 230                 235                 240

Ile Asn Arg Phe Leu Lys Phe Arg Glu Gly Ala Phe Thr Asp Pro Asp
                245                 250                 255

Ser Tyr Phe His Asn Tyr Ala Lys Leu Thr Lys Glu Glu Ala Ile Lys
                260                 265                 270

Thr Ala Met Thr Leu Trp Lys Glu Ile Asn Trp Leu Asn Leu Lys Gln
                275                 280                 285

Asn Ile Leu Pro Thr Arg Glu Arg Ala Ser Leu Ile Leu Thr Lys Ser
                290                 295                 300

Ala Asn His Ala Val Glu Val Arg Leu Arg Lys
305                 310                 315

<210> SEQ ID NO 7
<211> LENGTH: 267
<212> TYPE: PRT
<213> ORGANISM: Staphylococcus aureus
<220> FEATURE:
<223> OTHER INFORMATION: strain MSSA476

<400> SEQUENCE: 7

Met Lys Val Gly Ile Asp Ala Gly Gly Thr Leu Ile Lys Ile Val Gln
1               5                   10                  15

Glu Gln Asp Asn Gln Arg Thr Phe Lys Thr Glu Leu Thr Lys Asn Ile
                20                  25                  30

Asp Gln Val Val Glu Trp Leu Asn Gln Gln Ile Glu Lys Leu Cys
            35                  40                  45

Leu Thr Gly Gly Asn Ala Gly Val Ile Ala Glu Asn Ile Asn Ile Pro
        50                  55                  60

Ala Gln Ile Phe Val Glu Phe Asp Ala Ala Ser Gln Gly Leu Gly Ile
65                  70                  75                  80

Leu Leu Lys Glu Gln Gly His Asp Leu Ala Asp Tyr Ile Phe Ala Asn
                85                  90                  95

Val Gly Thr Gly Thr Ser Leu His Tyr Phe Asp Gly Gln Ser Gln Arg
            100                 105                 110

Arg Val Gly Gly Ile Gly Thr Gly Gly Met Ile Gln Gly Leu Gly
            115                 120                 125

Tyr Leu Leu Ser Gln Ile Thr Asp Tyr Lys Gln Leu Thr Asp Met Ala
            130                 135                 140

Gln His Gly Asp Arg Asn Thr Ile Asp Leu Lys Val Arg His Ile Tyr
```

```
                145                 150                 155                 160
Lys Asp Thr Glu Pro Pro Ile Pro Gly Asp Leu Thr Ala Ala Asn Phe
                    165                 170                 175

Gly His Val Leu His His Leu Asp Ala Asp Phe Thr Pro Ser Asn Lys
                    180                 185                 190

Leu Ala Ala Val Ile Gly Val Gly Glu Val Val Thr Met Ala
                    195                 200                 205

Ile Thr Val Ala Arg Glu Phe Lys Thr Glu Asn Ile Val Tyr Ile Gly
                    210                 215                 220

Ser Ser Phe His Asn Asn Ala Leu Leu Arg Lys Val Val Glu Asp Tyr
225                 230                 235                 240

Thr Val Leu Arg Gly Cys Lys Pro Tyr Tyr Val Glu Asn Gly Ala Phe
                    245                 250                 255

Ser Gly Ala Ile Gly Ala Leu Tyr Leu Glu Lys
                    260                 265

<210> SEQ ID NO 8
<211> LENGTH: 223
<212> TYPE: PRT
<213> ORGANISM: Helicobacter pylori
<220> FEATURE:
<223> OTHER INFORMATION: strain ATCC 700392 / 26695

<400> SEQUENCE: 8

Met Pro Ala Arg Gln Ser Phe Thr Asp Leu Lys Asn Leu Val Leu Cys
1               5                   10                  15

Asp Ile Gly Asn Thr Arg Ile His Phe Ala Gln Asn Tyr Gln Leu Phe
                20                  25                  30

Ser Ser Ala Lys Glu Asp Leu Lys Arg Leu Gly Ile Gln Lys Glu Ile
            35                  40                  45

Phe Tyr Ile Ser Val Asn Glu Glu Asn Glu Lys Ala Leu Leu Asn Cys
    50                  55                  60

Tyr Pro Asn Ala Lys Asn Ile Ala Gly Phe Phe His Leu Glu Thr Asp
65                  70                  75                  80

Tyr Val Gly Leu Gly Ile Asp Arg Gln Met Ala Cys Leu Ala Val Asn
                85                  90                  95

Asn Gly Val Val Val Asp Ala Gly Ser Ala Ile Thr Ile Asp Leu Ile
                100                 105                 110

Lys Glu Gly Lys His Leu Gly Gly Cys Ile Leu Pro Gly Leu Ala Gln
            115                 120                 125

Tyr Ile His Ala Tyr Lys Lys Ser Ala Lys Ile Leu Glu Gln Pro Phe
    130                 135                 140

Lys Ala Leu Asp Ser Leu Glu Val Leu Pro Lys Ser Thr Arg Asp Ala
145                 150                 155                 160

Val Asn Tyr Gly Met Val Leu Ser Val Ile Ala Cys Ile Gln His Leu
                165                 170                 175

Ala Lys Asn Gln Lys Ile Tyr Leu Cys Gly Gly Asp Ala Lys Tyr Leu
                180                 185                 190

Ser Ala Phe Leu Pro His Ser Val Cys Lys Glu Arg Leu Val Phe Asp
            195                 200                 205

Gly Met Glu Ile Ala Leu Lys Lys Ala Gly Ile Leu Glu Cys Lys
    210                 215                 220

<210> SEQ ID NO 9
<211> LENGTH: 258
<212> TYPE: PRT
```

<213> ORGANISM: Bacillus subtilis

<400> SEQUENCE: 9

```
Met Leu Leu Val Ile Asp Val Gly Asn Thr Asn Thr Val Leu Gly Val
1               5                   10                  15
Tyr His Asp Gly Lys Leu Glu Tyr His Trp Arg Ile Glu Thr Ser Arg
                20                  25                  30
His Lys Thr Glu Asp Glu Phe Gly Met Ile Leu Arg Ser Leu Phe Asp
            35                  40                  45
His Ser Gly Leu Met Phe Glu Gln Ile Asp Gly Ile Ile Ser Ser
        50                  55                  60
Val Val Pro Pro Ile Met Phe Ala Leu Glu Arg Met Cys Thr Lys Tyr
65                  70                  75                  80
Phe His Ile Glu Pro Gln Ile Val Gly Pro Gly Met Lys Thr Gly Leu
                85                  90                  95
Asn Ile Lys Tyr Asp Asn Pro Lys Glu Val Gly Ala Asp Arg Ile Val
                100                 105                 110
Asn Ala Val Ala Ala Ile His Leu Tyr Gly Asn Pro Leu Ile Val Val
            115                 120                 125
Asp Phe Gly Thr Ala Thr Thr Tyr Cys Tyr Ile Asp Glu Asn Lys Gln
        130                 135                 140
Tyr Met Gly Gly Ala Ile Ala Pro Gly Ile Thr Ile Ser Thr Glu Ala
145                 150                 155                 160
Leu Tyr Ser Arg Ala Ala Lys Leu Pro Arg Ile Glu Ile Thr Arg Pro
                165                 170                 175
Asp Asn Ile Ile Gly Lys Asn Thr Val Ser Ala Met Gln Ser Gly Ile
                180                 185                 190
Leu Phe Gly Tyr Val Gly Gln Val Glu Gly Ile Val Lys Arg Met Lys
            195                 200                 205
Trp Gln Ala Lys Gln Lys Gln Lys Val Ile Ala Thr Gly Gly Leu Ala
        210                 215                 220
Pro Leu Ile Ala Asn Glu Ser Asp Cys Ile Asp Ile Val Asp Pro Phe
225                 230                 235                 240
Leu Thr Leu Lys Gly Leu Glu Leu Ile Tyr Glu Arg Asn Arg Val Gly
                245                 250                 255
Ser Val
```

<210> SEQ ID NO 10
<211> LENGTH: 257
<212> TYPE: PRT
<213> ORGANISM: Enterococcus faecalis

<400> SEQUENCE: 10

```
Met Asp Val Leu Val Thr Ala Gly Gly Thr Ser Glu Pro Ile Asp Asn
1               5                   10                  15
Val Arg Ser Ile Thr Asn His Ser Ser Gly Gly Leu Gly Lys Ala Ile
                20                  25                  30
Ala Glu Ser Phe Leu Ala Ala Gly His Thr Val Thr Tyr Val Thr Thr
            35                  40                  45
Lys His Ala Leu Arg Pro Thr Gln Gln Leu Asp Leu Ser Ile Lys Glu
        50                  55                  60
Ile Glu Thr Thr Val Glu Leu Ala Thr Thr Leu Glu Gln Leu Phe Ala
65                  70                  75                  80
Glu Lys Gln Phe Asp Ala Ile Val His Ala Met Ala Val Ser Asp Phe
                85                  90                  95
```

```
Thr Thr Glu Thr Ala Gln Thr Glu Glu Gln Phe Ile Asp Ser Phe Ala
            100                 105                 110
Gln Gln Leu Ser Glu Gln Thr Leu Pro Lys Thr Lys Glu Ala Leu Val
        115                 120                 125
Thr Ile Val Gln Asn Thr Leu Asn Gln Ile Ala Asp Ile Pro Gln Thr
130                 135                 140
Ala Thr Lys Ile Ser Ser Asp Thr Asp Arg Leu Leu Ile Phe Leu Lys
145                 150                 155                 160
Lys Asn Pro Lys Val Ile Gln Met Ile Arg Asp Lys Gln Pro Gln Thr
                165                 170                 175
Val Leu Val Gly Phe Lys Leu Leu Val Asn Val Ser Gln Glu Glu Leu
            180                 185                 190
Val Gln Val Ala Gln Ala Ala Leu Val Lys Asn Arg Cys Asp Phe Val
        195                 200                 205
Leu Ala Asn Asp Leu Met Asn Val His Glu Thr Glu His Lys Gly Leu
210                 215                 220
Leu Ile Asn Glu Thr Gly Ile Val Gln Glu Ala Tyr Ser Lys Gln Gly
225                 230                 235                 240
Ile Gly Ser Met Ile Val Lys Asn Val Glu Lys Lys Trp Arg Glu Gln
                245                 250                 255
Gln

<210> SEQ ID NO 11
<211> LENGTH: 365
<212> TYPE: PRT
<213> ORGANISM: Saccharomyces cerevisiae
<220> FEATURE:
<223> OTHER INFORMATION: strain ATCC 204508 / S288c

<400> SEQUENCE: 11

Met Pro Pro Leu Pro Val Leu Asn Arg Pro Gln Ile His Thr Ser Val
1               5                   10                  15
Thr Glu Ile Ser His Ala Ile Asp Arg Thr Ile Lys Glu Glu Leu Phe
                20                  25                  30
Pro Val Ala Tyr Thr Thr Glu Glu Gln Tyr Phe Lys Thr Asn Pro
            35                  40                  45
Lys Pro Ala Tyr Ile Asp Glu Leu Ile Lys Asp Ala Lys Glu Phe Ile
50                  55                  60
Asp Leu Gln Tyr Ser Leu Lys Arg Asn Lys Ile Val Leu Ile Thr Ser
65                  70                  75                  80
Gly Gly Thr Thr Val Pro Leu Glu Asn Asn Thr Val Arg Phe Ile Asp
                85                  90                  95
Asn Phe Ser Ala Gly Thr Arg Gly Ala Ser Ser Ala Glu Gln Phe Leu
            100                 105                 110
Ala Asn Gly Tyr Ser Val Ile Phe Leu His Arg Glu Phe Ser Leu Thr
        115                 120                 125
Pro Tyr Asn Arg Ser Phe Ser His Ser Ile Asn Thr Leu Phe Leu Asp
130                 135                 140
Tyr Ile Asp Ser Glu Gly Lys Ile Lys Pro Glu Phe Ala Glu Asn Val
145                 150                 155                 160
Leu Lys Asn Lys Lys Leu Tyr Asp Lys Tyr Met Glu Lys Glu Glu Lys
                165                 170                 175
Leu Leu Leu Leu Pro Phe Thr Thr Val Asn Gln Tyr Leu Trp Ser Leu
            180                 185                 190
```

```
Lys Ser Ile Ala Lys Leu Leu Asn Asn Ser Gly Cys Leu Phe Tyr Leu
            195                 200                 205

Ala Ala Ala Val Ser Asp Phe Phe Val Pro Tyr Ser Arg Leu Pro Gln
    210                 215                 220

His Lys Ile Gln Ser Gly Asp Asn Gly Lys Met Gly Ala Asn Asn Asp
225                 230                 235                 240

Thr Glu Gly Thr Thr Arg Thr Thr Pro Asp Gly Lys Leu Ile Val Asn
                245                 250                 255

Leu Asp Pro Val Pro Lys Phe Leu Arg Arg Leu Val Glu Ser Trp Ala
                260                 265                 270

Thr Gln Ala Met Ile Val Ser Phe Lys Leu Glu Thr Asp Glu Ser Met
            275                 280                 285

Leu Leu Tyr Lys Cys Thr Gln Ala Leu Asp Arg Tyr Asn His Gln Leu
        290                 295                 300

Val Ile Gly Asn Leu Leu Gln Thr Arg Asn Lys Gln Val Ile Phe Val
305                 310                 315                 320

Ser Pro Glu Asn Arg Lys Gly Asp Trp Val Arg Leu Asp Glu Lys His
                325                 330                 335

His Ser Ile Glu Glu Met Ile Ile Pro Glu Val Ile Ala Arg His Asp
            340                 345                 350

Lys Trp Val Ala His Ser Lys Thr Lys Leu Ala Thr Lys
        355                 360                 365

<210> SEQ ID NO 12
<211> LENGTH: 406
<212> TYPE: PRT
<213> ORGANISM: Escherichia coli
<220> FEATURE:
<223> OTHER INFORMATION: strain K12

<400> SEQUENCE: 12

Met Ser Leu Ala Gly Lys Lys Ile Val Leu Gly Val Ser Gly Gly Ile
1               5                   10                  15

Ala Ala Tyr Lys Thr Pro Glu Leu Val Arg Arg Leu Arg Asp Arg Gly
                20                  25                  30

Ala Asp Val Arg Val Ala Met Thr Glu Ala Ala Lys Ala Phe Ile Thr
            35                  40                  45

Pro Leu Ser Leu Gln Ala Val Ser Gly Tyr Pro Val Ser Asp Ser Leu
        50                  55                  60

Leu Asp Pro Ala Ala Glu Ala Met Gly His Ile Glu Leu Gly Lys
65                  70                  75                  80

Trp Ala Asp Leu Val Ile Leu Ala Pro Ala Thr Ala Asp Leu Ile Ala
                85                  90                  95

Arg Val Ala Ala Gly Met Ala Asn Asp Leu Val Ser Thr Ile Cys Leu
            100                 105                 110

Ala Thr Pro Ala Pro Val Ala Val Leu Pro Ala Met Asn Gln Gln Met
        115                 120                 125

Tyr Arg Ala Ala Ala Thr Gln His Asn Leu Glu Val Leu Ala Ser Arg
    130                 135                 140

Gly Leu Leu Ile Trp Gly Pro Asp Ser Gly Ser Gln Ala Cys Gly Asp
145                 150                 155                 160

Ile Gly Pro Gly Arg Met Leu Asp Pro Leu Thr Ile Val Asp Met Ala
                165                 170                 175

Val Ala His Phe Ser Pro Val Asn Asp Leu Lys His Leu Asn Ile Met
            180                 185                 190
```

```
Ile Thr Ala Gly Pro Thr Arg Glu Pro Leu Asp Pro Val Arg Tyr Ile
            195                 200                 205

Ser Asn His Ser Ser Gly Lys Met Gly Phe Ala Ile Ala Ala Ala Ala
        210                 215                 220

Ala Arg Arg Gly Ala Asn Val Thr Leu Val Ser Gly Pro Val Ser Leu
225                 230                 235                 240

Pro Thr Pro Pro Phe Val Lys Arg Val Asp Val Met Thr Ala Leu Glu
                245                 250                 255

Met Glu Ala Ala Val Asn Ala Ser Val Gln Gln Gln Asn Ile Phe Ile
            260                 265                 270

Gly Cys Ala Ala Val Ala Asp Tyr Arg Ala Ala Thr Val Ala Pro Glu
        275                 280                 285

Lys Ile Lys Lys Gln Ala Thr Gln Gly Asp Glu Leu Thr Ile Lys Met
    290                 295                 300

Val Lys Asn Pro Asp Ile Val Ala Gly Val Ala Ala Leu Lys Asp His
305                 310                 315                 320

Arg Pro Tyr Val Val Gly Phe Ala Ala Glu Thr Asn Asn Val Glu Glu
                325                 330                 335

Tyr Ala Arg Gln Lys Arg Ile Arg Lys Asn Leu Asp Leu Ile Cys Ala
            340                 345                 350

Asn Asp Val Ser Gln Pro Thr Gln Gly Phe Asn Ser Asp Asn Asn Ala
        355                 360                 365

Leu His Leu Phe Trp Gln Asp Gly Asp Lys Val Leu Pro Leu Glu Arg
    370                 375                 380

Lys Glu Leu Leu Gly Gln Leu Leu Asp Glu Ile Val Thr Arg Tyr
385                 390                 395                 400

Asp Glu Lys Asn Arg Arg
                405

<210> SEQ ID NO 13
<211> LENGTH: 401
<212> TYPE: PRT
<213> ORGANISM: Streptococcus pneumoniae

<400> SEQUENCE: 13

Met Leu Lys Gly Lys Lys Ile Leu Leu Cys Val Thr Gly Gly Ile Ala
1               5                   10                  15

Val Phe Lys Ala Ala Ala Leu Thr Ser Lys Leu Thr Gln Ala Gly Ala
                20                  25                  30

Ile Val Lys Val Met Met Ser Glu Ser Ala Val Lys Phe Val Thr Pro
            35                  40                  45

Leu Thr Phe Gln Ala Leu Ser Arg His Asp Val Tyr Thr Asp Thr Phe
    50                  55                  60

Asp Glu Lys Asp Ser Ala Val Ile Ala His Ile Asp Leu Ala Asp Trp
65                  70                  75                  80

Ala Asp Val Val Leu Val Ala Pro Ala Thr Ala Asn Cys Ile Gly Lys
                85                  90                  95

Leu Ala Asn Gly Ile Ala Asp Asp Met Ile Thr Thr Leu Leu Ala
                100                 105                 110

Thr Thr Ala Pro Val Trp Ile Ala Pro Ala Met Asn Val His Met Tyr
            115                 120                 125

Glu Asn Lys Ile Val Gln Lys Asn Met Met Leu Lys Thr Leu Gly
    130                 135                 140

Tyr Thr Phe Ile Glu Pro Gly Glu Gly Phe Leu Ala Cys Gly Tyr Val
145                 150                 155                 160
```

```
Ala Lys Gly Arg Leu Glu Pro Glu Ala Ile Ile Ala Arg Leu Glu
            165                 170                 175

Glu Ala Phe Ser Glu Gln Lys Pro Leu Gln Gly Lys Arg Ile Leu Ile
            180                 185                 190

Thr Ala Gly Pro Thr Arg Glu Lys Ile Asp Pro Val Arg Phe Met Thr
            195                 200                 205

Asn Phe Ser Ser Gly Lys Met Gly Tyr Ala Ile Ala Glu Val Ala Ala
            210                 215                 220

Asn Leu Gly Ala Glu Val Ile Leu Val Ser Gly Pro Thr Ala Leu Asn
225                 230                 235                 240

Pro Pro Leu His Val Thr Thr Val Gln Val Glu Ser Ala Gln Asp Met
            245                 250                 255

Leu Glu Ala Val Ile Gln His Tyr Gln Asn Val Asp Val Ile Lys
            260                 265                 270

Thr Ala Ala Val Ala Asp Tyr Arg Pro Lys Tyr Val His Asp Asn Lys
            275                 280                 285

Met Lys Lys Asn Gly Asp Ala Val Ile Glu Leu Glu Arg Thr Val
            290                 295                 300

Asp Ile Leu Lys Thr Leu Gly Glu Met Lys Asp Lys Gln Leu Leu Ile
305                 310                 315                 320

Gly Phe Ala Ala Glu Thr Thr Asn Val Glu Glu Tyr Ala Thr Lys Lys
            325                 330                 335

Leu Arg Glu Lys Asn Ala Asn Met Ile Val Ala Asn Asp Val Lys Ala
            340                 345                 350

Gln Gly Ala Gly Phe Gly Thr Asp Thr Asn Ile Val Thr Met Tyr Arg
            355                 360                 365

Lys Asp Gly Glu Val Ile Glu Leu Pro Leu Leu Thr Lys Lys Glu Val
            370                 375                 380

Ala Arg Glu Ile Leu Lys Gln Ile Glu Met Met Leu Glu Asp Asp Arg
385                 390                 395                 400

Leu

<210> SEQ ID NO 14
<211> LENGTH: 184
<212> TYPE: PRT
<213> ORGANISM: Enterococcus faecalis

<400> SEQUENCE: 14

Met Lys Thr Ile Leu Leu Gly Val Ser Gly Ser Ile Ser Ala Tyr Lys
1               5                   10                  15

Ala Ala Asp Ile Thr Ser Gln Leu Ala Lys Leu Gly Tyr Asn Val Glu
            20                  25                  30

Ile Leu Met Thr Lys Ser Ser Thr Ala Phe Ile Thr Pro Leu Thr Leu
            35                  40                  45

Gln Ser Leu Ser Lys Asn Pro Val His Thr Asp Val Met Met Glu Ile
            50                  55                  60

Asp Pro Ser Lys Ile Asn His Ile Glu Leu Ala Lys Lys Ala Asp Leu
65                  70                  75                  80

Phe Leu Val Ala Pro Ala Ser Ala Asn Thr Ile Gly Lys Leu Ala His
            85                  90                  95

Gly Ile Ala Asp Asp Leu Leu Ser Thr Val Ala Leu Ala Leu Tyr Pro
            100                 105                 110

Glu Thr Pro Lys Ile Ile Ala Pro Ala Met Asn Thr Tyr Met Tyr Gln
            115                 120                 125
```

```
Asn Pro Ile Val Gln Arg Asn Ile Gly Ile Leu Lys Glu Val Gly Tyr
        130                 135                 140

Gln Glu Ile Ile Pro Arg Glu Ala Leu Leu Ala Cys Gly Asp Tyr Gly
145                 150                 155                 160

Arg Gly Ala Leu Ala Thr Val Glu Asp Ile Leu Gln Thr Val Met Lys
                165                 170                 175

Ile Leu Ala Ser Asp Asn Lys Glu
            180

<210> SEQ ID NO 15
<211> LENGTH: 562
<212> TYPE: PRT
<213> ORGANISM: Saccharomyces cerevisiae
<220> FEATURE:
<223> OTHER INFORMATION: strain ATCC 204508 / S288c

<400> SEQUENCE: 15

Met Thr Ala Val Ala Ser Thr Ser Gly Lys Gln Asp Ala Asp His Asn
1               5                   10                  15

Gln Ser Ile Glu Cys Pro Arg Phe Ser Arg Gly Gln Lys Glu Ile Leu
            20                  25                  30

Leu Asp His Glu Asp Ala Lys Gly Lys Asp Ser Ile Ile Asn Ser Pro
        35                  40                  45

Val Ser Gly Arg Gln Ser Ile Ser Pro Thr Leu Ser Asn Ala Thr Thr
50                  55                  60

Thr Thr Thr Lys Ser Ile Met Asn Ala Thr Gly Thr Ser Gly Ala Val
65                  70                  75                  80

Val Ser Asn Thr Pro Glu Pro Gly Leu Lys Arg Val Pro Ala Val Thr
                85                  90                  95

Phe Ser Asp Leu Lys Gln Gln Lys Gln Asp Ser Leu Thr Gln Leu
            100                 105                 110

Lys Asn Asp Ser Glu Arg Thr Lys Ser Pro Asn Ser Asn Pro Ala Pro
        115                 120                 125

Val Ser Asn Ser Ile Pro Gly Asn His Ala Val Ile Pro Asn His Thr
130                 135                 140

Asn Thr Ser Arg Thr Thr Gln Leu Ser Gly Ser Pro Leu Val Asn Glu
145                 150                 155                 160

Met Lys Asp Tyr Asp Pro Lys Lys Lys Asp Ser Ala Leu Lys Ile Val
                165                 170                 175

Asp Thr Met Lys Pro Asp Lys Ile Met Ala Thr Ser Thr Pro Ile Ser
            180                 185                 190

Arg Glu Asn Asn Lys Val Thr Ala Lys Ala Pro Thr Ser Ile Thr Leu
        195                 200                 205

Arg Lys Glu Asp Ala Gln Asp Gln Ala Asn Asn Val Ser Gly Gln Ile
210                 215                 220

Asn Val Arg Ser Thr Pro Glu Glu Thr Pro Val Lys Gln Ser Val Ile
225                 230                 235                 240

Pro Ser Ile Ile Pro Lys Arg Glu Asn Ser Lys Asn Leu Asp Pro Arg
                245                 250                 255

Leu Pro Gln Asp Asp Gly Lys Leu His Val Leu Phe Gly Ala Thr Gly
            260                 265                 270

Ser Leu Ser Val Phe Lys Ile Lys Pro Met Ile Lys Lys Leu Glu Glu
        275                 280                 285

Ile Tyr Gly Arg Asp Arg Ile Ser Ile Gln Val Ile Leu Thr Gln Ser
290                 295                 300
```

```
Ala Thr Gln Phe Phe Glu Gln Arg Tyr Thr Lys Lys Ile Ile Lys Ser
305                 310                 315                 320

Ser Glu Lys Leu Asn Lys Met Ser Gln Tyr Glu Ser Thr Pro Ala Thr
                325                 330                 335

Pro Val Thr Pro Thr Pro Gly Gln Cys Asn Met Ala Gln Val Val Glu
                340                 345                 350

Leu Pro Pro His Ile Gln Leu Trp Thr Asp Gln Asp Glu Trp Asp Ala
                355                 360                 365

Trp Lys Gln Arg Thr Asp Pro Val Leu His Ile Glu Leu Arg Arg Trp
            370                 375                 380

Ala Asp Ile Leu Val Val Ala Pro Leu Thr Ala Asn Thr Leu Ser Lys
385                 390                 395                 400

Ile Ala Leu Gly Leu Cys Asp Asn Leu Leu Thr Ser Val Ile Arg Ala
                405                 410                 415

Trp Asn Pro Ser Tyr Pro Ile Leu Leu Ala Pro Ser Met Val Ser Ser
                420                 425                 430

Thr Phe Asn Ser Met Met Thr Lys Lys Gln Leu Gln Thr Ile Lys Glu
                435                 440                 445

Glu Met Ser Trp Val Thr Val Phe Lys Pro Ser Glu Lys Val Met Asp
450                 455                 460

Ile Asn Gly Asp Ile Gly Leu Gly Gly Met Met Asp Trp Asn Glu Ile
465                 470                 475                 480

Val Asn Lys Ile Val Met Lys Leu Gly Gly Tyr Pro Lys Asn Asn Glu
                485                 490                 495

Glu Glu Asp Asp Asp Glu Asp Glu Glu Asp Asp Glu Glu Glu
                500                 505                 510

Asp Thr Glu Asp Lys Asn Glu Asn Asn Asn Asp Asp Asp Asp Asp Asp
                515                 520                 525

Asp Asp Asp Asp Asp Asp Asp Asp Asp Asp Asp Asp Asp Asp Asp Asp
                530                 535                 540

Asp Asp Glu Asp Glu Asp Glu Ala Glu Thr Pro Gly Ile Ile Asp Lys
545                 550                 555                 560

His Gln

<210> SEQ ID NO 16
<211> LENGTH: 160
<212> TYPE: PRT
<213> ORGANISM: Staphylococcus aureus
<220> FEATURE:
<223> OTHER INFORMATION: strain MW2

<400> SEQUENCE: 16

Met Glu His Thr Ile Ala Val Ile Pro Gly Ser Phe Asp Pro Ile Thr
1               5                   10                  15

Tyr Gly His Leu Asp Ile Ile Glu Arg Ser Thr Asp Arg Phe Asp Glu
                20                  25                  30

Ile His Val Cys Val Leu Lys Asn Ser Lys Lys Glu Gly Thr Phe Ser
                35                  40                  45

Leu Glu Glu Arg Met Asp Leu Ile Glu Gln Ser Val Lys His Leu Pro
            50                  55                  60

Asn Val Lys Val His Gln Phe Ser Gly Leu Leu Val Asp Tyr Cys Glu
65                  70                  75                  80

Gln Val Gly Ala Lys Thr Ile Ile Arg Gly Leu Arg Ala Val Ser Asp
                85                  90                  95
```

```
Phe Glu Tyr Glu Leu Arg Leu Thr Ser Met Asn Lys Leu Asn Asn
                100                 105                 110

Glu Ile Glu Thr Leu Tyr Met Met Ser Ser Thr Asn Tyr Ser Phe Ile
            115                 120                 125

Ser Ser Ser Ile Val Lys Glu Val Ala Ala Tyr Arg Ala Asp Ile Ser
        130                 135                 140

Glu Phe Val Pro Pro Tyr Val Glu Lys Ala Leu Lys Lys Lys Phe Lys
145                 150                 155                 160
```

<210> SEQ ID NO 17
<211> LENGTH: 166
<212> TYPE: PRT
<213> ORGANISM: Burkholderia pseudomallei
<220> FEATURE:
<223> OTHER INFORMATION: strain 1710b

<400> SEQUENCE: 17

```
Met Val Val Ala Val Tyr Pro Gly Thr Phe Asp Pro Leu Thr Arg Gly
1               5                   10                  15

His Glu Asp Leu Val Arg Arg Ala Ser Ser Ile Phe Asp Thr Leu Val
            20                  25                  30

Val Gly Val Ala Asp Ser Arg Ala Lys Lys Pro Phe Phe Ser Leu Glu
        35                  40                  45

Glu Arg Leu Lys Ile Ala Asn Glu Val Leu Gly His Tyr Pro Asn Val
    50                  55                  60

Lys Val Met Gly Phe Thr Gly Leu Leu Lys Asp Phe Val Arg Ala Asn
65                  70                  75                  80

Asp Ala Arg Val Ile Val Arg Gly Leu Arg Ala Val Ser Asp Phe Glu
                85                  90                  95

Tyr Glu Phe Gln Met Ala Gly Met Asn Arg Tyr Leu Leu Pro Asp Val
            100                 105                 110

Glu Thr Met Phe Met Thr Pro Ser Asp Gln Tyr Gln Phe Ile Ser Gly
        115                 120                 125

Thr Ile Val Arg Glu Ile Ala Gln Leu Gly Gly Asp Val Ser Lys Phe
    130                 135                 140

Val Phe Pro Ser Val Glu Lys Trp Leu Thr Glu Lys Val Ala Ala Met
145                 150                 155                 160

Ala Gln Gly Pro Ser Ala
                165
```

<210> SEQ ID NO 18
<211> LENGTH: 159
<212> TYPE: PRT
<213> ORGANISM: Escherichia coli
<220> FEATURE:
<223> OTHER INFORMATION: strain K12

<400> SEQUENCE: 18

```
Met Gln Lys Arg Ala Ile Tyr Pro Gly Thr Phe Asp Pro Ile Thr Asn
1               5                   10                  15

Gly His Ile Asp Ile Val Thr Arg Ala Thr Gln Met Phe Asp His Val
            20                  25                  30

Ile Leu Ala Ile Ala Ala Ser Pro Ser Lys Lys Pro Met Phe Thr Leu
        35                  40                  45

Glu Glu Arg Val Ala Leu Ala Gln Gln Ala Thr Ala His Leu Gly Asn
    50                  55                  60

Val Glu Val Val Gly Phe Ser Asp Leu Met Ala Asn Phe Ala Arg Asn
65                  70                  75                  80
```

Gln His Ala Thr Val Leu Ile Arg Gly Leu Arg Ala Val Ala Asp Phe
                85                  90                  95

Glu Tyr Glu Met Gln Leu Ala His Met Asn Arg His Leu Met Pro Glu
            100                 105                 110

Leu Glu Ser Val Phe Leu Met Pro Ser Lys Glu Trp Ser Phe Ile Ser
        115                 120                 125

Ser Ser Leu Val Lys Glu Val Ala Arg His Gln Gly Asp Val Thr His
130                 135                 140

Phe Leu Pro Glu Asn Val His Gln Ala Leu Met Ala Lys Leu Ala
145                 150                 155

<210> SEQ ID NO 19
<211> LENGTH: 206
<212> TYPE: PRT
<213> ORGANISM: Escherichia coli
<220> FEATURE:
<223> OTHER INFORMATION: strain K12

<400> SEQUENCE: 19

Met Arg Tyr Ile Val Ala Leu Thr Gly Gly Ile Gly Ser Gly Lys Ser
1               5                   10                  15

Thr Val Ala Asn Ala Phe Ala Asp Leu Gly Ile Asn Val Ile Asp Ala
            20                  25                  30

Asp Ile Ile Ala Arg Gln Val Val Glu Pro Gly Ala Pro Ala Leu His
        35                  40                  45

Ala Ile Ala Asp His Phe Gly Ala Asn Met Ile Ala Ala Asp Gly Thr
    50                  55                  60

Leu Gln Arg Arg Ala Leu Arg Glu Arg Ile Phe Ala Asn Pro Glu Glu
65                  70                  75                  80

Lys Asn Trp Leu Asn Ala Leu Leu His Pro Leu Ile Gln Gln Glu Thr
                85                  90                  95

Gln His Gln Ile Gln Gln Ala Thr Ser Pro Tyr Val Leu Trp Val Val
            100                 105                 110

Pro Leu Leu Val Glu Asn Ser Leu Tyr Lys Lys Ala Asn Arg Val Leu
        115                 120                 125

Val Val Asp Val Ser Pro Glu Thr Gln Leu Lys Arg Thr Met Gln Arg
    130                 135                 140

Asp Asp Val Thr Arg Glu His Val Glu Gln Ile Leu Ala Ala Gln Ala
145                 150                 155                 160

Thr Arg Glu Ala Arg Leu Ala Val Ala Asp Asp Val Ile Asp Asn Asn
                165                 170                 175

Gly Ala Pro Asp Ala Ile Ala Ser Asp Val Ala Arg Leu His Ala His
            180                 185                 190

Tyr Leu Gln Leu Ala Ser Gln Phe Val Ser Gln Glu Lys Pro
        195                 200                 205

<210> SEQ ID NO 20
<211> LENGTH: 241
<212> TYPE: PRT
<213> ORGANISM: Saccharomyces cerevisiae
<220> FEATURE:
<223> OTHER INFORMATION: strain ATCC 204508 / S288c

<400> SEQUENCE: 20

Met Leu Val Val Gly Leu Thr Gly Gly Ile Ala Cys Gly Lys Ser Thr
1               5                   10                  15

Val Ser Arg Arg Leu Arg Asp Lys Tyr Lys Leu Pro Ile Val Asp Ala

```
                    20                  25                  30
Asp Lys Ile Ala Arg Gln Val Val Glu Pro Gly Gln Asn Ala Tyr Asp
                35                  40                  45
Gln Ile Val Leu Tyr Phe Lys Asp Lys Ile Pro Asn Leu Leu Leu Glu
            50                  55                  60
Asp Gly His Leu Asn Arg Glu Ala Leu Gly Lys Trp Val Phe Ser His
        65                  70                  75                  80
Lys Glu Asp Leu Gln Ala Leu Asn Gly Ile Thr His Pro Ala Ile Arg
                    85                  90                  95
Tyr Ala Met Phe Lys Glu Ile Gly Tyr Tyr Leu Lys Gly Tyr Arg
                100                 105                 110
Met Cys Val Leu Asp Val Pro Leu Phe Glu Gly Asn Leu Asp Ser
            115                 120                 125
Ile Cys Gly Val Thr Val Ser Val Ile Cys Thr Gln Glu Leu Gln Leu
        130                 135                 140
Glu Arg Leu Met Thr Arg Asn Pro Glu Leu Ser Glu Glu Asp Ala Lys
145                 150                 155                 160
Asn Arg Leu Asn Ser Gln Met Ser Thr Glu Glu Arg Met Ala Arg Ser
                165                 170                 175
Asp Tyr Ile Leu Gln Asn Asn Ser Thr Leu Val Asp Leu Tyr Glu Gln
                180                 185                 190
Ile Glu Ser Val Val Lys Lys Ile Gln Pro Ser Lys Leu Arg Thr Val
            195                 200                 205
Leu Glu Tyr Phe Pro Pro Phe Gly Ala Val Ser Ala Ser Ser Ile Val
        210                 215                 220
Met Ser Arg Leu Leu Met Lys Lys Leu Gln Asn Lys Lys Ser Ser Ala
225                 230                 235                 240
Val

<210> SEQ ID NO 21
<211> LENGTH: 501
<212> TYPE: PRT
<213> ORGANISM: Streptomyces sp.

<400> SEQUENCE: 21

Met Tyr Val Gln Met Val Phe Val Lys Glu Val Pro Val Gln His Pro
1               5                   10                  15
Ser Asp Leu Arg Glu His Ile Glu Ala Leu Glu Lys Leu Gly Asp Leu
                20                  25                  30
Asp Arg Val His Asp Glu Val Asp Trp Asn Leu Glu Ala Ala Ala Gln
            35                  40                  45
Thr Arg Tyr Ser Thr Glu His His Leu Pro Ala Pro Leu Phe Glu Asn
        50                  55                  60
Val Ala Gly Val Ala Glu Gly Phe Arg Leu Leu Gly Ala Pro Ala Ala
65                  70                  75                  80
Leu Ser Ser Asp Pro Ser Arg Pro Tyr Ala Arg Val Ala Leu Ser Val
                85                  90                  95
Gly Leu Arg Pro Glu Ala Thr Gly Arg Glu Val Val Glu His Leu Val
                100                 105                 110
Ala Ala Arg His Arg Pro Gly Val Pro Pro Val Ala Val Ala Ala Glu
            115                 120                 125
Ala Ala Pro Val Lys Ala Asn Val Leu Leu Gly Asp Glu Ala Asp Leu
        130                 135                 140
Asn Arg Phe Pro Val Pro Phe Val His Glu Gly Asp Gly Asn Arg Tyr
```

```
            145                 150                 155                 160

Ala Asn Thr Tyr Gly Val Ile Ile Ala Gln Thr Pro Asp Gly Ser Trp
                165                 170                 175

Thr Asn Trp Ser Ile Ala Arg Ile Met Met Ile Asp Gly Lys His Met
                180                 185                 190

Thr Gly Leu Val Met His Pro Gln His Ile Ala Gln Val Trp Gln Gln
                195                 200                 205

Trp Ala Asp Leu Gly Lys Pro Met Pro Tyr Ala Leu Val Gln Gly Gly
210                 215                 220

Asp Pro Ala Ile Pro Tyr Val Gly Ile Pro Ile Gly Asp Gly Val
225                 230                 235                 240

Ala Glu Ser Ala Tyr Ile Gly Ala Leu Ile Gly Arg Pro Leu Glu Val
                245                 250                 255

Val Lys Ala Glu Leu Ser Asp Leu Met Val Pro Ala Gly Ala Glu Ile
                260                 265                 270

Val Ile Glu Gly His Leu Ser Val Gln Arg Asp Gly Val Glu Gly Pro
                275                 280                 285

Phe Gly Glu Phe Ala Gly Tyr Ile Pro Arg Glu Thr Ser Leu Gln Pro
                290                 295                 300

Val Tyr Thr Val Glu Ala Ile Thr His Arg Asp Ala Pro Ile Trp Pro
305                 310                 315                 320

Leu Val Ala Glu Gly Lys Pro Thr Asp Asp Phe His Thr Val Thr Gly
                325                 330                 335

Ile Gly Glu Ala Ala Gly Ala Leu Asp Ala Ile Arg Glu Ala Gly Leu
                340                 345                 350

Pro Ala Ala Ser Ala Trp Ala Pro Leu Ser Ala Ala Ser His Trp Leu
                355                 360                 365

Val Val Thr Ala Pro Gly Asn Trp Arg Glu Leu Leu Pro Gly Val Ser
                370                 375                 380

Glu Glu Gln Tyr Ala Arg Arg Val Gly Glu Ala Val Phe Gly Thr Lys
385                 390                 395                 400

Phe Gly Ser Cys Leu Pro Gln Val Phe Leu Leu Asp Asp Phe Asp
                405                 410                 415

Pro Thr Asp Asp Ala Asp Leu Leu Trp Ala Leu Ala Thr Arg Val His
                420                 425                 430

Pro Asp Gly Arg Val Val Arg Phe Glu Asp Gly Pro Val Leu Pro Leu
                435                 440                 445

Leu Thr Cys Tyr Thr Pro Gln Glu Arg His Ala Ala Arg Ala Thr Lys
                450                 455                 460

Val Val His Glu Ala Leu Leu Ser Ala Pro Gly Glu Arg Glu Pro Gln
465                 470                 475                 480

Ser Thr Phe Ala Asp Ala Tyr Pro Ala Glu Val Arg Ala Lys Val Arg
                485                 490                 495

Ala Arg Tyr Pro Asn
            500

<210> SEQ ID NO 22
<211> LENGTH: 652
<212> TYPE: PRT
<213> ORGANISM: Escherichia coli
<220> FEATURE:
<223> OTHER INFORMATION: strain K12

<400> SEQUENCE: 22

Met Ser Gln Ile His Lys His Thr Ile Pro Ala Asn Ile Ala Asp Arg
```

```
  1               5                    10                   15
Cys Leu Ile Asn Pro Gln Gln Tyr Glu Ala Met Tyr Gln Gln Ser Ile
             20                  25                  30

Asn Val Pro Asp Thr Phe Trp Gly Glu Gln Gly Lys Ile Leu Asp Trp
             35                  40                  45

Ile Lys Pro Tyr Gln Lys Val Lys Asn Thr Ser Phe Ala Pro Gly Asn
 50                  55                  60

Val Ser Ile Lys Trp Tyr Glu Asp Gly Thr Leu Asn Leu Ala Ala Asn
 65                  70                  75                  80

Cys Leu Asp Arg His Leu Gln Glu Asn Gly Asp Arg Thr Ala Ile Ile
             85                  90                  95

Trp Glu Gly Asp Asp Ala Ser Gln Ser Lys His Ile Ser Tyr Lys Glu
            100                 105                 110

Leu His Arg Asp Val Cys Arg Phe Ala Asn Thr Leu Leu Glu Leu Gly
            115                 120                 125

Ile Lys Lys Gly Asp Val Val Ala Ile Tyr Met Pro Met Val Pro Glu
            130                 135                 140

Ala Ala Val Ala Met Leu Ala Cys Ala Arg Ile Gly Ala Val His Ser
145                 150                 155                 160

Val Ile Phe Gly Gly Phe Ser Pro Glu Ala Val Ala Gly Arg Ile Ile
            165                 170                 175

Asp Ser Asn Ser Arg Leu Val Ile Thr Ser Asp Glu Gly Val Arg Ala
            180                 185                 190

Gly Arg Ser Ile Pro Leu Lys Lys Asn Val Asp Asp Ala Leu Lys Asn
            195                 200                 205

Pro Asn Val Thr Ser Val Glu His Val Val Leu Lys Arg Thr Gly
210                 215                 220

Gly Lys Ile Asp Trp Gln Glu Gly Arg Asp Leu Trp Trp His Asp Leu
225                 230                 235                 240

Val Glu Gln Ala Ser Asp Gln His Gln Ala Glu Glu Met Asn Ala Glu
            245                 250                 255

Asp Pro Leu Phe Ile Leu Tyr Thr Ser Gly Ser Thr Gly Lys Pro Lys
            260                 265                 270

Gly Val Leu His Thr Thr Gly Gly Tyr Leu Val Tyr Ala Ala Leu Thr
            275                 280                 285

Phe Lys Tyr Val Phe Asp Tyr His Pro Gly Asp Ile Tyr Trp Cys Thr
            290                 295                 300

Ala Asp Val Gly Trp Val Thr Gly His Ser Tyr Leu Leu Tyr Gly Pro
305                 310                 315                 320

Leu Ala Cys Gly Ala Thr Thr Leu Met Phe Glu Gly Val Pro Asn Trp
            325                 330                 335

Pro Thr Pro Ala Arg Met Ala Gln Val Val Asp Lys His Gln Val Asn
            340                 345                 350

Ile Leu Tyr Thr Ala Pro Thr Ala Ile Arg Ala Leu Met Ala Glu Gly
            355                 360                 365

Asp Lys Ala Ile Glu Gly Thr Asp Arg Ser Ser Leu Arg Ile Leu Gly
            370                 375                 380

Ser Val Gly Glu Pro Ile Asn Pro Glu Ala Trp Glu Trp Tyr Trp Lys
385                 390                 395                 400

Lys Ile Gly Asn Glu Lys Cys Pro Val Val Asp Thr Trp Trp Gln Thr
            405                 410                 415

Glu Thr Gly Gly Phe Met Ile Thr Pro Leu Pro Gly Ala Thr Glu Leu
            420                 425                 430
```

Lys Ala Gly Ser Ala Thr Arg Pro Phe Phe Gly Val Gln Pro Ala Leu
            435                 440                 445

Val Asp Asn Glu Gly Asn Pro Leu Glu Gly Ala Thr Glu Gly Ser Leu
    450                 455                 460

Val Ile Thr Asp Ser Trp Pro Gly Gln Ala Arg Thr Leu Phe Gly Asp
465                 470                 475                 480

His Glu Arg Phe Glu Gln Thr Tyr Phe Ser Thr Phe Lys Asn Met Tyr
            485                 490                 495

Phe Ser Gly Asp Gly Ala Arg Arg Asp Glu Asp Gly Tyr Tyr Trp Ile
            500                 505                 510

Thr Gly Arg Val Asp Asp Val Leu Asn Val Ser Gly His Arg Leu Gly
            515                 520                 525

Thr Ala Glu Ile Glu Ser Ala Leu Val Ala His Pro Lys Ile Ala Glu
            530                 535                 540

Ala Ala Val Val Gly Ile Pro His Asn Ile Lys Gly Gln Ala Ile Tyr
545                 550                 555                 560

Ala Tyr Val Thr Leu Asn His Gly Glu Glu Pro Ser Pro Glu Leu Tyr
                565                 570                 575

Ala Glu Val Arg Asn Trp Val Arg Lys Glu Ile Gly Pro Leu Ala Thr
            580                 585                 590

Pro Asp Val Leu His Trp Thr Asp Ser Leu Pro Lys Thr Arg Ser Gly
            595                 600                 605

Lys Ile Met Arg Arg Ile Leu Arg Lys Ile Ala Ala Gly Asp Thr Ser
            610                 615                 620

Asn Leu Gly Asp Thr Ser Thr Leu Ala Asp Pro Gly Val Val Glu Lys
625                 630                 635                 640

Leu Leu Glu Glu Lys Gln Ala Ile Ala Met Pro Ser
                645                 650

<210> SEQ ID NO 23
<211> LENGTH: 566
<212> TYPE: PRT
<213> ORGANISM: Escherichia coli
<220> FEATURE:
<223> OTHER INFORMATION: strain K12

<400> SEQUENCE: 23

Met His Pro Thr Gly Pro His Leu Gly Pro Asp Val Leu Phe Arg Glu
1               5                   10                  15

Ser Asn Met Lys Val Thr Leu Thr Phe Asn Glu Gln Arg Arg Ala Ala
            20                  25                  30

Tyr Arg Gln Gln Gly Leu Trp Gly Asp Ala Ser Leu Ala Asp Tyr Trp
        35                  40                  45

Gln Gln Thr Ala Arg Ala Met Pro Asp Lys Ile Ala Val Val Asp Asn
    50                  55                  60

His Gly Ala Ser Tyr Thr Tyr Ser Ala Leu Asp His Ala Ala Ser Cys
65                  70                  75                  80

Leu Ala Asn Trp Met Leu Ala Lys Gly Ile Glu Ser Gly Asp Arg Ile
                85                  90                  95

Ala Phe Gln Leu Pro Gly Trp Cys Glu Phe Thr Val Ile Tyr Leu Ala
            100                 105                 110

Cys Leu Lys Ile Gly Ala Val Ser Val Pro Leu Leu Pro Ser Trp Arg
        115                 120                 125

Glu Ala Glu Leu Val Trp Val Leu Asn Lys Cys Gln Ala Lys Met Phe
    130                 135                 140

```
Phe Ala Pro Thr Leu Phe Lys Gln Thr Arg Pro Val Asp Leu Ile Leu
145                 150                 155                 160

Pro Leu Gln Asn Gln Leu Pro Gln Leu Gln Gln Ile Val Gly Val Asp
            165                 170                 175

Lys Leu Ala Pro Ala Thr Ser Ser Leu Ser Leu Ser Gln Ile Ile Ala
            180                 185                 190

Asp Asn Thr Ser Leu Thr Thr Ala Ile Thr Thr His Gly Asp Glu Leu
            195                 200                 205

Ala Ala Val Leu Phe Thr Ser Gly Thr Glu Gly Leu Pro Lys Gly Val
            210                 215                 220

Met Leu Thr His Asn Asn Ile Leu Ala Ser Glu Arg Ala Tyr Cys Ala
225                 230                 235                 240

Arg Leu Asn Leu Thr Trp Gln Asp Val Phe Met Met Pro Ala Pro Leu
            245                 250                 255

Gly His Ala Thr Gly Phe Leu His Gly Val Thr Ala Pro Phe Leu Ile
            260                 265                 270

Gly Ala Arg Ser Val Leu Leu Asp Ile Phe Thr Pro Asp Ala Cys Leu
            275                 280                 285

Ala Leu Leu Glu Gln Gln Arg Cys Thr Cys Met Leu Gly Ala Thr Pro
290                 295                 300

Phe Val Tyr Asp Leu Leu Asn Val Leu Glu Lys Gln Pro Ala Asp Leu
305                 310                 315                 320

Ser Ala Leu Arg Phe Phe Leu Cys Gly Gly Thr Thr Ile Pro Lys Lys
            325                 330                 335

Val Ala Arg Glu Cys Gln Gln Arg Gly Ile Lys Leu Leu Ser Val Tyr
            340                 345                 350

Gly Ser Thr Glu Ser Ser Pro His Ala Val Val Asn Leu Asp Asp Pro
            355                 360                 365

Leu Ser Arg Phe Met His Thr Asp Gly Tyr Ala Ala Ala Gly Val Glu
            370                 375                 380

Ile Lys Val Val Asp Asp Ala Arg Lys Thr Leu Pro Pro Gly Cys Glu
385                 390                 395                 400

Gly Glu Glu Ala Ser Arg Gly Pro Asn Val Phe Met Gly Tyr Phe Asp
            405                 410                 415

Glu Pro Glu Leu Thr Ala Arg Ala Leu Asp Glu Glu Gly Trp Tyr Tyr
            420                 425                 430

Ser Gly Asp Leu Cys Arg Met Asp Glu Ala Gly Tyr Ile Lys Ile Thr
            435                 440                 445

Gly Arg Lys Lys Asp Ile Ile Val Arg Gly Gly Glu Asn Ile Ser Ser
            450                 455                 460

Arg Glu Val Glu Asp Ile Leu Leu Gln His Pro Lys Ile His Asp Ala
465                 470                 475                 480

Cys Val Val Ala Met Ser Asp Glu Arg Leu Gly Glu Arg Ser Cys Ala
            485                 490                 495

Tyr Val Val Leu Lys Ala Pro His His Ser Leu Ser Leu Glu Glu Val
            500                 505                 510

Val Ala Phe Phe Ser Arg Lys Arg Val Ala Lys Tyr Lys Tyr Pro Glu
            515                 520                 525

His Ile Val Val Ile Glu Lys Leu Pro Arg Thr Thr Ser Gly Lys Ile
            530                 535                 540

Gln Lys Phe Leu Leu Arg Lys Asp Ile Met Arg Arg Leu Thr Gln Asp
545                 550                 555                 560
```

-continued

```
Val Cys Glu Glu Ile Glu
            565

<210> SEQ ID NO 24
<211> LENGTH: 561
<212> TYPE: PRT
<213> ORGANISM: Escherichia coli
<220> FEATURE:
<223> OTHER INFORMATION: strain K12

<400> SEQUENCE: 24

Met Lys Lys Val Trp Leu Asn Arg Tyr Pro Ala Asp Val Pro Thr Glu
1               5                   10                  15

Ile Asn Pro Asp Arg Tyr Gln Ser Leu Val Asp Met Phe Glu Gln Ser
            20                  25                  30

Val Ala Arg Tyr Ala Asp Gln Pro Ala Phe Val Asn Met Gly Glu Val
        35                  40                  45

Met Thr Phe Arg Lys Leu Glu Glu Arg Ser Arg Ala Phe Ala Ala Tyr
    50                  55                  60

Leu Gln Gln Gly Leu Gly Leu Lys Lys Gly Asp Arg Val Ala Leu Met
65                  70                  75                  80

Met Pro Asn Leu Leu Gln Tyr Pro Val Ala Leu Phe Gly Ile Leu Arg
                85                  90                  95

Ala Gly Met Ile Val Val Asn Val Asn Pro Leu Tyr Thr Pro Arg Glu
            100                 105                 110

Leu Glu His Gln Leu Asn Asp Ser Gly Ala Ser Ala Ile Val Ile Val
        115                 120                 125

Ser Asn Phe Ala His Thr Leu Glu Lys Val Val Asp Lys Thr Ala Val
    130                 135                 140

Gln His Val Ile Leu Thr Arg Met Gly Asp Gln Leu Ser Thr Ala Lys
145                 150                 155                 160

Gly Thr Val Val Asn Phe Val Val Lys Tyr Ile Lys Arg Leu Val Pro
                165                 170                 175

Lys Tyr His Leu Pro Asp Ala Ile Ser Phe Arg Ser Ala Leu His Asn
            180                 185                 190

Gly Tyr Arg Met Gln Tyr Val Lys Pro Glu Leu Val Pro Glu Asp Leu
        195                 200                 205

Ala Phe Leu Gln Tyr Thr Gly Gly Thr Thr Gly Val Ala Lys Gly Ala
    210                 215                 220

Met Leu Thr His Arg Asn Met Leu Ala Asn Leu Glu Gln Val Asn Ala
225                 230                 235                 240

Thr Tyr Gly Pro Leu Leu His Pro Gly Lys Glu Leu Val Val Thr Ala
                245                 250                 255

Leu Pro Leu Tyr His Ile Phe Ala Leu Thr Ile Asn Cys Leu Leu Phe
            260                 265                 270

Ile Glu Leu Gly Gly Gln Asn Leu Leu Ile Thr Asn Pro Arg Asp Ile
        275                 280                 285

Pro Gly Leu Val Lys Glu Leu Ala Lys Tyr Pro Phe Thr Ala Ile Thr
    290                 295                 300

Gly Val Asn Thr Leu Phe Asn Ala Leu Leu Asn Asn Lys Glu Phe Gln
305                 310                 315                 320

Gln Leu Asp Phe Ser Ser Leu His Leu Ser Ala Gly Gly Gly Met Pro
                325                 330                 335

Val Gln Gln Val Val Ala Glu Arg Trp Val Lys Leu Thr Gly Gln Tyr
            340                 345                 350
```

```
Leu Leu Glu Gly Tyr Gly Leu Thr Glu Cys Ala Pro Leu Val Ser Val
            355                 360                 365

Asn Pro Tyr Asp Ile Asp Tyr His Ser Gly Ser Ile Gly Leu Pro Val
370                 375                 380

Pro Ser Thr Glu Ala Lys Leu Val Asp Asp Asp Asn Glu Val Pro
385                 390                 395                 400

Pro Gly Gln Pro Gly Glu Leu Cys Val Lys Gly Pro Gln Val Met Leu
                405                 410                 415

Gly Tyr Trp Gln Arg Pro Asp Ala Thr Asp Glu Ile Ile Lys Asn Gly
            420                 425                 430

Trp Leu His Thr Gly Asp Ile Ala Val Met Asp Glu Glu Gly Phe Leu
            435                 440                 445

Arg Ile Val Asp Arg Lys Lys Asp Met Ile Leu Val Ser Gly Phe Asn
450                 455                 460

Val Tyr Pro Asn Glu Ile Glu Asp Val Val Met Gln His Pro Gly Val
465                 470                 475                 480

Gln Glu Val Ala Ala Val Gly Val Pro Ser Gly Ser Ser Gly Glu Ala
                485                 490                 495

Val Lys Ile Phe Val Val Lys Lys Asp Pro Ser Leu Thr Glu Glu Ser
            500                 505                 510

Leu Val Thr Phe Cys Arg Arg Gln Leu Thr Gly Tyr Lys Val Pro Lys
            515                 520                 525

Leu Val Glu Phe Arg Asp Glu Leu Pro Lys Ser Asn Val Gly Lys Ile
            530                 535                 540

Leu Arg Arg Glu Leu Arg Asp Glu Ala Arg Gly Lys Val Asp Asn Lys
545                 550                 555                 560

Ala

<210> SEQ ID NO 25
<211> LENGTH: 512
<212> TYPE: PRT
<213> ORGANISM: Hypocrea atroviridis
<220> FEATURE:
<223> OTHER INFORMATION: Hypocrea atroviridis (strain ATCC 20476)

<400> SEQUENCE: 25

Met Ser Ser Thr Thr Tyr Lys Ser Glu Ala Phe Asp Pro Glu Pro Pro
1               5                   10                  15

His Leu Ser Phe Arg Ser Phe Val Glu Ala Leu Arg Gln Asp Asn Asp
            20                  25                  30

Leu Val Asp Ile Asn Glu Pro Val Asp Pro Asp Leu Glu Ala Ala Ala
        35                  40                  45

Ile Thr Arg Leu Val Cys Glu Thr Asp Lys Ala Pro Leu Phe Asn
    50                  55                  60

Asn Val Ile Gly Ala Lys Asp Gly Leu Trp Arg Ile Leu Gly Ala Pro
65                  70                  75                  80

Ala Ser Leu Arg Ser Ser Pro Lys Glu Arg Phe Gly Arg Leu Ala Arg
                85                  90                  95

His Leu Ala Leu Pro Pro Thr Ala Ser Ala Lys Asp Ile Leu Asp Lys
            100                 105                 110

Met Leu Ser Ala Asn Ser Ile Pro Pro Ile Glu Pro Val Ile Val Pro
            115                 120                 125

Thr Gly Pro Val Lys Glu Asn Ser Ile Glu Gly Glu Asn Ile Asp Leu
        130                 135                 140

Glu Ala Leu Pro Ala Pro Met Val His Gln Ser Asp Gly Gly Lys Tyr
```

```
           145                 150                 155                 160
        Ile Gln Thr Tyr Gly Met His Val Ile Gln Ser Pro Asp Gly Cys Trp
                        165                 170                 175

Thr Asn Trp Ser Ile Ala Arg Ala Met Val Ser Gly Lys Arg Thr Leu
                        180                 185                 190

Ala Gly Leu Val Ile Ser Pro Gln His Ile Arg Lys Ile Gln Asp Gln
                        195                 200                 205

Trp Arg Ala Ile Gly Gln Glu Ile Pro Trp Ala Leu Ala Phe Gly
            210                 215                 220

Val Pro Pro Thr Ala Ile Met Ala Ser Ser Met Pro Ile Pro Asp Gly
        225                 230                 235                 240

Val Ser Glu Ala Gly Tyr Val Gly Ala Ile Ala Gly Glu Pro Ile Lys
                        245                 250                 255

Leu Val Lys Cys Asp Thr Asn Asn Leu Tyr Val Pro Ala Asn Ser Glu
                        260                 265                 270

Ile Val Leu Glu Gly Thr Leu Ser Thr Thr Lys Met Ala Pro Glu Gly
                        275                 280                 285

Pro Phe Gly Glu Met His Gly Tyr Val Tyr Pro Gly Glu Ser His Pro
                        290                 295                 300

Gly Pro Val Tyr Thr Val Asn Lys Ile Thr Tyr Arg Asn Asn Ala Ile
        305                 310                 315                 320

Leu Pro Met Ser Ala Cys Gly Arg Leu Thr Asp Glu Thr Gln Thr Met
                        325                 330                 335

Ile Gly Thr Leu Ala Ala Ala Glu Ile Arg Gln Leu Cys Gln Asp Ala
                        340                 345                 350

Gly Leu Pro Ile Thr Asp Ala Phe Ala Pro Phe Val Gly Gln Ala Thr
                        355                 360                 365

Trp Val Ala Leu Lys Val Asp Thr Lys Arg Leu Arg Ala Met Lys Thr
                        370                 375                 380

Asn Gly Lys Ala Phe Ala Lys Arg Val Gly Asp Val Phe Thr Gln
        385                 390                 395                 400

Lys Pro Gly Phe Thr Ile His Arg Leu Ile Leu Val Gly Asp Asp Ile
                        405                 410                 415

Asp Val Tyr Asp Asp Lys Asp Val Met Trp Ala Phe Thr Thr Arg Cys
                        420                 425                 430

Arg Pro Gly Thr Asp Glu Val Phe Phe Asp Val Val Gly Phe Gln
                        435                 440                 445

Leu Ile Pro Tyr Met Ser His Gly Asn Ala Glu Ala Ile Lys Gly Gly
            450                 455                 460

Lys Val Val Ser Asp Ala Leu Leu Thr Ala Glu Tyr Thr Thr Gly Lys
        465                 470                 475                 480

Asp Trp Glu Ser Ala Asp Phe Lys Asn Ser Tyr Pro Lys Ser Ile Gln
                        485                 490                 495

Asp Lys Val Leu Asn Ser Trp Glu Arg Leu Gly Phe Lys Lys Leu Asp
                        500                 505                 510

<210> SEQ ID NO 26
<211> LENGTH: 501
<212> TYPE: PRT
<213> ORGANISM: Streptomyces sp. 769
<220> FEATURE:
<223> OTHER INFORMATION: Streptomyces sp. 769

<400> SEQUENCE: 26

Met Tyr Val Gln Met Val Phe Val Lys Glu Val Pro Val Gln His Pro
```

```
  1               5                   10                  15
Ser Asp Leu Arg Glu His Ile Glu Ala Leu Glu Lys Leu Gly Asp Leu
                20                  25                  30
Asp Arg Val His Asp Glu Val Asp Trp Asn Leu Glu Ala Ala Ala Gln
                35                  40                  45
Thr Arg Tyr Ser Thr Glu His His Leu Pro Ala Pro Leu Phe Glu Asn
                50                  55                  60
Val Ala Gly Val Ala Glu Gly Phe Arg Leu Leu Gly Ala Pro Ala Ala
 65                 70                  75                  80
Leu Ser Ser Asp Pro Ser Arg Pro Tyr Ala Arg Val Ala Leu Ser Val
                85                  90                  95
Gly Leu Arg Pro Glu Ala Thr Gly Arg Glu Val Val Glu His Leu Val
                100                 105                 110
Ala Ala Arg His Arg Pro Gly Val Pro Pro Val Ala Val Ala Ala Glu
                115                 120                 125
Ala Ala Pro Val Lys Ala Asn Val Leu Leu Gly Asp Glu Ala Asp Leu
                130                 135                 140
Asn Arg Phe Pro Val Pro Phe Val His Glu Gly Asp Gly Asn Arg Tyr
145                 150                 155                 160
Ala Asn Thr Tyr Gly Val Ile Ile Ala Gln Thr Pro Asp Gly Ser Trp
                165                 170                 175
Thr Asn Trp Ser Ile Ala Arg Ile Met Met Ile Asp Gly Lys His Met
                180                 185                 190
Thr Gly Leu Val Met His Pro Gln His Ile Ala Gln Val Trp Gln Gln
                195                 200                 205
Trp Ala Asp Leu Gly Lys Pro Met Pro Tyr Ala Leu Val Gln Gly Gly
                210                 215                 220
Asp Pro Ala Ile Pro Tyr Val Gly Gly Ile Pro Ile Gly Asp Gly Val
225                 230                 235                 240
Ala Glu Ser Ala Tyr Ile Gly Ala Leu Ile Gly Arg Pro Leu Glu Val
                245                 250                 255
Val Lys Ala Glu Leu Ser Asp Leu Met Val Pro Ala Gly Ala Glu Ile
                260                 265                 270
Val Ile Glu Gly His Leu Ser Val Gln Arg Asp Gly Val Glu Gly Pro
                275                 280                 285
Phe Gly Glu Phe Ala Gly Tyr Ile Pro Arg Glu Thr Ser Leu Gln Pro
                290                 295                 300
Val Tyr Thr Val Glu Ala Ile Thr His Arg Asp Ala Pro Ile Trp Pro
305                 310                 315                 320
Leu Val Ala Glu Gly Lys Pro Thr Asp Asp Phe His Thr Val Thr Gly
                325                 330                 335
Ile Gly Glu Ala Ala Gly Ala Leu Asp Ala Ile Arg Glu Ala Gly Leu
                340                 345                 350
Pro Ala Ala Ser Ala Trp Ala Pro Leu Ser Ala Ser His Trp Leu
                355                 360                 365
Val Val Thr Ala Pro Gly Asn Trp Arg Glu Leu Leu Pro Gly Val Ser
                370                 375                 380
Glu Glu Gln Tyr Ala Arg Arg Val Gly Glu Ala Val Phe Gly Thr Lys
385                 390                 395                 400
Phe Gly Ser Cys Leu Pro Gln Val Phe Leu Leu Asp Asp Phe Asp
                405                 410                 415
Pro Thr Asp Asp Ala Asp Leu Leu Trp Ala Leu Ala Thr Arg Val His
                420                 425                 430
```

-continued

```
Pro Asp Gly Arg Val Val Arg Phe Glu Asp Gly Pro Val Leu Pro Leu
        435                 440                 445

Leu Thr Cys Tyr Thr Pro Gln Glu Arg His Ala Ala Arg Ala Thr Lys
    450                 455                 460

Val Val His Glu Ala Leu Leu Ser Ala Pro Gly Glu Arg Glu Pro Gln
465                 470                 475                 480

Ser Thr Phe Ala Asp Ala Tyr Pro Ala Glu Val Arg Ala Lys Val Arg
                485                 490                 495

Ala Arg Tyr Pro Asn
            500
```

MEANS AND METHODS FOR PRODUCING ISOBUTENE FROM ACETYL-CoA

CROSS-REFERENCE TO RELATED APPLICATIONS

This application is a national stage application under 35 U.S.C. § 371, of International Application No. PCT/EP2020/057607, filed Mar. 19, 2020, which claims benefit of priority to European Application No. 19163981.4, filed Mar. 20, 2019, and European Application No. 19209153.6, filed Nov. 14, 2019, each of which is incorporated herein by reference in its entirety.

The present invention relates to a recombinant organism or microorganism which is capable of enzymatically converting acetyl-CoA into isobutene, (A) wherein in said organism or microorganism: (i) acetyl-CoA is enzymatically converted into acetoacetyl-CoA, (ii) acetoacetyl-CoA is enzymatically converted into 3-hydroxy-3-methylglutaryl-CoA, (iii) 3-hydroxy-3-methylglutaryl-CoA is enzymatically converted into 3-methylglutaconyl-CoA, (iv) 3-methylglutaconyl-CoA is enzymatically converted into 3-methylcrotonyl-CoA, and (v) wherein said 3-methylcrotonyl-CoA is converted into isobutene by: (a) enzymatically converting 3-methylcrotonyl-CoA into 3-methylcrotonic acid which is then further enzymatically converted into said isobutene; or (b) enzymatically converting 3-methylcrotonyl-CoA into 3-hydroxy-3-methylbutyryl-CoA which is then further enzymatically converted into 3-hydroxy-3-methylbutyric acid which is then further enzymatically converted into 3-phosphonoxy-3-methylbutyric acid which is then further enzymatically converted into said isobutene; (B) wherein said recombinant organism or microorganism has an increased pool of coenzyme A (CoA) over the organism or microorganism from which it is derived due to: (i) an increased uptake of pantothenate; and/or (ii) an increased conversion of pantothenate into CoA. Moreover, the present invention relates to the use of such a recombinant organism or microorganism for the production of isobutene. Further, the present invention relates to a method for the production of isobutene by culturing such a recombinant organism or microorganism in a suitable culture medium under suitable conditions.

A large number of chemical compounds are currently derived from petrochemicals. Alkenes (such as ethylene, propylene, the different butenes, or else the pentenes, for example) are used in the plastics industry, for example for producing polypropylene or polyethylene, and in other areas of the chemical industry and that of fuels. Butylene exists in four forms, one of which, isobutene (also referred to as isobutylene), enters into the composition of methyl-tert-butyl-ether (MTBE), an anti-knock additive for automobile fuel. Isobutene can also be used to produce isooctene, which in turn can be reduced to isooctane (2,2,4-trimethylpentane); the very high octane rating of isooctane makes it the best fuel for so-called "gasoline" engines. Alkenes such as isobutene are currently produced by catalytic cracking of petroleum products (or by a derivative of the Fischer-Tropsch process in the case of hexene, from coal or gas). The production costs are therefore tightly linked to the price of oil. Moreover, catalytic cracking is sometimes associated with considerable technical difficulties which increase process complexity and production costs.

The production by a biological pathway of alkenes such as isobutene is called for in the context of a sustainable industrial operation in harmony with geochemical cycles. The first generation of biofuels consisted in the fermentative production of ethanol, as fermentation and distillation processes already existed in the food processing industry. The production of second generation biofuels is in an exploratory phase, encompassing in particular the production of long chain alcohols (butanol and pentanol), terpenes, linear alkanes and fatty acids. Two recent reviews provide a general overview of research in this field: Ladygina et alt (Process Biochemistry 41 (2006), 1001) and Wackett (Current Opinions in Chemical Biology 21 (2008), 187). The conversion of isovalerate to isobutene by the yeast *Rhodotorula minuta* has been described (Fujii et al. (Appt. Environ. Microbiol. 54 (1988), 583)), but the efficiency of this reaction is far from permitting an industrial application. The reaction mechanism was elucidated by Fukuda et al. (BBRC 201 (1994), 516) and involves a cytochrome P450 enzyme which decarboxylates isovalerate by reduction of an oxo-ferryl group $Fe^v=O$. Large-scale biosynthesis of isobutene by this pathway seems highly unfavourable, since it would require the synthesis and degradation of one molecule of leucine to form one molecule of isobutene. Also, the enzyme catalyzing the reaction uses heme as cofactor, poorly lending itself to recombinant expression in bacteria and to improvement of enzyme parameters. For all these reasons, it appears very unlikely that this pathway can serve as a basis for industrial exploitation. Other microorganisms have been described as being marginally capable of naturally producing isobutene from isovalerate; the yields obtained are even lower than those obtained with *Rhodotorula minuta* (Fukuda et al. (Agric. Biol, Chem. 48 (1984), 1679)).

Gogerty et al. (Appl. Environm. Microbiol. 76 (2010), 8004-8010) and van Leeuwen et al. (Appl. Microbiol. Biotechnol. 93 (2012), 1377-1387) describe the production of isobutene from acetoacetyl-CoA by enzymatic conversions wherein the last step of the proposed pathway is the conversion of 3-hydroxy-3-methylbutyric acid (also referred to as 3-hydroxyisovalerate (HIV)) by making use of a mevalonate diphosphate decarboxylase.

This reaction for the production of isobutene from 3-hydroxy-3-methylbutyric acid is also described in WO2010/001078 which, in general terms, describes methods for generating alkenes through a biological process, in particular methods for producing terminal alkenes (in particular propylene, ethylene, 1-butylene, isobutylene or isoamylene) from molecules of the 3-hydroxyalkanoate type.

WO2012/052427 also describes a method for generating alkenes through a biological process while, in particular, a method for producing alkenes (for example propylene, ethylene, 1-butylene, isobutylene or isoamylene) from molecules of the 3-hydroxyalkanoate type is described. In this context, the reaction for the production of isobutene from 3-hydroxy-3-methylbutyric acid is also described in WO2012/052427. WO 2016/042012 describes methods for producing said 3-hydroxy-3-methylbutyric acid. In particular, WO 2016/042012 describes methods for producing 3-hydroxy-3-methylbutyric acid comprising the step of enzymatically converting 3-methylcrotonyl-CoA into 3-methylcrotonic acid and the step of enzymatically further converting the thus produced 3-methylcrotonic acid into 3-hydroxy-3-methylbutyric acid.

In Gogerty et al. (loc. cit.) and in van Leeuwen et al. (loc. cit.) the production of 3-hydroxy-3-methylbutyric acid is proposed to be achieved by the conversion of 3-methylcrotonyl-CoA via 3-hydroxy-3-methylbutyryl-CoA. In order to further improve the efficiency and variability of methods for producing isobutene from renewable resources, alternative routes for the provision of isobutene and its precursors have been developed by providing methods for the production of isobutene comprising the enzymatic conversion of 3-methylcrotonic acid (also termed 3-methyl-2-butenoic acid, 3,3-dimethylacrylic acid or senecioic acid) into isubutene.

In particular, in WO 2017/085167, methods for the production of isobutene have been described comprising the enzymatic conversion of 3-methylcrotonic acid into isobutene, wherein the enzymatic conversion of 3-methylcrotonic acid into isobutene is achieved by making use of an FMN-dependent decarboxylase associated with an FMN prenyl transferase, wherein said FMN prenyl transferase catalyzes the prenylation of a flavin cofactor (FMN or FAD) utilizing dimethylallyl phosphate (DMAP) into a flavin-derived cofactor while these enzymes have artificially been implemented in a pathway which ultimately leads to the production of isobutene. Moreover, in WO 2017/085167, methods have been described, wherein such a method further comprises (a) providing the 3-methylcrotonic acid by the enzymatic conversion of 3-methylcrotonyl-CoA into 3-methylcrotonic acid, or (b) providing the 3-methylcrotonic acid by the enzymatic conversion of 3-hydroxyisovalerate (HIV) into 3-methylcrotonic acid.

WO 2017/085167 also describes that this method which has been developed for the production of isobutene from 3-methylcrotonyl-CoA via 3-methylcrotonic acid or from 3-hydroxyisovalerate (HIV) via 3-methylcrotonic acid may be embedded in a pathway for the production of isobutene starting from acetyl-CoA which is a central component and an important key molecule in metabolism used in many biochemical reactions. The corresponding reactions are schematically shown in FIG. 1.

In WO 2018/206262 it is described that 3-methylcrotonic acid is enzymatically converted into isobutene by making use of an FMN-dependent decarboxylase associated with an FMN prenyl transferase when dimethylallyl pyrophosphate (DMAPP) instead of DMAP is used.

WO 2018/206262, moreover, describes that the enzymatic conversion of 3-methylcrotonic acid into isobutene which is achieved by making use of an FMN-dependent decarboxylase associated with an FMN prenyl transferase, wherein said FMN prenyl transferase catalyzes the prenylation of a flavin cofactor (FMN or FAD) utilizing dimethylallyl phosphate (DMAP) and/or dimethylallyl pyrophosphate (DMAPP) into a flavin-derived cofactor is a key step of the above overall metabolic pathway from acetyl-CoA into isobutene. It has been found that in this key step, the availability of dimethylallyl phosphate (DMAP) and/or dimethylallyl pyrophosphate (DMAPP) as well as the availability of the flavin cofactor FMN are limiting factors while in WO 2018/206262 improved methods by increasing the pool/amount of dimethylallyl phosphate (DMAP) and/or dimethylallyl pyrophosphate (DMAPP) in order to ensure the efficient biosynthesis of the prenylated flavin cofactor (FMN or FAD) are described.

Although, as described above, various approaches have been described in the prior art for producing isobutene by enzymatic conversions in biological systems, thereby allowing to use renewable resources as raw material, there is still a need to improve efficiency and effectiveness of such methods in order to increase yield and make them commercially attractive.

The present invention meets this demand by providing a recombinant organism or microorganism which is capable of enzymatically converting acetyl-CoA into isobutene,
(A) wherein in said organism or microorganism:
  (i) acetyl-CoA is enzymatically converted into acetoacetyl-CoA,
  (ii) acetoacetyl-CoA is enzymatically converted into 3-hydroxy-3-methylglutaryl-CoA,
  (iii) 3-hydroxy-3-methylglutaryl-CoA is enzymatically converted into 3-methylglutaconyl-CoA,
  (iv) 3-methylglutaconyl-CoA is enzymatically converted into 3-methylcrotonyl-CoA, and
  (v) wherein said 3-methylcrotonyl-CoA is converted into isobutene by:
    (a) enzymatically converting 3-methylcrotonyl-CoA into 3-methylcrotonic acid which is then further enzymatically converted into said isobutene; or
    (b) enzymatically converting 3-methylcrotonyl-CoA into 3-hydroxy-3-methylbutyryl-CoA which is then further enzymatically converted into 3-hydroxy-3-methylbutyric acid which is then further enzymatically converted into 3-phosphonoxy-3-methylbutyric acid which is then further enzymatically converted into said isobutene;
(B) wherein said recombinant organism or microorganism has an increased pool of coenzyme A (CoA) over the organism or microorganism from which it is derived due to:
  (i) an increased uptake of pantothenate; and/or
  (ii) an increased conversion of pantothenate into CoA.

Moreover, the present invention provides a use of the recombinant organism or microorganism as defined above for the production of isobutene.

Further, the present invention provides a method for the production of isobutene by culturing a recombinant organism or microorganism as defined above in a suitable culture medium under suitable conditions.

Finally, the present invention provides a method for the production of isobutene from acetyl-CoA in a recombinant organism or microorganism comprising:
(A) (i) enzymatically converting acetyl-CoA into acetoacetyl-CoA,
  (ii) enzymatically converting said produced acetoacetyl-CoA into 3-hydroxy-3-methylglutaryl-CoA,
  (iii) enzymatically converting said produced 3-hydroxy-3-methylglutaryl-CoA into 3-methylglutaconyl-CoA,
  (iv) enzymatically converting said produced 3-methylglutaconyl-CoA into 3-methylcrotonyl-CoA, and
  (v) enzymatically converting said produced 3-methylcrotonyl-CoA into isobutene by:
    (a) enzymatically converting 3-methylcrotonyl-CoA into 3-methylcrotonic acid which is then further enzymatically converted into said isobutene; or
    (b) enzymatically converting 3-methylcrotonyl-CoA into 3-hydroxy-3-methylbutyryl-CoA which is then further enzymatically converted into 3-hydroxy-3-methylbutyric acid which is then further enzymatically converted into 3-phosphonoxy-3-methylbutyric acid which is then further enzymatically converted into said isobutene;
(B) wherein said method further comprises: enzymatically providing acetyl-CoA from CoA,
(C) wherein said method further comprises providing coenzyme A (CoA) by the culturing of a recombinant organism or microorganism in a suitable culture medium under suitable conditions, wherein said recombinant organism or microorganism has an increased pool of coenzyme A (CoA) over the organism or microorganism from which it is derived due to:
  (i) increased uptake of pantothenate; and/or
  (ii) the increased conversion of pantothenate into CoA.

The present invention is based on the concept of increasing the yield of isobutene by providing and maintaining a high pool of acetyl-CoA in a cells used for isobutene production wherein the acetyl-CoA pool is kept high by ensuring an increased uptake of pantothenate by the cell and/or an increased conversion of pantothenate into CoA.

Figure 2:
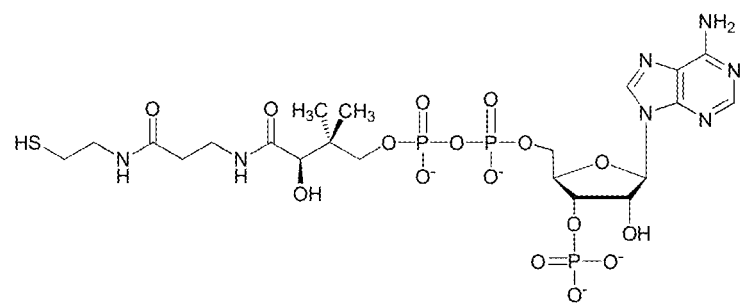

Acetyl-CoA is the acetylated form of Coenzyme A (CoASH or CoA). The chemical structure of CoA is shown in FIG. 2. CoA consists of a β-mercaptoethylamine group linked to the vitamin pantothenic acid through an amide linkage and 3'-phosphorylated ADP. In acetyl-CoA, the acetyl group of acetyl-CoA is linked to the sulfhydryl substituent of the β-mercaptoethylamine group. This thioester linkage is a "high energy" bond which is particularly reactive.

The recombinant organism or microorganism as well as the method according to the present invention are in particular useful for large scale production of isobutene in vitro or in vivo, in particular for a commercial production. Thus, the present invention relates to a method for large scale production, in particular the commercial production of isobutene wherein said method comprises the steps as described above.

The Enzymatic Conversion of Acetyl-CoA into Isobutene

Figure 3:
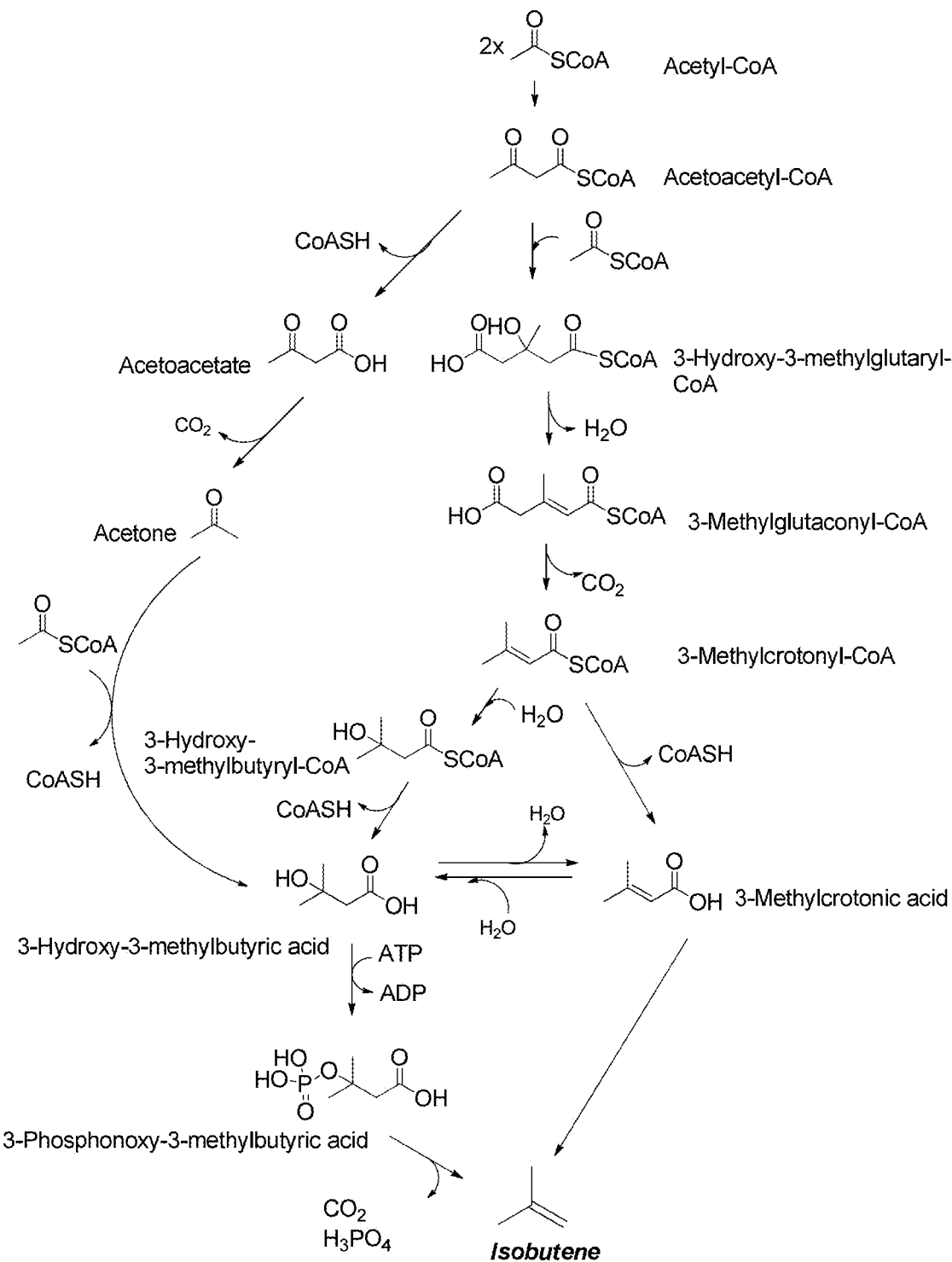

As mentioned above, methods for the production of isobutene from 3-methylcrotonyl-CoA via 3-methylcrotonic acid or from 3-hydroxyisovalerate (HIV) via 3-methylcrotonic acid have been described (see FIG. 1 as well as the right route of the pathway as shown in FIG. 3 for an overview). Methods as well as recombinant organisms and microorganisms utilizing these pathways and enzymatic conversions have, in particular, been described in WO 2017/085167 and WO 2018/206262.

Moreover, methods for the production of isobutene from 3-methylcrotonyl-CoA via 3-hydroxy-3-methylbutyryl-CoA which is then further enzymatically converted into 3-hydroxy-3-methylbutyric acid which is then further enzymatically converted into 3-phosphonoxy-3-methylbutyric acid which is then further enzymatically converted into said isobutene have been described (see the left route of the pathway as shown in FIG. 3). Further, for these pathways, it has been described that they can be embedded in a pathway for the production of isobutene starting from acetyl-CoA.

Methods as well as recombinant organisms and microorganisms utilizing these pathways and enzymatic conversions have, in particular, been described in WO2010/001078, WO2012/052427 and WO 2016/042012.

Thus, in the prior art, corresponding recombinant organisms or microorganisms which are capable of enzymatically converting acetyl-CoA into isobutene are also described which utilize the above-described pathways. The different possible pathways for the enzymatic conversions from acetyl-CoA into isobutene via different possible routes are schematically illustrated in FIG. 1 and in FIG. 3. FIG. 3 shows the major pathways relevant for the present invention. However, as outlined above, there are other routes possible and the present invention also relates to these pathways in enzymatically converting acetyl-CoA into isobutene.

In the following, the major reactions of the individual enzymatic conversions as described in the prior art WO 2017/085167, WO 2018/206262, WO2010/001078, WO2012/052427 and WO 2016/042012, respectively, and as schematically illustrated in FIG. 1 and FIG. 3 are described in more detail.

However, the present invention is not limited to these major reactions but also relates to all other routes for the individual steps of the conversion of acetyl-CoA into isobutene as described in the prior art documents WO 2017/085167, WO 2018/206262, WO2010/001078, WO2012/052427 and WO 2016/042012. The disclosure of these documents, in particular with respect to preferred embodiments of the enzymes for the individual conversions of the pathways described therein, is herewith incorporated by reference in its entirety. Accordingly, in preferred embodiments, it is preferable to use the enzymes selected from the preferred embodiments described in these prior art documents in connection with the respective enzymatic conversion. Thus, the same applies to the enzymatic conversions of the present invention described in the following as has been set forth in WO 2017/085167, WO 2018/206262, WO2010/001078, WO2012/052427 and WO 2016/042012, respectively.

The Enzymatic Conversion of Acetyl-CoA into Acetoacetyl-CoA

According to the present invention, the conversion of acetyl-CoA into acetoacetyl-CoA can be achieved by different routes. One possibility is to first convert acetyl-CoA into malonyl-CoA (step XIV as shown in FIG. 1) and then to further condense said malonyl-CoA and acetyl-CoA into acetoacetyl-CoA (step XV as shown in FIG. 1). Another possibility is to directly condense in a single enzymatic reaction two molecules of acetyl-CoA into acetoacetyl-CoA (step XIII as shown in FIG. 1).

The enzymatic conversion of acetyl-CoA into malonyl-CoA preferably makes use of an acetyl-CoA carboxylase (EC 6.4.1.2) (step XIV as shown in FIG. 1). This naturally occurring reaction fixes $CO_2$ on acetyl-CoA utilizing ATP resulting in malonyl-CoA.

Moreover, the enzymatic condensation of malonyl-CoA and acetyl-CoA into said acetoacetyl-CoA preferably makes use of an acetoacetyl-CoA synthase (EC 2.3.1.194) (step XV as shown in FIG. 1). This is a natural occurring reaction and condenses malonyl-CoA and acetyl-CoA in a decarboxylation reaction.

Alternatively, the enzymatic conversion of acetyl-CoA into said acetoacetyl-CoA consists of a single enzymatic reaction in which acetyl-CoA is directly converted into acetoacetyl-CoA by the enzymatic condensation of two molecules of acetyl-CoA into acetoacetyl-CoA. Preferably, this enzymatic conversion is achieved by making use of an acetyl-CoA acetyltransferase (EC 2.3.1.9). This reaction is a naturally occurring reaction (step XIII as shown in FIG. 1).

The Enzymatic Conversion of Acetoacetyl-CoA into 3-hydroxy-3-methylglutaryl-CoA

The enzymatic conversion of acetoacetyl-CoA into 3-hydroxy-3-methylglutaryl-CoA is an enzymatic condensation of acetoacetyl-CoA and acetyl-CoA into said 3-hydroxy-3-methylglutaryl-CoA (see step IX of FIG. 1).

This condensation preferably makes use of a 3-hydroxy-3-methylglutaryl-CoA synthase (also referred to as HMG-CoA synthase). HMG-CoA synthases are classified in EC 2.3.3.10 (formerly, HMG-CoA synthase has been classified as EC 4.1.3.5 but has been transferred to EC 2.3.3.10). The term "HMG-CoA synthase" refers to any enzyme which is able to catalyze the reaction where acetyl-CoA condenses with acetoacetyl-CoA to form 3-hydroxy-3-methylglutaryl-CoA (HMG-CoA). HMG-CoA synthase is part of the mevalonate pathway. Several pathways have been identified for the synthesis of isopentenyl pyrophosphate (IPP), i.e. the mevalonate pathway and the 2-C-methyl-D-erythritol 4-phosphate/1-deoxy-D-xylulose 5-phosphate (MEP/DOXP) pathway. HMG-CoA synthase catalyzes the biological Claisen condensation of acetyl-CoA with acetoacetyl-CoA and is a member of a superfamily of acyl-condensing enzymes that includes beta-ketothiolases, fatty acid synthases (beta-ketoacyl carrier protein synthase) and polyketide synthases.

The Enzymatic Conversion of 3-hydroxy-3-methylglutaryl-CoA into 3-Methylglutaconyl-CoA The enzymatic conversion of 3-hydroxy-3-methylglutaryl-CoA into 3-methylglutaconyl-CoA is an enzymatic dehydration reaction which occurs naturally, and which is catalyzed, e.g., by enzymes classified as 3-methylglutaconyl-coenzyme A hydratase (EC 4.2.1.18). Accordingly, the enzymatic conversion of 3-hydroxy-3-methylglutaryl-CoA into 3-methylglutaconyl-CoA preferably makes use of a 3-methylglutaconyl-coenzyme A hydratase (EC 4.2.1.18) (as shown in step VIII of FIG. 1).

The conversion of 3-hydroxy-3-methylglutaryl-CoA into 3-methylglutaconyl-CoA can also be achieved by making use of a 3-hydroxy-3-methylglutaryl-coenzyme A dehydratase activity which has been identified, e.g., in *Myxococcus xanthus* and which is encoded by the liuC gene (Li et al., Angew. Chem. Int. Ed. 52 (2013), 1304-1308). The 3-hydroxy-3-methylglutaryl-coenzyme A dehydratase derived from *Myxococcus xanthus* has the Uniprot accession number Q1D5Y4.

The enzymatic conversion of 3-hydroxy-3-methylglutaryl-CoA into 3-methylglutaconyl-CoA can also be achieved by making use of a 3-hydroxyacyl-CoA dehydratase or an enoyl-CoA hydratase. 3-hydroxyacyl-CoA dehydratases and enoyl-CoA hydratases catalyze the same reaction while the name of one of these enzymes denotes one direction of the corresponding reaction while the other name denotes the reverse reaction. As the reaction is reversible, both enzyme names can be used. 3-hydroxyacyl-CoA dehydratases and enoyl-CoA hydratases belong to enzymes classified as EC 4.2.1.-.

The Enzymatic Conversion of 3-methylglutaconyl-CoA into 3-methylcrotonyl-CoA

The conversion of 3-methylglutaconyl-CoA into 3-methylcrotonyl-CoA may be catalyzed by different enzymes, e.g., by making use of (i) a methylcrotonyl-CoA carboxylase (EC 6.4.1.4); or (ii) a geranoyl-CoA carboxylase (EC 6.4.1.5) (as shown in step VII of FIG. 1).

In another preferred embodiment the conversion of 3-methylglutaconyl-CoA via decarboxylation into 3-methylcrotonyl-CoA is catalyzed by a 3-methylglutaconyl-CoA decarboxylase, e.g. a 3-methylglutaconyl-CoA decarboxylase of *Myxococcus xanthus* encoded by the liuB gene. This gene codes for an enzyme having the two subunits AibA and AibB (Li et al., Angew. Chem. Int. Ed. 52 (2013), 1304-1308).

The Enzymatic Conversion of 3-methylcrotonyl-CoA into Isobutene Via 3-Methylcrotonic Acid The conversion of 3-methylcrotonyl-CoA into 3-methylcrotonic acid can, e.g., be achieved in different ways, e.g., by three alternative enzymatic routes described in the following and as shown in FIG. 1 (step VIa, step VIb or step VIc as shown in FIG. 1).

Thus, the enzymatic conversion of 3-methylcrotonyl-CoA into 3-methylcrotonic acid may be achieved by (a) a single enzymatic reaction in which 3-methylcrotonyl-CoA is directly converted into 3-methylcrotonic acid, preferably by making use of a CoA transferase (EC 2.8.3.-), preferably a propionate:acetate-CoA transferase (EC 2.8.3.1), an acetate CoA-transferase (EC 2.8.3.8) or a succinyl-CoA:acetate CoA-transferase (EC 2.8.3.18) (step VIa as shown in FIG. 1);

(b) a single enzymatic reaction in which 3-methylcrotonyl-CoA is directly converted into 3-methylcrotonic acid, preferably by making use of a thioester hydrolase (EC 3.1.2.-), preferably an acetyl-CoA hydrolase (EC 3.1.2.1), an ADP-dependent short-chain-acyl-CoA hydrolase (EC 3.1.2.18) or an acyl-CoA hydrolase (EC 3.1.2.20) (step VIb as shown in FIG. 1); or (c) two enzymatic steps comprising
(i) first enzymatically converting 3-methylcrotonyl-CoA into 3-methylcrotonyl phosphate; and
(ii) then enzymatically converting the thus obtained 3-methylcrotonyl phosphate into said 3-methylcrotonic acid (step VIc as shown in FIG. 1).

As regards (c), the enzymatic conversion of 3-methylcrotonyl-CoA into 3-methylcrotonic acid is achieved by two enzymatic steps comprising (i) first enzymatically converting 3-methylcrotonyl-CoA into 3-methylcrotonyl phosphate; and (ii) then enzymatically converting the thus obtained 3-methylcrotonyl phosphate into said 3-methylcrotonic acid.

The conversion of 3-methylcrotonyl-CoA into 3-methylcrotonyl phosphate can, e.g., be achieved by the use of a phosphate butyryltransferase (EC 2.3.1.19) or a phosphate acetyltransferase (EC 2.3.1.8).

The conversion of 3-methylcrotonyl phosphate into 3-methylcrotonic acid can, e.g., be achieved by making use of an enzyme which is classified as EC 2.7.2.-, i.e., a phosphotransferase. Such enzymes use a carboxy group as acceptor. Thus, the conversion of 3-methylcrotonyl phosphate into 3-methylcrotonic acid can, e.g., be achieved by making use of an enzyme with a carboxy group as acceptor (EC 2.7.2.-). In a preferred embodiment, the conversion of 3-methylcrotonyl phosphate into 3-methylcrotonic acid is achieved by the use of a propionate kinase (EC 2.7.2.15), an acetate kinase (EC 2.7.2.1), a butyrate kinase (EC 2.7.2.7) or a branched-chain-fatty-acid kinase (EC 2.7.2.14).

As mentioned above, the conversion of 3-methylcrotonyl-CoA into 3-methylcrotonic acid can also be achieved by two alternative conversions wherein 3-methylcrotonyl-CoA is directly converted into 3-methylcrotonic acid.

Preferably, in one embodiment, 3-methylcrotonyl-CoA is directly converted into 3-methylcrotonic acid by hydrolyzing the thioester bond of 3-methylcrotonyl-CoA into 3-methylcrotonic acid by making use of an enzyme which belongs to the family of thioester hydrolases (in the following referred to as thioesterases (EC 3.1.2.-)); step VIb as shown in FIG. 1.

Thioesterases (TEs; also referred to as thioester hydrolases) are enzymes which are classified as EC 3.1.2. Presently thioesterases are classified as EC 3.1.2.1 through EC 3.1.2.30 while TEs which are not yet classified/unclassified are grouped as enzymes belonging to EC 3.1.2.-. Cantu et al. (Protein Science 19 (2010), 1281-1295) describe that there are 23 families of thioesterases which are unrelated to each other as regards the primary structure. However, it is assumed that all members of the same family have essentially the same tertiary structure. Thioesterases hydrolyze the thioester bond between a carbonyl group and a sulfur atom.

In a preferred embodiment, a thioesterase employed according to the present invention for converting 3-methylcrotonyl-CoA into 3-methylcrotonic acid is selected from the group consisting of:
acetyl-CoA hydrolase (EC 3.1.2.1);
palmitoyl-CoA hydrolase (EC 3.1.2.2);
3-hydroxyisobutyryl-CoA hydrolase (EC 3.1.2.4);
oleoyl-[acyl-carrier-protein] hydrolase (EC 3.1.2.14);
ADP-dependent short-chain-acyl-CoA hydrolase (EC 3.1.2.18);

ADP-dependent medium-chain-acyl-CoA hydrolase (EC 3.1.2.19);

1,4-dihydroxy-2-naphthoyl-CoA hydrolase (EC 3.1.2.28); and acyl-CoA hydrolase (EC 3.1.2.20).

In more preferred embodiments, a thioesterase/thioester hydrolase (EC 3.1.2.-) employed according to the present invention is an acetyl-CoA hydrolase (EC 3.1.2.1), an ADP-dependent short-chain-acyl-CoA hydrolase (EC 3.1.2.18), a 1,4-dihydroxy-2-naphthoyl-CoA hydrolase (EC 3.1.2.28), and an acyl-CoA hydrolase (EC 3.1.2.20).

In an alternative embodiment, 3-methylcrotonyl-CoA is directly converted into 3-methylcrotonic acid, preferably by making use of an enzyme which belongs to the family of CoA-transferases (EC 2.8.3.-) capable of transferring the CoA group of 3-methylcrotonyl-CoA to a carboxylic acid (step VIa as shown in FIG. 1).

CoA-transferases are found in organisms from all lines of descent. Most of the CoA-transferases belong to two well-known enzyme families (referred to in the following as families I and II) and there exists a third family which had been identified in anaerobic metabolic pathways of bacteria. A review describing the different families can be found in Heider (FEBS Letters 509 (2001), 345-349).

Preferably, the CoA-transferase employed according to the present invention for the direct conversion of 3-methylcrotonyl-CoA into 3-methylcrotonic acid is selected from the group consisting of:

propionate:acetate-CoA transferase (EC 2.8.3.1);

acetate CoA-transferase (EC 2.8.3.8); and butyrate-acetoacetate CoA-transferase (EC 2.8.3.9).

In more preferred embodiments, CoA transferases (EC 2.8.3.-) are a propionate:acetate-CoA transferase (EC 2.8.3.1), an acetate CoA-transferase (EC 2.8.3.8) and a succinyl-CoA:acetate CoA-transferase (EC 2.8.3.18).

An Alternative Route for the Provision of 3-methylcrotonic Acid

As outlined above, 3-methylcrotonic acid (which is then further enzymatically converted into isobutene as described in detail further below) can be enzymatically provided from acetyl-CoA by the enzymatic conversion of acetyl-CoA into acetoacetyl-CoA (step XIV, step XV, step XIII as shown in FIG. 1), the enzymatic conversion of acetoacetyl-CoA into 3-hydroxy-3-methylglutaryl-CoA (step IX of FIG. 1), the enzymatic conversion of 3-hydroxy-3-methylglutaryl-CoA into 3-methylglutaconyl-CoA (step VIII of FIG. 1), the enzymatic conversion of 3-methylglutaconyl-CoA into 3-methylcrotonyl-CoA (step VII of FIG. 1) and the enzymatic conversion of 3-methylcrotonyl-CoA into 3-methylcrotonic acid.

In an alternative route, according to the present invention, 3-methylcrotonic acid can be provided by another possible pathway from acetyl-CoA. In this pathway, acetyl-CoA is enzymatically converted into acetoacetyl-CoA as described above.

According to this alternative route, acetoacetyl-CoA is then enzymatically converted into acetoacetate (step Va or Vb of FIG. 1), acetoacetate is further enzymatically converted into acetone (step IV of FIG. 1), acetone is further enzymatically converted into 3-hydroxyisovalerate (HIV) (step III of FIG. 1), which is then further enzymatically converted into said 3-methylcrotonic acid.

The individual enzymatic steps of this alternative pathway are described in more detail in the following.

The Enzymatic Conversion of Acetoacetyl-CoA into Acetoacetate

The conversion of acetoacetyl-CoA into acetoacetate can be achieved by two different routes. One possibility is the conversion of acetoacetyl-CoA into acetoacetate by hydrolysing the CoA thioester of acetoacetyl-CoA into acetoacetate (step Va as shown in FIG. 1). In another, more preferred, aspect the CoA group of acetoacetyl-CoA is transferred on acetate, resulting in the formation of acetoacetate and acetyl-CoA (step Vb as shown in FIG. 1).

As mentioned, in one aspect, the CoA thioester of acetoacetyl-CoA is hydrolyzed to result in acetoacetate. According to this aspect of the present invention, the enzymatic conversion of acetoacetyl-CoA into acetoacetate is achieved by preferably making use of an acetoacetyl-CoA hydrolase (EC 3.1.2.11) which naturally catalyzes this reaction.

As mentioned, in another, more preferred, possibility, the CoA group of acetoacetyl-CoA is transferred on acetate, resulting in the formation of acetoacetate and acetyl-CoA. According to this possibility of the present invention, the enzymatic conversion of acetoacetyl-CoA into acetoacetate is achieved by preferably making use of an enzyme which is capable of transferring the CoA group of acetoacetyl-CoA on acetate.

Preferably, such an enzyme capable of transferring the CoA group of acetoacetyl-CoA on acetate belongs to the family of CoA transferases (EC 2.8.3.-).

Thus, the present invention relates to a method for the enzymatic conversion of acetoacetyl-CoA into acetoacetate by making use of an enzyme capable of transferring the CoA group of acetoacetyl-CoA on acetate, preferably a CoA transferase (EC 2.8.3.-). A preferred example of an enzyme catalysing the conversion of acetoacetyl-CoA into acetoacetate which can be employed in the method of the present invention is an enzyme classified as an acetate CoA transferase (EC 2.8.3.8).

The Enzymatic Conversion of Acetoacetate into Acetone

The conversion of acetoacetate into acetone is schematically illustrated in step IV of FIG. 1. This reaction is a decarboxylation reaction and is a natural occurring reaction in organisms capable of producing acetone, i.e., organisms of the genus Clostridia. According to the present invention, the conversion of acetoacetate into said acetone preferably makes use of an acetoacetate decarboxylase (EC 4.1.1.4).

The Enzymatic Condensation of Acetone and Acetyl-CoA into 3-hydroxyisovalerate (HIV)

The condensation of acetone and acetyl-CoA into said 3-hydroxyisovalerate (HIV) is schematically illustrated in step III of FIG. 1. This condensation preferably makes use of an enzyme which is capable of catalyzing the formation of a covalent bond between the carbon atom of the oxo (i.e., the C=O) group of acetone and acetyl-CoA, in particular the methyl group of acetyl-CoA. According to this reaction scheme, the oxo group of acetone reacts as an electrophile and the methyl group of acetyl-CoA reacts as a nucleophile.

Enzymes which are capable of enzymatically condensing acetone and acetyl-CoA into 3-hydroxyisovalerate (HIV) are known in the art and have, e.g., been described in WO 2011/032934.

Preferably, the enzyme employed in the enzymatic condensation of acetone and acetyl-CoA into 3-hydroxyisovalerate (HIV) is an enzyme with the activity of a HMG CoA synthase (EC 2.3.3.10) and/or a PksG protein and/or an enzyme with the activity of a C—C bond cleavage/condensation lyase (preferably enzymes classified as isopropylmalate synthase (EC 2.3.3.13), as homocitrate synthase (EC 2.3.3.14) or as 4-hydroxy-2-ketovalerate aldolase (EC 4.1.3.39)), such as a HMG CoA lyase (EC 4.1.3.4).

The Enzymatic Conversion of 3-hydroxyisovalerate (HIV) into 3-methylcrotonic Acid The enzymatic conversion of 3-hydroxyisovalerate (HIV) into 3-methylcrotonic acid is schematically illustrated in step II of FIG. 1. This conversion preferably makes use of an enzyme catalyzing the dehydration of a β-hydroxy acid (i.e., e.g., 3-hydroxyisovalerate (HIV)) into an α,β-unsaturated acid (i.e., e.g., 3-methylcrotonic acid). The term "dehydration" generally refers to a reaction involving the removal of $H_2O$. Preferably, such an enzyme belongs to the family of hydro-lyases (EC 4.2.-.-).

Preferred examples of such enzymes which are classified as EC 4.2.-.- (i.e., hydro-lyases) are:
aconitase (EC 4.2.1.3);
fumarase (EC 4.2.1.2); and
enoyl-CoA hydratase/dehydratase (EC 4.2.1.17).

The Enzymatic Conversion of 3-methylcrotonic Acid into Isobutene

The enzymatic conversion of 3-methylcrotonic acid into isobutene is schematically shown in step I of FIG. 1). This conversion can be achieved by a decarboxylation by making use of an FMN-dependent decarboxylase associated with an FMN prenyl transferase. "Decarboxylation" is generally a chemical reaction that removes a carboxyl group and releases carbon dioxide ($CO_2$).

The enzymatic conversion of 3-methylcrotonic acid into isobutene utilizing an FMN-dependent decarboxylase associated with an FMN prenyl transferase relies on a reaction of two consecutive steps catalyzed by the two enzymes, i.e., the FMN-dependent decarboxylase (catalyzing the actual decarboxylation of 3-methylcrotonic acid into isobutene) with an associated FMN prenyl transferase which provides the modified flavin cofactor.

The flavin cofactor may preferably be FMN or FAD. FMN (flavin mononucleotide; also termed riboflavin-5'-phosphate) is a biomolecule produced from riboflavin (vitamin B2) by the enzyme riboflavin kinase and functions as prosthetic group of various reactions. FAD (flavin adenine dinucleotide) is a redox cofactor, more specifically a prosthetic group, involved in several important reactions in metabolism.

Thus, in the conversion of 3-methylcrotonic acid into isobutene, in a first step, a flavin cofactor (FMN or FAD) is modified into a (modified) flavin-derived cofactor. This modification is catalyzed by said FMN prenyl transferase. FMN prenyl transferase prenylates the flavin ring of the flavin cofactor (FMN or FAD) into a (modified) prenylated flavin cofactor. More specifically, FMN prenyl transferase catalyzes the prenylation of a flavin cofactor (FMN or FAD) utilizing dimethylallyl phosphate (DMAP) or dimethylallyl pyrophosphate (DMAPP) into a flavin-derived cofactor.

In a second step, the actual conversion of 3-methylcrotonic acid into isobutene is catalyzed by said FMN-dependent decarboxylase via a 1,3-dipolar cycloaddition based mechanism wherein said FMN-dependent decarboxylase uses the prenylated flavin cofactor (FMN or FAD) provided by the associated FMN prenyl transferase.

In a preferred embodiment, said FMN prenyl transferase which modifies the flavin cofactor (FMN or FAD) into a (modified) flavin-derived cofactor (utilizing dimethylallyl phosphate (DMAP) or dimethylallyl pyrophosphate (DMAPP)) is a phenylacrylic acid decarboxylase (PAD)-type protein, or the closely related prokaryotic enzyme UbiX, an enzyme which is involved in ubiquinone biosynthesis in prokaryotes.

In Escherichia coli, the protein UbiX (also termed 3-octaprenyl-4-hydroxybenzoate carboxy-lyase) has been shown to be involved in the third step of ubiquinone biosynthesis.

In a preferred embodiment, the modification of a flavin cofactor (FMN or FAD) into the corresponding (modified) flavin-derived cofactor is catalyzed by the FMN-containing protein phenylacrylic acid decarboxylase (PAD). The enzymes involved in the modification of the flavin cofactor (FMN or FAD) into the corresponding modified flavin-derived cofactor were initially annotated as decarboxylases (EC 4.1.1.-). Some phenylacrylic acid decarboxylases (PAD) are now annotated as flavin prenyl transferases as EC 2.5.1.-. Enzymes capable of catalyzing the enzymatic reaction described herein for flavin prenyl transferases have recently also been annotated as flavin prenyl transferases as EC 2.5.1.129.

In a more preferred embodiment, the conversion of 3-methylcrotonic acid into isobutene makes use of a phenylacrylic acid decarboxylase (PAD)-type protein as the FMN prenyl transferase which modifies a flavin cofactor (FMN or FAD) into the corresponding (modified) flavin-derived cofactor wherein said phenylacrylic acid decarboxylase (PAD)-type protein is derived from Candida albicans (Uniprot accession number Q5A8L8), Aspergillus niger (Uniprot accession number A3F715), Saccharomyces cerevisiae (Uniprot accession number P33751) or Cryptococcus gattii (Uniprot accession number E6R9Z0).

In another preferred embodiment, the modification of a flavin cofactor (FMN or FAD) into the corresponding (modified) flavin-derived cofactor is catalyzed by the FMN-containing protein 3-octaprenyl-4-hydroxybenzoate carboxy-lyase also termed UbiX (initially annotated EC 4.1.1.-). As mentioned above, the enzymes involved in the modification of the flavin cofactor (FMN or FAD) into the corresponding modified flavin-derived cofactor were initially annotated as decarboxylases. Some phenylacrylic acid decarboxylases (PAD) are now annotated as flavin prenyl transferases as EC 2.5.1.-.

As mentioned above, enzymes capable of catalyzing the enzymatic reaction described herein for flavin prenyl transferases have recently also been annotated as flavin prenyl transferases as EC 2.5.1.129.

In a more preferred embodiment, the conversion of 3-methylcrotonic acid into isobutene makes use of a 3-octaprenyl-4-hydroxybenzoate carboxy-lyase (also termed UbiX) as the FMN prenyl transferase which modifies the flavin cofactor (FMN or FAD) into the corresponding (modified) flavin-derived cofactor wherein said 3-octaprenyl-4-hydroxybenzoate carboxy-lyase (also termed UbiX) is derived from Escherichia coli (Uniprot accession number P0AG03), Bacillus subtilis (Uniprot accession, number A0A086WXG4), Pseudomonas aeruginosa (Uniprot accession number A0A072ZCW8) or Enterobacter sp. DC4 (Uniprot accession number W7P6B1).

In another preferred embodiment, the modification of a flavin cofactor (FMN or FAD) into the corresponding (modified) flavin-derived cofactor is catalyzed by an Ubx-like flavin prenyl transferase derived from E. coli encoded by kpdB and ecdB, respectively (UniProt accession number A0A023LDW3 and UniProt accession number P69772, respectively), and an Ubx-like flavin prenyl transferase derived from Klebsiella pneumoniae encoded by kpdB (UniProt accession number Q462H4).

In another preferred embodiment, the modification of a flavin cofactor (FMN or FAD) into the corresponding (modified) flavin-derived cofactor is catalyzed by a flavin prenyl transferase.

As mentioned above, the actual decarboxylation, i.e., the conversion of 3-methylcrotonic acid into isobutene is catalyzed by an FMN-dependent decarboxylase via a 1,3-dipolar cycloaddition based mechanism wherein said FMN-dependent decarboxylase uses the prenylated flavin cofactor (FMN or FAD) provided by any of the above described associated FMN prenyl transferases.

In a preferred embodiment, said FMN-dependent decarboxylase catalyzing the decarboxylation of 3-methylcrotonic acid into isobutene is catalyzed by a ferulic acid decarboxylase (FDC). Ferulic acid decarboxylases (FDC) belong to the enzyme class EC 4.1.1.-.

In an even more preferred embodiment, the conversion of 3-methylcrotonic acid into isobutene makes use of a ferulic acid decarboxylases (FDC) which is derived from *Saccharomyces cerevisiae* (Uniprot accession number Q03034), *Enterobacter* sp. (Uniprot accession number V3P7U0), *Bacillus pumilus* (Uniprot accession number Q45361), *Aspergillus niger* (Uniprot accession number A2R0P7) or *Candida dubliniensis* (Uniprot accession number B9WJ66).

In another more preferred embodiment, the conversion of 3-methylcrotonic acid into isobutene makes use of a protocatechuate decarboxylase (EC 4.1.1.63).

In a preferred embodiment of the present invention, the PCA decarboxylase employed in the method of the present invention is a PCA decarboxylase which is derived from *Klebsiella pneumoniae* (Uniprot accession number B9AM6), *Leptolyngbya* sp. (Uniprot accession number A0A0S3U6D8), or *Phascolarctobacterium* sp. (Uniprot accession number R611V6).

In another preferred embodiment, said FMN-dependent decarboxylase catalyzing the decarboxylation of 3-methylcrotonic acid into isobutene is an enzyme which is closely related to the above ferulic acid decarboxylase (FDC), namely a 3-polyprenyl-4-hydroxybenzoate decarboxylase (also termed UbiD). 3-polyprenyl-4-hydroxybenzoate decarboxylase belongs to the UbiD decarboxylase family classified as EC 4.1.1.-.

In a more preferred embodiment, the conversion of 3-methylcrotonic acid into isobutene makes use of a 3-polyprenyl-4-hydroxybenzoate decarboxylase (UbiD) which is derived from *Hypocrea atroviridis* (UniProt Accession number G9NLP8), *Sphaerulina musiva* (UniProt Accession number M3DF95), *Penecillinum requeforti* (UniProt Accession number W6QKP7), *Fusarium oxysporum* f. sp. *lycopersici* (UniProt Accession number W9LTH3), *Saccharomyces kudriavzevii* (UniProt Accession number J8TRN5), *Saccaromyces cerevisiae, Aspergillus parasiticus, Candida albicans, Grosmannia clavigera, Escherichia coli* (Uniprot accession number P0AAB4), *Bacillus megaterium* (Uniprot accession number D5DTL4), *Methanothermobacter* sp. CaT2 (Uniprot accession number T2GKK5), *Mycobacterium* chelonae 1518 (Uniprot accession number X8EX86) or *Enterobacter cloacae* (Uniprot accessin number V3DX94).

In another more preferred embodiment, the conversion of 3-methylcrotonic acid into isobutene makes use of an UbiD-like decarboxylase which is derived from *Streptomyces* sp (UniProt Accession number A0A0A8EV26).

In an even more preferred embodiment, the UbiD-like decarboxylase which is derived from *Streptomyces* sp. is an enzyme comprising the amino acid sequence of SEQ ID NO: 21 or a sequence which is at least n % identical to SEQ ID NO: 21 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting 3-methylcrotonic acid into isobutene.

As regards the determination of sequence identity, the following should apply: When the sequences which are compared do not have the same length, the degree of identity either refers to the percentage of amino acid residues in the shorter sequence which are identical to amino acid residues in the longer sequence or to the percentage of amino acid residues in the longer sequence which are identical to amino acid residues in the shorter sequence. Preferably, it refers to the percentage of amino acid residues in the shorter sequence which are identical to amino acid residues in the longer sequence. The degree of sequence identity can be determined according to methods well known in the art using preferably suitable computer algorithms such as CLUSTAL.

When using the Clustal analysis method to determine whether a particular sequence is, for instance, at least 60% identical to a reference sequence default settings may be used or the settings are preferably as follows: Matrix: blosum 30; Open gap penalty: 10.0; Extend gap penalty: 0.05; Delay divergent: 40; Gap separation distance: 8 for comparisons of amino acid sequences. For nucleotide sequence comparisons, the Extend gap penalty is preferably set to 5.0.

In a preferred embodiment ClustalW2 is used for the comparison of amino acid sequences. In the case of pairwise comparisons/alignments, the following settings are preferably chosen: Protein weight matrix: BLOSUM 62; gap open: 10; gap extension: 0.1. In the case of multiple comparisons/alignments, the following settings are preferably chosen: Protein weight matrix: BLOSUM 62; gap open: 10; gap extension: 0.2; gap distance: 5; no end gap.

Preferably, the degree of identity is calculated over the complete length of the sequence.

An Alternative Route for the Enzymatic Conversion of 3-methylcrotonyl-CoA into isobutene Via 3-hydroxy-3-methylbutyryl-CoA, 3-hydroxy-3-methylbutyric Acid and 3-phosphonoxy-3-methylbutyric Acid As described above, according to the present invention, 3-methylcrotonyl-CoA is enzymatically converted into isobutene while in one possible route, 3-methylcrotonyl-CoA is enzymatically converted into isobutene via 3-methylcrotonic acid. This route is described above.

In an alternative route, isobutene can be provided by another possible route in which 3-methylcrotonyl-CoA is converted into 3-hydroxy-3-methylbutyryl-CoA which is then further enzymatically converted into 3-hydroxy-3-methylbutyric acid which is then further enzymatically converted into 3-phosphonoxy-3-methylbutyric acid which is then further enzymatically converted into said isobutene. These individual steps are described in the following.

The Enzymatic Conversion of 3-methylcrotonyl-CoA into 3-hydroxy-3-methylbutyric Acid Via 3-hydroxy-3-methylbutyryl-CoA According to the present invention, 3-methylcrotonyl-CoA is enzymatically converted into 3-hydroxy-3-methylbutyric acid comprising the steps of:
(a) enzymatically converting 3-methylcrotonyl-CoA into 3-hydroxy-3-methylbutyryl-CoA; and
(b) further enzymatically converting the thus produced 3-hydroxy-3-methylbutyryl-CoA into 3-hydroxy-3-methylbutyric acid.

The enzymatic conversion of 3-methylcrotonyl-CoA into 3-hydroxy-3-methylbutyryl-CoA according to step (a) of the above described method can, for example be achieved by the use of
(i) a 3-hydroxypropionyl-CoA dehydratase (EC 4.2.1.116);
(ii) a 3-hydroxybutyryl-CoA dehydratase (EC 4.2.1.55);

(iii) an enoyl-CoA hydratase (EC 4.2.1.17);
(iv) a 3-hydroxyoctanoyl-[acyl-carrier-protein] dehydratase (EC 4.2.1.59);
(v) a crotonyl-[acyl-carrier-protein] hydratase (EC 4.2.1.58);
(vi) a 3-hydroxydecanoyl-[acyl-carrier-protein] dehydratase (EC 4.2.1.60);
(vii) a 3-hydroxypalmitoyl-[acyl-carrier-protein] dehydratase (EC 4.2.1.61);
(viii) a long-chain-enoyl-CoA hydratase (EC 4.2.1.74);
(ix) a 3-methylglutaconyl-CoA hydratase (EC 4.2.1.18).

The conversion of 3-hydroxy-3-methylbutyryl-CoA into 3-hydroxy-3-methylbutyric acid (step (b) can either be achieved by a direct conversion or, alternatively, by a two-step reaction via 3-hydroxy-3-methylbutyryl phosphate.

The direct conversion can, e.g., be achieved by making use of
(i) a thioesterase (EC 3.1.2); or
(ii) a CoA-transferase (EC 2.8.3).

The two-step conversion can be summarized as follows:
(i) 3-hydroxy-3-methylbutyryl-CoA+$H_3PO_4$→3-hydroxy-3-methylbutyryl phosphate+CoA
(ii) 3-hydroxy-3-methylbutyryl phosphate+ADP→3-hydroxy-3-methylbutyric acid+ATP The conversion of 3-hydroxy-3-methylbutyryl-CoA into 3-hydroxy-3-methylbutyryl phosphate can, e.g., be achieved by the use of a phosphate butyryltransferase (EC 2.3.1.19) or a phosphate acetyltransferase (EC 2.3.1.8).

The conversion of 3-hydroxy-3-methylbutyryl phosphate into 3-hydroxy-3-methylbutyric acid can, e.g., be achieved by the use of a butyrate kinase (EC 2.7.2.7), a branched-chain-fatty-acid kinase (EC 2.7.2.14), a propionate kinase (EC 2.7.2.15) or an acetate kinase (EC 2.7.2.1).

An Alternative Route for the Enzymatic Conversion of 3-methylcrotonyl-CoA into 3-hydroxy-3-methylbutyric Acid Via 3-methylcrotonic Acid In an alternative to the above-described conversion of 3-methylcrotonyl-CoA into 3-hydroxy-3-methylbutyric acid via 3-hydroxy-3-methylbutyryl-CoA, according to the present invention, 3-methylcrotonyl-CoA can also be enzymatically converted into 3-hydroxy-3-methylbutyric acid, yet via 3-methylcrotonic acid.

Accordingly, according to the present invention, 3-methylcrotonyl-CoA is enzymatically converted into 3-hydroxy-3-methylbutyric acid comprising the steps of:
(a) enzymatically converting 3-methylcrotonyl-CoA into 3-methylcrotonic acid; and
(b) further enzymatically converting the thus produced 3-methylcrotonic acid into 3-hydroxy-3-methylbutyric acid.

The conversion of 3-methylcrotonyl-CoA into 3-methylcrotonic acid can be achieved by a direct conversion which preferably makes use of an enzyme which belongs to the family of thioester hydrolases (in the following referred to as thioesterases (EC 3.1.2)) or to the family of CoA-transferases (EC 2.8.3).

Thioesterases have already been described above. As regards preferred embodiments, the same applies as has been set forth above and as briefly summarized in the following. TEs (also referred to as thioester hydrolases) are enzymes which are classified as EC 3.1.2. Presently thioesterases are classified as EC 3.1.2.1 through EC 3.1.2.27.

In a preferred embodiment, a thioesterase for converting 3-methylcrotonyl-CoA into 3-methylcrotonic acid is selected from the group consisting of:
acetyl-CoA hydrolase (EC 3.1.2.1);
palmitoyl-CoA hydrolase (EC 3.1.2.2);
3-hydroxyisobutyryl-CoA hydrolase (EC 3.1.2.4);
oleoyl-[acyl-carrier-protein] hydrolase (EC 3.1.2.14);
ADP-dependent short-chain-acyl-CoA hydrolase (EC 3.1.2.18);
ADP-dependent medium-chain-acyl-CoA hydrolase (EC 3.1.2.19); and
acyl-CoA hydrolase (EC 3.1.2.20).

As regards the CoA-transferases (EC 2.8.3), and preferred embodiments thereof, the same applies as has been set forth above.

In the alternative, the conversion of 3-methylcrotonyl-CoA into 3-methylcrotonic acid can be achieved by a conversion which first encompasses the conversion of 3-methylcrotonyl-CoA into 3-methylcrotonyl-phosphate and the subsequent conversion of 3-metylcrotonyl-phosphate into 3-methylcrotonic acid.

The conversion of 3-methylcrotonyl-CoA into 3-methylcrotonyl-phosphate can, e.g., be achieved by the use of a phosphate butyryltransferase (EC 2.3.1.19) or a phosphate acetyltransferase (EC 2.3.1.8).

The conversion of 3-methylcrotonyl-phosphate into 3-methylcrotonic acid can, e.g., be achieved by the use of an enzyme which is classified as EC 2.7.2, i.e. a phosphotransferase. Such enzymes use a carboxy group as acceptor. In a preferred embodiment the conversion of 3-methylcrotonyl-phosphate into 3-methylcrotonic acid is achieved by the use of a butyrate kinase (EC 2.7.2.7), a branched-chain-fatty-acid kinase (EC 2.7.2.14), a propionate kinase (EC 2.7.2.15) or an acetate kinase (EC 2.7.2.1).

According to the present invention, the 3-methylcrotonic acid which is obtained in step (a) is enzymatically further converted into 3-hydroxy-3-methylbutyric acid. This conversion can, e.g., be achieved by making use of an enzyme which belongs to the family of hydro-lyases (EC 4.2.1), in particular an aconitate hydratase (EC 4.2.1.3) or a maleate hydratase (EC 4.2.1.31) or a 2-methylcitrate dehydratase (EC 4.2.1.79). The reaction is schematically shown in FIG. 3.

The Enzymatic Conversion of 3-hydroxy-3-methylbutyric Acid into Isobutene Via 3-phosphonoxy-3-methylbutyric Acid According to the present invention, the 3-hydroxy-3-methylbutyric acid can be further converted into isobutene. This conversion can be achieved, for example, by making use of a decarboxylase, in particular a mevalonate diphosphate (MDP) decarboxylase. This conversion has been described in the prior art, e.g., in WO 2010/001078, WO 2012/052427 and in Gogerty et al. (Appl. Environm. Microbiol. 76 (2010), 8004-8010).

More specifically, according to the present invention, the conversion of 3-hydroxy-3-methylbutyric acid can be converted into isobutene by a single enzyme having a decarboxylase activity. Preferably, according to the present invention, the conversion of 3-hydroxy-3-methylbutyric acid into isobutene can be achieved by a mevalonate diphosphate (MDP) decarboxylase (E.C. 4.1.1.33).

As mentioned above, WO 2010/001078 describes a process for producing alkenes (like, e.g., isobutene) by enzymatic conversion of 3-hydroxyalkanoic acids (like, e.g., 3-hydroxy-3-methylbutyric acid) with an enzyme having the activity of a decarboxylase. It has been described in WO 2010/001078 that generally the conversion of a 3-hydroxyalkanoate into an alkene takes place by the conversion of the 3-hydroxyalkanoate into the corresponding 3-phosphonoxy-alkanoate which is then decarboxylated to lead to the corresponding alkene.

In WO 2012/052427, it has been found that different decarboxylases, in particular mevalonate diphosphate (MDP) decarboxylases, catalyze the two above mentioned steps with different efficiencies, i.e., that some decarboxylases catalyze the first step with a higher efficiency than other decarboxylases and that some decarboxylases show a preference for the second step, i.e., the decarboxylation step, and that therefore the efficiency of the conversion of the 3-hydroxyalkanoate into the alkene as described in WO 2010/001078 can be significantly increased by combining corresponding enzymes. Accordingly, it is preferable to use two different MDP decarboxylases for this conversion and, in particular, MDP decarboxylases selected from the preferred embodiments described in WO 2010/001078.

Impact of Increasing the Level of CoA on Isobutene Producing Cells

As mentioned above, the present invention is based on the concept of increasing the yield of isobutene and/or increasing the rate of isobutene production by providing and maintaining a high pool of acetyl-CoA in cells used for isobutene production wherein the acetyl-CoA pool is kept high by ensuring an increased uptake of pantothenate by the cell and/or an increased conversion of pantothenate into CoA.

Increasing the uptake of pantothenate by the cell and/or an increasing the conversion of pantothenate into CoA not only has the beneficial effect that a high pool of acetyl-CoA is maintained in cells for isobutene production. In addition, increasing the pool of CoA has a promoting impact on the overall cell function, ultimately leading to beneficial effects as regards isobutene production.

Indeed, CoA is known to play a role as a cofactor for a number of oxidative and biosynthetic reactions in cell metabolism. Coenzyme A and its thioesters (e.g.acetyl-CoA, acetoacetyl-CoA, malonyl-CoA, succinyl-CoA, HMG-CoA, etc.) are essential for a diverse range of metabolic pathways, the regulation of gene expression, growth and cell proliferation. Moreover, as described above, the metabolic pathways leading to the production of isobutene include a series of biochemical transformation of acyl-CoA intermediates.

Hence, a recombinant organism or microorganism of the present invention is also characterized in that it has an increased pool of CoA which has an overall positive impact on the cell growth and/or isobutene production and/or stability of isobutene producing strains. These positive effects are effected by known biological mechanisms and processes which are regulated by CoA or which depend on the content of CoA, e.g., the availability of CoA as a substrate or cofactor, regulation of proteins, optimized balance between free CoA and CoA thioesters. In a preferred embodiment, a recombinant organism or microorganism according to this invention is characterized in that it has an increased pool of one or several acyl thioesters intermediates of the isobutene metabolic pathways, including acetyl-CoA, acetoacetyl-CoA, 3-hydroxy-3-methylglutaryl-CoA (Hmg-CoA), 3-methylglutaconyl-CoA, 3-hydroxy-3-methylbutyryl-CoA, 3-methylcrotonyl-CoA.

Enzymatically Providing Acetyl-CoA from CoA

In a recombinant organism or microorganism of the present invention, acetyl-CoA can be provided by different routes as it is a central component in the metabolism used in many biochemical reactions.

In a preferred embodiment, acetyl-CoA is provided enzymatically by using CoA, preferably the Coenzyme A (CoA) of the increased pool of CoA of the recombinant organism or microorganism of the present invention.

In a more preferred embodiment, acetyl-CoA is provided enzymatically by acetylating CoA using acetate, preferably by making use of an acetyl-CoA synthetase or an acyl-CoA synthetase.

In a preferred embodiment, the acetyl-CoA synthetase (also termed acetate-CoA ligase) is an enzyme which is classified as EC 6.2.1.1. Acetyl-CoA synthetases (EC 6.2.1.1) are enzymes which catalyze the following reaction:

ATP+acetate+CoA=AMP+diphosphate+acetyl-CoA

This enzyme is known from a variety of organisms, including eukaryotic and prokaryotic organisms such as plants, animals, fungi and bacteria. The enzyme has, e.g., been described in *Acetobacter aceti, Aedes togoi, Aliivibrio fischeri, Amaranthus* sp., *Arabidopsis thaliana, Archaeoglobus fulgidus, Aspergillus nidulans, Aspergillus niger, Bacillus subtilis, Bos taurus, Bradyrhizobium japonicum, Cryptosporidium parvum, Escherichia coli, Euglena gracilis, Haloarcula marismortui, Homo sapiens, Hordeum vulgare, Ignicoccus hospitalis, Marmota monax, Methanosarcina* sp., *Methanothermobacter thermautotrophicus, Methanothrix soehngenii, Methanothrix thermoacetophila* (SwissProt accession number A0B8F1), *Moorella thermoacetica, Mus musculus, Neurospora crassa, Oryctolagus cuniculus, Ovis aries, Penicillium chrysogenum, Phycomyces blakesleeanus, Pinus radiata, Pisum sativum, Pseudomonas putida* (UniProt accession number Q6EMJ3), *Pyrobaculum aerophilum, Pyrococcus furiosus, Rattus norvegicus, Rhodobacter sphaeroides, Roseovarius* sp., *Saccharomyces cerevisiae, Salmonella enterica, Spinacia oleracea, Taxus* sp. and *Zea mays*.

In a preferred embodiment, the acetyl-CoA synthetase (EC 6.2.1.1) is the *E. coli* MG1655-derived enzyme encoded by acs (SEQ ID NO:22) having the UniProt accession number P27550. Thus, in a preferred embodiment of the present invention, the acetyl-CoA synthetase (EC 6.2.1.1) is an enzyme comprising the amino acid sequence of SEQ ID NO: 22 or a sequence which is at least n % identical to SEQ ID NO: 22 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting CoA and acetate into acetyl-CoA, i.e., by acetylating CoA using acetate. As regards the determination of the sequence identity, the same applies as has been set forth above.

As mentioned above, in another preferred embodiment, acetyl-CoA is provided enzymatically by acetylating CoA using acetate by making use of an acyl-CoA synthetase.

In a preferred embodiment, the acyl-CoA synthetase is an enzyme which is classified as EC 6.2.1.2. These short/medium chain acyl-CoA synthetases (EC 6.2.1.2) (also termed butyrate-CoA ligase, adK, IvaE, butyryl-CoA synthetase, fatty acid thiokinase (medium chain), acyl-activating enzyme, fatty acid elongase, fatty acid activating enzyme, fatty acyl coenzyme A synthetase, butyrate-CoA ligase, butyryl-coenzyme A synthetase, L-(+)-3-hydroxybutyryl CoA ligase or butanoate:CoA ligase (AMP-forming)) are enzymes which catalyze the following reaction:

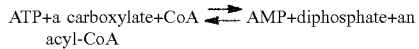

ATP+a carboxylate+CoA ⇌ AMP+diphosphate+an acyl-CoA

This enzyme is known from a variety of organisms, including eukaryotic and prokaryotic organisms such as animals, fungi and bacteria. The enzyme has, e.g., been described in *Bos taurus, Byssochlamys spectabilis, Cavia porcellus, Dictyostelium discoideum* (UniProt accession number Q54CJ4), *Homo sapiens, Methanosarcina activ-* orans (UniProt accession number Q8TLW1), *Mus musculus, Mycobacterium avium, Ovis aries, Penicillium chrysogenum* (UniProt accession number O74725), *Pseudomonas aeruginosa, Rattus norvegicus, Streptomyces coelicolor* and *Sus scrofa*.

In a preferred embodiment, the short/medium chain acyl-CoA synthetase (EC 6.2.1.-) is the *E. coli* MG1655-derived enzyme encoded by fadK or ydiD (SEQ ID NO:23) having the UniProt accession number P38135. Thus, in a preferred embodiment of the present invention, the short/medium chain acyl-CoA synthetase (EC 6.2.1.-) is an enzyme comprising the amino acid sequence of SEQ ID NO: 23 or a sequence which is at least n % identical to SEQ ID NO: 23 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting CoA and acetate into acetyl-CoA, i.e., by acetylating CoA using acetate. As regards the determination of the sequence identity, the same applies as has been set forth above.

The physiological substrates for the *E. coli*-derived short/medium chain acyl-CoA synthetase are short chain acids with a maximal activity on dodecanoate, hexanoate and octanoate.

In a preferred embodiment, the acyl-CoA synthetase is an enzyme which is classified as EC 6.2.1.3. These long chain acyl-CoA synthetases (EC 6.2.1.3) are enzymes which catalyze the following reaction:

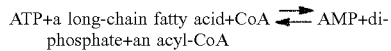

ATP+a long-chain fatty acid+CoA ⇌ AMP+diphosphate+an acyl-CoA

This enzyme is known from a variety of organisms, including eukaryotic and prokaryotic organisms such as animals, plants, fungi and bacteria. The enzyme has, e.g., been described in *Agrypnus binodulus, Arabidopsis thaliana, Aspergillus nidulans, Babesia bovis* (TrEMBL accession number Q6QLU3), *Brassica napus, Caenorhabditis elegans, Caulobacter vibrioides, Chaenocephalus aceratus, Drosophila melanogaster, Escherichia coli, Geobacillus thermodenitrificans, Homo sapiens, Komagataella pastoris, Luciola cruciata, Mortierella alpina* (UniProt accession number C8KHM6), *Mus musculus, Mycobacterium tuberculosis, Nothothenia coriiceps, Oryctolagus cuniculus, Photinus pyralis, Pisum sativum, Plasmodium falciparum, Plasmodium knowlesi, Pseudomonas aeruginosa, Pseudomonas chlororaphis* (UniProt accession number Q5CD72), *Rattus norvegicus, Saccharomyces cerevisiae, Sus scrofa, Iberian Guadyerbas x Landrace* cross breed, *Thalassiosira pseudonana, Thermus thermophilus, Tribolium castaneum, Trypanosoma brucei, Ulmus* sp., *Yarrowia lipolytica* and *Zea mays*.

In a preferred embodiment, the long chain acyl-CoA synthetase (EC 6.2.1.3) is the *E. coli* MG1655-derived enzyme encoded by fadD (SEQ ID NO:24) having the UniProt accession number P69451. Thus, in a preferred embodiment of the present invention, the short/medium chain acyl-CoA synthetase (EC 6.2.1.3) is an enzyme comprising the amino acid sequence of SEQ ID NO: 24 or a sequence which is at least n % identical to SEQ ID NO: 24 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting CoA and acetate into acetyl-CoA, i.e., by acetylating CoA using acetate. As regards the determination of the sequence identity, the same applies as has been set forth above.

Increasing the Pool of CoA

The recombinant organism or microorganism according to the present invention is characterized in having an increased pool of Coenzyme A (CoA) over the organism or microorganism from which it is derived while this increased pool of Coenzyme A (CoA) is due to:
(i) an increased uptake of pantothenate; and/or
(ii) an increased conversion of pantothenate into CoA.

The term "an increased pool of Coenzyme A (CoA)" as used in the present invention means, in general terms, that the amount and/or the availability of CoA in the recombinant (genetically modified) organism or microorganism is higher than in the correspondingly non-modified organism or microorganism. In preferred embodiments, in the context of the present invention, an "an increased pool of Coenzyme A (CoA)" means that the amount and/or the availability of CoA in the genetically modified, recombinant organism or microorganism is at least 1%, 2%, 5%, 7% or 10%, preferably at least 20%, more preferably at least 30% or 50%, even more preferably at least 70% or 80% and particularly preferred at least 90% or 100% higher than in the corresponding non-modified organism or microorganism. In even more preferred embodiments the increase in the amount and/or the availability of CoA may be at least 150%, at least 200% or at least 500% compared to the corresponding non-modified organism or microorganism. In particularly preferred embodiments the amount and/or the availability of CoA is at least 2-fold, and more preferably at least 5-fold higher than in the corresponding non-modified organism or microorganism.

The term "an increased uptake of pantothenate" as used in the present invention means, in general terms, that the uptake, i.e., the transfer of pantothenate from the outside to the inside of the recombinant (genetically modified) organism or microorganism is higher than in the correspondingly non-modified organism or microorganism. In preferred embodiments, in the context of the present invention, an "increased uptake of pantothenate" means that the transfer of pantothenate from the outside to the inside of the genetically modified, recombinant organism or microorganism is at least 1%, 2%, 5%, 7% or 10%, preferably at least 20%, more preferably at least 30% or 50%, even more preferably at least 70% or 80% and particularly preferred at least 90% or 100% higher compared to the corresponding non-modified organism or microorganism. In even more preferred embodiments the increase in the transfer of pantothenate from the outside to the inside of the genetically modified, recombinant organism or microorganism may be at least 150%, at least 200% or at least 500% higher compared to the corresponding non-modified organism or microorganism. In particularly preferred embodiments the transfer of pantothenate from the outside to the inside of the genetically modified, recombinant organism or microorganism is at least 2-fold, 5-fold, 7-fold and more preferably at least 10-fold higher than in the corresponding non-modified organism or microorganism.

The term "an increased conversion of pantothenate into CoA" as used in the present invention means, in general terms, that the expression and/or the activity of a corresponding enzyme described below in the recombinant (genetically modified) organism or microorganism is higher than in the correspondingly non-modified organism or microorganism. In preferred embodiments, in the context of the present invention, an "increased conversion of pantothenate into CoA" means that the expression and/or the activity of a corresponding enzyme described below in the genetically modified, recombinant organism or microorganism is at least 1%, 2%, 5%, 7% or 10%, preferably at least 20%, more preferably at least 30% or 50%, even more preferably at least 70% or 80% and particularly preferred at least 90% or 100% higher than in the corresponding non-modified organism or microorganism. In even more preferred embodiments the expression and/or the activity of an enzyme described below in the genetically modified, recombinant organism or microorganism may be at least 150%, at least 200% or at least 500% higher compared to the corresponding non-modified organism or microorganism. In particularly preferred embodiments the expression and/or the activity of an enzyme described below in the genetically modified, recombinant organism or microorganism is at least 2-fold, 5-fold, 7-fold and more preferably at least 10-fold higher than in the corresponding non-modified organism or microorganism.

Methods and assays for measuring an (increased) uptake of pantothenate and for measuring an (increased) conversion of pantothenate into CoA over the organism or microorganism from which it is derived are well known to the person skilled in the art. As an increased uptake of pantothenate and/or an increased conversion of pantothenate into CoA ultimately leads to an increased pool of CoA over the organism or microorganism from which it is derived, an (increased) uptake of pantothenate and an (increased) conversion of pantothenate into CoA over the organism or microorganism from which it is derived can preferably also be measured by indirectly measuring an (increased) pool of CoA.

Means and methods for measuring an (increased) pool of CoA and/or acetyl-CoA over the organism or microorganism from which it is derived are well known to the person skilled in the art and are described in the literature.

Corresponding assays for measuring an (increased) pool of CoA and/or acetyl-CoA have, e.g., been described in Rock et al. (J. Bacteriol. 185(11), 3410-3415 (2003); see, in particular, page 3412 therein); in Lin et al. (Biotechnol. Prog. 20(5), 1599-1604 (2004); see, in particular, page 1600 therein); and in Vadali et al. (Metab. Eng. 6(2), 133-139 (2004); see, in particular, page 135).

Without being bound by theory, an example for such an assay to measure an increased pool of CoA is given in the Example section below and can, e.g., be performed as follows: One possibility to quantify CoA (and/or its thioester intermediates) is thus to first extract the compounds and to subsequently analyse them by either an LC-MS or HPLC analysis.

Accordingly, for the extraction, one possibility is to directly sample 120 μL of bacterial cultures from a fermenter and to filter through a membrane filter under vacuum. Immediately after filtration, the filter is put into an aluminum foil and immersed into liquid nitrogen in order to stop all metabolic reactions. Then, the aluminum foil containing the filter is stored at −80° C. until extraction. Intracellular metabolites are extracted (from the membrane filter) with 2 mL of a cold MeOH/$H_2O$ (80/20) mixture during 15 min at −80° C. in a Falcon tube. After this extraction time, the Falcon tube is centrifuged at −9° C. for 20 min. Then, the supernatants are removed and transferred to a new tube. A second extraction of the membrane filter is performed with 1 mL with the cold MeOH/$H_2O$ mixture following the same process as just described (except that both extraction time at −80° C. and centrifugation step are reduced to 5 min). The combined supernatant (ca. 3 mL) is filtered through a 0.2 μm syringe filter and 2.4 mL are evaporated to dryness by a Speed-Vac concentrator. Then, the dry extract is re-dissolved with 120 μL of ACN/$H_2O$ (50/50, v/v), filtered again through a 0.2 μm syringe filter and transferred into a HPLC vial for LC-MS analysis.

LC-MS analysis is carried out on a UHPLC system coupled to a Q-Exactive mass spectrometer (ThermoFisher Scientific, Massachusetts, USA) in negative ionization mode. For the LC part, a BEH amide column (1.7 μm, 2.1×100 mm, Waters) conditioned at 25° C. is used. The flow rate is set at 0.5 mL/min and 2 μL of samples are injected. The mobile phase consists of a binary gradient (A: ammonium formate (10 mM)+0.1% ammonium hydroxide and B: acetonitrile) starting with 95% B during 1.5 min then, decreasing to 55% B until 8.5 min and staying at 55% B during 2 min and then, go back to the initial conditions. The total analysis time is 19 min. At the mass level, analyzes are performed in Full MS+ddMS$^2$ mode in negative ionization mode. The set of ions between 80<m/z<1200 Da are considered and all ions with an intensity greater than 1e5 are fragmented with a collision energy of 35 eV in order to obtain additional structural information, if needed. Calibration curves of compounds of interest are recorded under the same LC/MS conditions. Data analysis is performed with Xcalibur v3.0.63 software (ThermoFisher Scientific).

Alternatively, another possibility for the analysis is an HPLC analysis.

Two LC methods are available to detect and quantify Coenzyme A derivative compounds.

The first LC method is performed by a HPLC 1260 system coupled to a Multiple Wavelength Detector (MWD) (Agilent, Santa Clara, USA). The separation is carried out by a Zorbax Eclipse coupled to a C18 column (3.5 μm, 4.6×100 mm, Agilent) conditioned at 30° C. The mobile phase consists of an isocratic elution with acetonitrile (5%) and a phosphate buffer (100 mM) at pH5 (95%) during 10 min. The flow rate is set at 1.5 mL/min and 5 μL of samples are injected.

The second method is performed with a HPLC 1260 system coupled to a Diode Array Detector (DAD) (Agilent, Santa Clara, USA). A ZorbaxsbAq column (5 μm, 4.6×250 mm, Agilent) conditioned at 30° C. is used to separate metabolites. 5 μL of samples is injected. The flow rate is set at 1.5 mL/min. The mobile phase consists of a binary gradient (A: Acetonitrile; and B: H2SO4 8.4 mM) starting with 100% B and then, decreasing to 30% B until 8 min and staying at 30% B during 1 min. During this 1 min at 30% B, the flow rate is increased to 2 mL/min. After 9 min, the binary gradient goes back to the initial conditions (i.e. 100% B and a flow rate at 1.5 mL/min) in 2 min and stays at 100% B during 3 min. The total run time is 14 min.

In both LC methods, the detection of metabolites of interest is performed at A260 nm and calibrations curves of pure compounds are recorded under the respective LC conditions used.

In general, a recombinant organism or microorganism having an increased pool of Coenzyme A (CoA) over the organism or microorganism from which it is derived (while this increased pool of Coenzyme A (CoA) is due to (i) an increased uptake of pantothenate; and/or (ii) an increased conversion of pantothenate into CoA) can be achieved by different recombinant modifications which are described in more detail further below.

Generally, (i) an increased uptake of pantothenate and/or (ii) an increased conversion of pantothenate into CoA can be achieved by the recombinant expression of a certain protein.

Generally, "recombinant" in this context denotes the artificial genetic modification of an organism or microorganism, either by addition, removal, or modification of a chromosomal or extra-chromosomal gene or regulatory motif such as a promoter, or by fusion of organisms, or by addition of a vector of any type, for example plasmidic. The term "recombinant expression" denotes the production of a protein involving a genetic modification, preferably in order to produce a protein of exogenous or heterologous origin with respect to its host, that is, which does not naturally occur in the production host, or in order to produce a modified or mutated endogenous protein.

The "recombinant expression" in the context of the present invention is preferably an "overexpression". "Overexpression" or "overexpressing" in this context denotes the recombinant expression of a protein in a host organism, preferably originating from an organism different from the one in which it is expressed, increased by at least 10% and preferably by 20%, 50%, 100%, 500% and possibly more as compared to the natural expression of said protein occurring in said host organism or microorganism. This definition also encompasses the case where there is no natural expression of said protein.

Thus, in brief, the recombinant expression according to the present invention leading to an increased uptake of pantothenate; and/or an increased conversion of pantothenate into CoA may be due to (1) the overexpression of the respective, preferably endogenous, gene, (2) the introduction of a respective heterologous gene and/or (3) the expression of a mutated protein having an increased activity, e.g., an increased activity for catalysing the corresponding reaction over the respective enzyme from which it is derived or an increased transporter activity.

Without being bound to theory, methods and assays for measuring the (level of) expression a protein may be done by measuring the amount of the corresponding protein. Corresponding methods are well known to the person skilled in the art and include Western Blot, ELISA etc. In another embodiment the measurement of the (level of) expression is done by measuring the amount of the corresponding RNA. Corresponding methods are well known to the person skilled in the art and include, e.g., Northern Blot.

Moreover, methods and assays for measuring an increased activity of an enzyme for catalysing the corresponding reaction or for measuring an increased activity of a transporter over the respective enzyme and transporter, respectively, from which it is derived are well known to the person skilled in the art.

Increasing the Uptake of Pantothenate

According to the present invention, an increased pool of CoA can be achieved by increasing the uptake of pantothenate, i.e., the precursor of CoA, into the recombinant organism or microorganism. Preferably, an increased uptake of pantothenate can be achieved by the recombinant expression of a pantothenate uptake transporter.

Pantothenate uptake and pantothenate uptake transporters are known to the skilled person and have been described in the prior art. Pantothenate uptake and pantothenate uptake transporters are, in particular, well-described in bacteria (Leonardi et al. (Progress in Lipid Research 44, 125-153 (2005))).

It is known that pantothenate is taken up by virtually all bacteria and is essential for those lacking de novo pantothenate biosynthesis, such as *Streptococcus pneumoniae*, *Lactobacillus lactis* and *Hemophilus influenzae*. In *E. coli*, pantothenate uptake is mediated by pantothenate permease, also termed the PanF protein, encoded by the panF gene. PanF uses a sodium-cotransport mechanism to concentrate pantothenate from the medium. PanF is predicted to contain 12 transmembrane hydrophobic domains connected by short hydrophilic chains, a topological motif characteristic of other cation-dependent permeases of the major facilitator superfamily of proteins. The transport system is highly specific for pantothenate, with a Kt of 0.4 µM and a maximum velocity of 1.6 pmol/min/$10^8$ cells. It has been found that overexpression of the PanF protein in *E. coli* produces a 10-fold increase in the rate of pantothenate uptake and concomitant elevation of the steady-state intracellular concentration of pantothenate. Pantothenate is effluxed from *E. coli* which excretes large amounts of pantothenate that it has synthesized de novo. Pantothenate excretion is still active in panF mutants which are unable to take up the vitamin, showing that the uptake is unidirectional, and pointing to the existence of a distinct and uncharacterized efflux system.

Thus, pantothenate transporters are known from a variety of organisms, including eukaryotic and prokaryotic organisms such as yeast and bacteria. The enzyme has, e.g., been described in *E. coli* (wherein the pantothenate transport is mediated by pantothenate permease PanF (encoded by the gene panF; UniProt accession number P16256)), *Lactobacillus lactis* (*Lactobacillus Lactococcus lactis* subsp. *cremoris* (strain MG1363); the enzyme PanT is encoded by the gene panT; Uniprot accession number A2RIQ0), *Saccharomyces cerevisiae* (strain ATCC 204508/S288c; the enzyme Fen2 is encoded by the gene fen2; UniProt accession number P25621) and in *Schizosaccharomyces pombe* (strain 972/ATCC 24843; the enzyme Liz1 is encoded by the gene liz1; UniProt accession number O43000).

Accordingly, in a more preferred embodiment, the pantothenate uptake transporter is the *E. coli*-derived transporter termed PanF encoded by the gene panF. Leonardi (Progress in Lipid Research 44:125-153 (2005)) describes that the overexpression of PanF in *E. coli* produces a 10-fold increase in the rate of pantothenate uptake and concomitant elevation of the steady-state intracellular concentration of pantothenate. The amino acid sequence for the *E. coli*-derived transporter is shown in SEQ ID NO:1.

In other more preferred embodiments, the pantothenate uptake transporter is the *Saccharomyces cerevisiae*-derived transporter termed Fen2, the *Schizosaccharomyces pombe*-derived transporter Liz1 or the *Lactococcus lactis*-derived transporter PanT. The amino acid sequence for the *Saccharomyces cerevisiae*-derived transporter, the *Schizosaccharomyces pombe*-derived transporter or the *Lactococcus lactis*-derived transporter is shown in SEQ ID NO:2, SEQ ID NO:3 and SEQ ID NO:4, respectively.

Thus, in a preferred embodiment of the present invention, the pantothenate uptake transporter is a transporter comprising the amino acid sequence selected from the group consisting of SEQ ID NOs: 1 to 4 or a sequence which is at least n % identical to any of SEQ ID NOs: 1 to 4 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the transporter has the activity of transporting pantothenate into a cell.

As regards the determination of sequence identity, the same applies as has been set forth above.

Increasing the Conversion of Pantothenate into CoA

Figure 4:
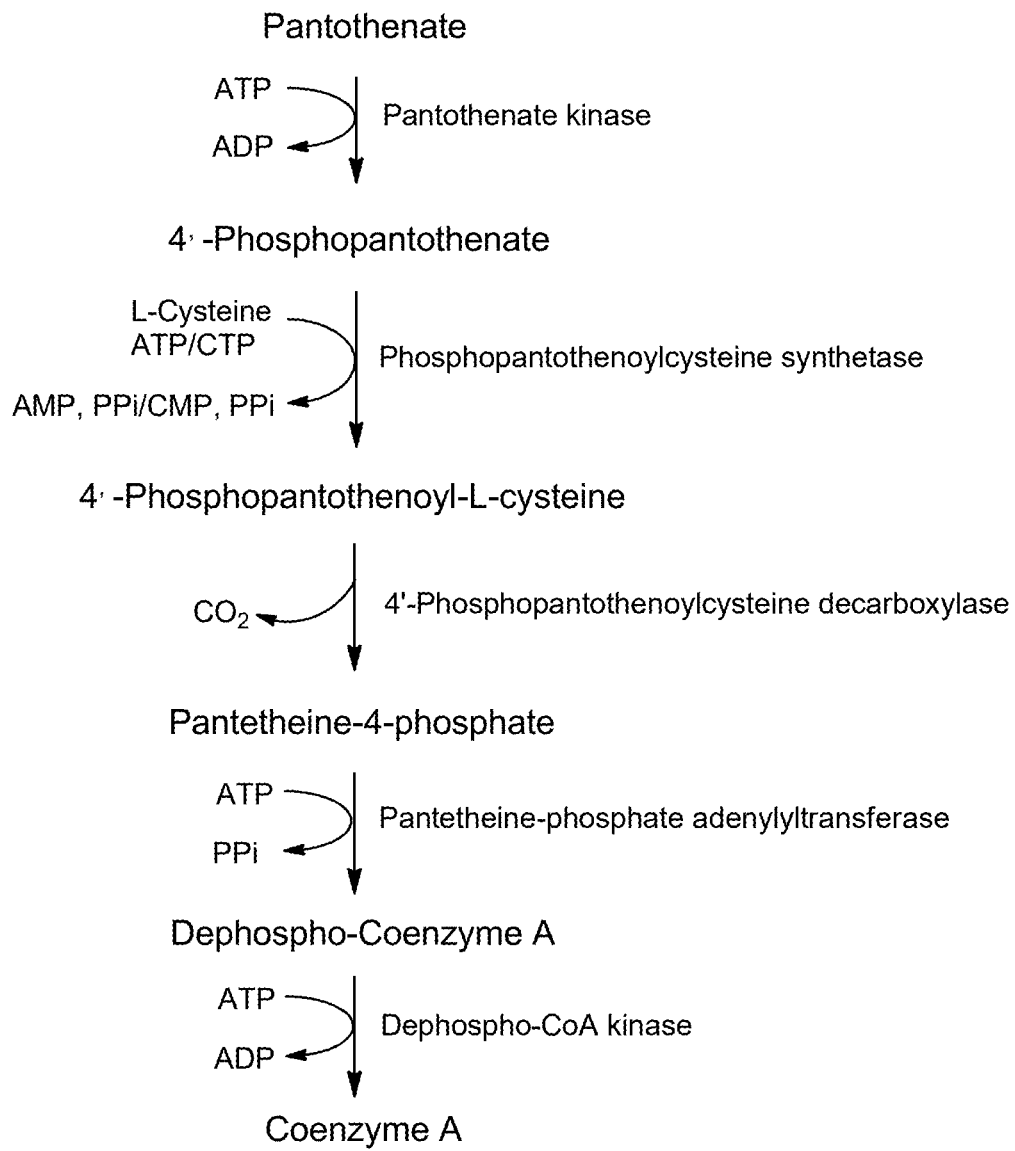

According to the present invention, an increased pool of CoA can be achieved by an increased conversion of pantothenate into CoA. Pantothenate is the starting molecule for the biosynthesis of CoA. The biosynthesis starting from pantothenate into CoA is schematically illustrated in FIG. 4 showing the individual steps of the biosynthesis of Coenzyme A (CoA). As can be derived from FIG. 4, CoA is enzymatically produced from pantothenate in 5 subsequent steps as follows:

first, pantothenate is enzymatically converted into 4'-phosphopantothenate;

second, said 4'-phosphopantothenate and L-cysteine are enzymatically converted into 4'-phosphopantothenoyl-L-cysteine;

third, said 4'-phosphopantothenoyl-L-cysteine is enzymatically converted into pantetheine-4-phosphate;

fourth, said pantetheine-4-phosphate is enzymatically converted into dephospho-CoA; and fifth, said dephospho-CoA is enzymatically converted into CoA.

Figure 5:
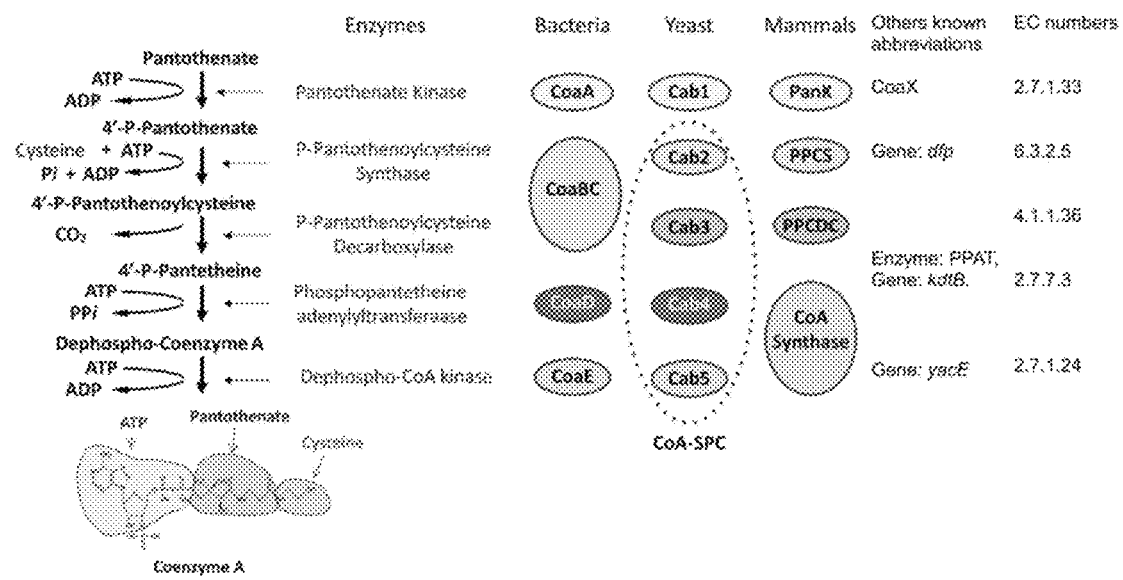

FIG. 5 also illustrates these five steps while this Figure also shows the key enzymes for the conversions from pantothenate to CoA and their respective names in bacteria, yeast and mammals. In the following, these individual steps are described in more detail.

The Enzymatic Conversion of Pantothenate into 4'-Phosphopantothenate

The enzymatic conversion of pantothenate into 4'-phosphopantothenate can be achieved by making use of a pantothenate kinase. In a preferred embodiment, the pantothenate kinase is an enzyme which is classified as EC 2.7.1.33. Pantothenate kinases (EC 2.7.1.33) are enzymes which catalyze the following reaction:

ATP+(R)-pantothenate=ADP+(R)-4'-phosphopantothenate

This enzyme is known from a variety of organisms, including eukaryotic and prokaryotic organisms such as plants, animals, fungi and bacteria. The enzyme has, e.g., been described in *Arabidopsis thaliana, Aspergillus nidulans, Bacillus anthracis, Bacillus subtilis, Brassica napus, Corynebacterium ammoniagenes, Drosophila melanogaster, Enterococcus faecalis* (UniProt accession number Q839J7), *Escherichia coli, Gorilla beringei, Helicobacter pylori, Homo sapiens, Klebsiella pneumoniae* (UniProt accession number B5XYG3), *Lactobacillus plantarum, Micrococcus luteus, Morganella morganii, Mus musculus, Mycobacterium tuberculosis, Orchesella cincta, Picrophilus torridus* (UniProt accession number Q6L215), *Plasmodium falciparum, Pseudomonas aeruginosa* (UniProt accession number Q9HWC1), *Rattus norvegicus, Saccharomyces cerevisiae, Spinacia oleracea, Staphylococcus aureus* (UniProt accession number Q6G710), *Streptomyces peucetius* (UniProt accession number D2K764), *Thermococcus kodakarensis* (UniProt accession number Q5JHF1) and *Thermotoga maritima*. In bacteria, yeast and mammals, the pantothenate kinase is termed CoaA, Cab1, PanK, and CoaX respectively; see FIG. 5 for a summary.

Pantothenate kinase is described in the literature as being the rate-limiting enzyme for CoA synthesis (Liu et al., Biotechnol Biofuels 10(41) (2017)). The pantothenate kinase encoding gene is known to be subjected to retrocontrol by Coenzyme A, thereby limiting its intracellular concentration. A mutated form of the *E. coli*-derived pantothenate kinase encoding gene CoaA having a mutation at position 106 of its amino acid sequence (i.e., R106A) is known to be less sensitive to this feedback inhibition, thereby permitting to increase the pool of CoA in vivo, in particular, by the exogenous addition of the metabolic precursor, i.e., pantothenate (Rock et al., Journal of Bacteriology 18(11) (2003); Vallari et al., Journal of Bacteriology 170(9) (1988)). Moreover, the overexpression of the pantothenate kinase expressing gene PanK has recently been described (U.S. Pat. No. 8,143,035 B2; Vadali et al., Biotechnol. Prog. 20 (2004); Vadali et al., Metabolic Engineering 6 (2004)).

Accordingly, in a preferred embodiment, the pantothenate kinase (EC 2.7.1.33) is the *E. coli*-derived enzyme encoded by coaA (SEQ ID NO:5). Thus, in a preferred embodiment of the present invention, the pantothenate kinase (EC 2.7.1.33) is an enzyme comprising the amino acid sequence of SEQ ID NO: 5 or a sequence which is at least n % identical to SEQ ID NO: 5 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting pantothenate into 4'-phosphopantothenate.

In another preferred embodiment of the present invention, the pantothenate kinase (EC 2.7.1.33) is a variant of the *E. coli*-derived enzyme encoded by coaA comprising the amino acid sequence of SEQ ID NO: 5 or a sequence which is at least n % identical to SEQ ID NO: 5 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting pantothenate into 4'-phosphopantothenate, wherein the pantothenate kinase is characterized in that it shows one substitution, deletion and/or insertion in comparison to the corresponding sequence from which it is derived, preferably in comparison to SEQ ID NO:5, and wherein this substitution, deletion and/or insertion occurs at the position corresponding to position R106 in the amino acid sequence shown in SEQ ID NO:5.

Preferably, said pantothenate kinase variant is an enzyme wherein an amino acid residue at position 106 in the amino acid sequence shown in SEQ ID NO:5 or at a position corresponding to this position, is deleted or substituted with alanine.

A corresponding amino acid sequence is shown in SEQ ID NO:6.

Amino acid residues located at a position corresponding to a position as indicated in the amino acid sequence shown in SEQ ID NO:5 can be identified by the skilled person by methods known in the art. For example, such amino acid residues can be identified by aligning the sequence in question with the sequence shown in SEQ ID NO:5 and by identifying the position which correspond to the above indicated position of SEQ ID NO:5. The alignment can be done with means and methods known to the skilled person, e.g. by using a known computer algorithm such as the Lipman-Pearson method (Science 227 (1985), 1435) or the CLUSTAL algorithm. It is preferred that in such an alignment maximum homology is assigned to conserved amino acid residues present in the amino acid sequences.

In a preferred embodiment ClustalW2 is used for the comparison of amino acid sequences. In the case of pairwise comparisons/alignments, the following settings are preferably chosen: Protein weight matrix: BLOSUM 62; gap open: 10; gap extension: 0.1. In the case of multiple comparisons/alignments, the following settings are preferably chosen: Protein weight matrix: BLOSUM 62; gap open: 10; gap extension: 0.2; gap distance: 5; no end gap.

Preferably, the degree of identity is calculated over the complete length of the sequence.

Thus, in a preferred embodiment of the present invention, the pantothenate kinase is an enzyme comprising the amino acid sequence of SEQ ID NO: 6 or a sequence which is at least n % identical to SEQ ID NO: 6 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting pantothenate into 4'-phosphopantothenate.

Further, the pantothenate kinase CoaA from *Staphylococcus aureus* (Choudhry et al., Antimocrobial Agents and Chemotherapy 47(6) (2003)) and the putative pantothenate kinase CoaA from *Bacillus anthracis* are moderately related to the eukaryotic panK proteins and unrelated to the *E. coli* CoaA. In particular, the CoaA from *Staphylococcus aureus* is not inhibited by CoA while this organism is known to possess a considerable pool of CoA. As regards the CoaA from *Staphylococcus aureus*, see also http://parts.igem.orq/Part:BBa K1692021.

Moreover, the genes CoaX from *Helicobacter pylori* and *Bacillus subtilis* are known to be unaffected by CoA and acetyl-CoA (Brand and Strauss, Journal of Biological Chemistry 21 (2005)).

Accordingly, in a preferred embodiment, the pantothenate kinase (EC 2.7.1.33) is the *Staphylococcus aureus*-derived enzyme encoded by coaA (SEQ ID NO:7), *Heliobacter pylori*-derived enzyme encoded by coaX (SEQ ID NO:8) or the *Bacillus subtilis*-derived enzyme encoded by coaX (SEQ ID NO:9).

Thus, in a preferred embodiment of the present invention, the pantothenate kinase (EC 2.7.1.33) is an enzyme comprising the amino acid sequence selected from the group consisting of SEQ ID NO: 7 to 9 or a sequence which is at least n % identical to any one of SEQ ID NO: 7 to 9 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting pantothenate into 4'-phosphopantothenate.

The Enzymatic Conversion of 4'-Phosphopantothenate and L-Cysteine into 4'-Phosphopantothenoyl-L-Cysteine According to the present invention, an increased conversion of pantothenate into CoA can be achieved by the recombinant expression of an enzyme catalyzing the enzymatic conversion of 4'-phosphopantothenate and L-cysteine into 4'-phosphopantothenoyl-L-cysteine, preferably by making use of a phosphopantothenoylcysteine synthase. The phosphopantothenoylcysteine synthase is preferably an enzyme which is classified as EC 6.3.2.5. Phosphopantothenoylcysteine synthases (EC 6.3.2.5), also termed phosphopantothenate-cysteine ligases (CTP), are enzymes which catalyze the following reaction:

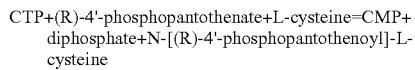
CTP+(R)-4'-phosphopantothenate+L-cysteine=CMP+ diphosphate+N-[(R)-4'-phosphopantothenoyl]-L-cysteine This enzyme is known from a variety of organisms, including eukaryotic and prokaryotic organisms such as animals and bacteria. The enzyme has, e.g., been described in *Anas platyrhynchos, Corynebacterium ammoniagenes, Drosophila melanogaster, Enterococcus faecalis, Escherichia coli, Homo sapiens, Methanocaldococcus jannaschii* (UniProt accession number Q58323), *Micrococcus luteus, Morganella morganii, Pseudomonas aeruginosa, Rattus norvegicus* and *Saccharomyces cerevisiae*. In yeast and mammals, the phosphopantothenoylcysteine synthase is termed Cab2 and PPCS, respectively; see FIG. 5 for a summary. In *Escherichia coli* and most bacteria, the synthesis of pantetheine-4-phosphate (corresponding to the $3^{rd}$ step of the CoA biosynthesis described further below) is catalyzed from 4'-phosphopantothenate and L-cysteine by the bifunctional Dfp (also termed CoaBC) flavoproteins in a multistep process (see FIG. 5 for a summary). Two enzymatic activities, PPCS and PPCDS, are located within the C-terminal and N-terminal domains of a bifunctional (fused) protein.

In contrast, bacteria of the genus *Streptococcus* and *Enterococcus* possess two separate open reading frames (ORFs) predicted to encode CoaB and CoaC (Gerdes, Journal of Bacteriology 184(16) (2002)).

The phosphopantothenoylcysteine synthase (EC 6.3.2.5) has also, e.g., been described in *Saccharomyces cerevisiae*.

Accordingly, in a preferred embodiment, the phosphopantothenoylcysteine synthase (EC 6.3.2.5), is the *Enterococcus*-derived enzyme encoded by coaB (SEQ ID NO:10) or the *Saccharomyces cerevisiae*-derived enzyme encoded by cab2 (SEQ ID NO:11). Thus, in a preferred embodiment of the present invention, the phosphopantothenoylcysteine synthase (EC 6.3.2.5) is an enzyme comprising the amino acid sequence of SEQ ID NO: 10 or SEQ ID NO:11 or a sequence which is at least n % identical to SEQ ID NO: 10 or SEQ ID NO:11 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting 4'-phosphopantothenate and L-cysteine into 4'-phosphopantothenoyl-L-cysteine. As regards the determination of the sequence identity, the same applies as has been set forth above.

As mentioned above, in *Escherichia coli* and most eubacteria as well as, e.g., in *Streptococcus pneumoniae*, the synthesis of pantetheine-4-phosphate (corresponding to the $3^{rd}$ step of the CoA biosynthesis described further below) is catalyzed from 4'-phosphopantothenate and L-cysteine by the bifunctional Dfp (also termed CoaBC) flavoproteins in a multistep process (see FIG. 5 for a summary). Accordingly, in a preferred embodiment, the bifunctional enzyme with phosphopantothenoylcysteine synthase/4'-phosphopantothenoylcysteine decarboxylase activities is the *E. coli*-derived enzyme CoaBC (SEQ ID NO:12) or the *Streptococcus pneumonia*-derived enzyme CoaBC (SEQ ID NO:13). Thus, in a preferred embodiment of the present invention, the bifunctional enzyme with phosphopantothenoylcysteine synthase/phosphopantothenoylcysteine decarboxylase activities is an enzyme comprising the amino acid sequence of SEQ ID NO: 12 or SEQ ID NO:13 or a sequence which is at least n % identical to SEQ ID NO: 12 or SEQ ID NO:13 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting 4'-phosphopantothenate and L-cysteine into pantetheine-4-phosphate. As regards the determination of the sequence identity, the same applies as has been set forth above.

Regarding the *E. coli*-derived bifunctional protein CoaBC (Dfp) structural information and site-directed mutagenesis data are available (Kupke, J. Biol. Chem 276 (2001); Kupke, Eur. J. Biochem. 271 (2004)).

The Enzymatic Conversion of 4'-Phosphopantothenoyl-L-Cysteine into Pantetheine-4-Phosphate According to the present invention, an increased conversion of pantothenate into CoA can be achieved by the recombinant expression of an enzyme catalyzing the enzymatic conversion of 4'-phosphopantothenoyl-L-cysteine into pantetheine-4-phosphate, preferably by making use of a 4'-phosphopantothenoylcysteine decarboxylase. In a preferred embodiment, the 4'-phosphopantothenoylcysteine decarboxylase is an enzyme which is classified as EC 4.1.1.36. 4'-Phosphopantothenoylcysteine decarboxylases (EC 4.1.1.36), also termed phosphopantothenoylcysteine decarboxylases, are enzymes which catalyze the following reaction:

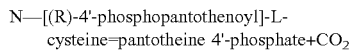
N—[(R)-4'-phosphopantothenoyl]-L-cysteine=pantotheine 4'-phosphate+$CO_2$ This enzyme is known from a variety of organisms, including eukaryotic and prokaryotic organisms such as plants, animals and bacteria. The enzyme has, e.g., been described in *Anas platyrhynchos, Arabidopsis thaliana, Bos taurus, Drosophila melanogaster, Enterococcus faecalis, Equus caballus, Escherichia coli, Homo sapiens, Methanocaldococcus jannaschii, Micrococcus luteus, Morganella morganii, Mycobacterium tuberculosis, Nicotiana tabacum, Oryctolagus cuniculus, Oryza sativa, Rattus norvegicus, Saccharomyces cerevisiae* and *Sus scrofa*. In yeast and mammals, the 4'-phosphopantothenoylcysteine decarboxylase is termed Cab3 and PPCDC, respectively; see FIG. 5 for a summary.

As mentioned above in the context of the $2^{nd}$ step of the CoA biosynthesis, bacteria of the genus *Streptococcus* and *Enterococcus* possess separate genes predicted to encode CoaB and CoaC (Genschel, Molecular Biology and Evolution 21(7) (2004)).

The 4'-phosphopantothenoylcysteine decarboxylase (EC 4.1.1.36) has also been described in *Saccharomyces cerevisiae*.

Accordingly, in a preferred embodiment, the 4'-phosphopantothenoylcysteine decarboxylase (EC 4.1.1.36) is the *Enterococcus*-derived enzyme encoded by coaC (SEQ ID NO:14) or the *Saccharomyces cerevisiae*-derived enzyme encoded by cab4 (SEQ ID NO:15). Thus, in a preferred embodiment of the present invention, the 4'-phosphopantothenoylcysteine decarboxylase (EC 4.1.1.36) is an enzyme comprising the amino acid sequence of SEQ ID NO: 14 or SEQ ID NO:15 or a sequence which is at least n % identical to SEQ ID NO: 14 or SEQ ID NO:15 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting 4'-phosphopantothenoyl-L-cysteine into pantetheine-4-phosphate. As regards the determination of the sequence identity, the same applies as has been set forth above.

As mentioned above, in *Escherichia coli* and most eubacteria, the synthesis of pantetheine-4-phosphate is catalyzed from 4'-phosphopantothenate and L-cysteine by the bifunctional Dfp (also termed CoaBC) flavoproteins in a multistep process (see FIG. 5 for a summary). Accordingly, as regards preferred embodiments of the bifunctional enzyme with phosphopantothenoylcysteine synthase/4'-phosphopantothenoylcysteine decarboxylase activities, the same applies as has been set forth above in the context of the $3^{rd}$ step of the CoA biosynthesis.

The Enzymatic Conversion of Pantetheine-4-Phosphate into Dephospho-CoA

According to the present invention, an increased conversion of pantothenate into CoA can be achieved by the recombinant expression of an enzyme catalyzing the enzymatic conversion of pantetheine-4-phosphate into dephospho-CoA, preferably by making use of a pantotheine-phosphate adenylyltransferase. In a preferred embodiment, the pantotheine-phosphate adenylyltransferase is an enzyme which is classified as EC 2.7.7.3. Pantotheine-phosphate adenylyltransferases (EC 2.7.7.3), also termed pantetheine-phosphate adenylyltransferases, are enzymes which catalyze the following reaction:

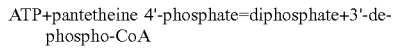
ATP+pantetheine 4'-phosphate=diphosphate+3'-dephospho-CoA

This enzyme is known from a variety of organisms, including eukaryotic and prokaryotic organisms such as plants, animals and bacteria. The enzyme has, e.g., been described in *Anas* sp., *Arabidopsis thaliana, Burkholderia pseudomallei* (UniProt accession number Q3JW91), *Candida albicans* (UniProt accession number B9WCR8), *Columba* sp., *Corynebacterium ammoniagenes, Enterococcus faecalis, Enterococcus faecium, Escherichia coli, Haemophilus influenzae* (UniProt accession number P44805), *Helicobacter pylori* (UniProt accession number O26010), *Homo sapiens, Micrococcus luteus, Mycobacterium tuberculosis* (UniProt accession number P9WPA5), *Pseudomonas aeruginosa* (UniProt accession number Q916D1), *Pyrococcus abyssi, Rattus norvegicus, Staphylococcus aureus* (UniProt accession number P63820), *Streptococcus mutans* (UniProt accession number Q8DVH2), *Streptococcus pneumoniae* (UniProt accession number Q8DNE6), *Streptococcus pyogenes, Sus scrofa* and *Thermus thermophilus*. In bacteria and yeast, the pantotheine-phosphate adenylyltransferase is termed CoaD and Cab4, respectively. This enzyme is also referred to as PPAT and KdtB; see FIG. 5 for a summary.

CoaD derived from *E. coli* is known to be feedback inhibited by CoA, which is competitive with ATP, pantetheine-4-phosphate (its substrate) and dephospho-CoA (its product) (*Leonardi* et al., Progress in Lipid Research 44:125-153 (2005)).

Thus, in a preferred embodiment, the pantotheine-phosphate adenylyltransferase (EC 2.7.7.3) is the *E. coli* (Uniprot number P0A6I6)-derived enzyme encoded by coaD (SEQ ID NO:18).

Thus, in a preferred embodiment of the present invention, the pantotheine-phosphate adenylyltransferase (EC 2.7.7.3) is an enzyme comprising the amino acid sequence of SEQ ID NO:18 or a sequence which is at least n % identical to SEQ ID NO:18 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting pantetheine-4-phosphate into dephospho-CoA. As regards the determination of the sequence identity, the same applies as has been set forth above.

As mentioned above, *Staphylocccus aureus* is known to posses a considerable pool of CoA. Accordingly, in a preferred embodiment, the pantotheine-phosphate adenylyltransferase (EC 2.7.7.3) is the *S.aureus* (strain MW2) (Uniprot number P63820)-derived enzyme encoded by coaD (SEQ ID NO:16) or the *Burkholderia pseudomallei* (strain 1710b) (Uniprot number Q3JW91)-derived enzyme encoded by coaD (SEQ ID NO:17). Thus, in a preferred embodiment of the present invention, the pantotheine-phosphate adenylyltransferase (EC 2.7.7.3) is an enzyme comprising the amino acid sequence of SEQ ID NO: 16 or SEQ ID NO:17 or a sequence which is at least n % identical to SEQ ID NO: 16 or SEQ ID NO:17 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting pantetheine-4-phosphate into dephospho-CoA. As regards the determination of the sequence identity, the same applies as has been set forth above. The amino acid sequence of CoaD from *S.aureus* (strain MW2) (Uniprot number P63820) and the amino acid sequence of CoaD from *Burkholderia pseudomallei* (strain 1710b) (Uniprot number Q3JW91) have a sequence identity of about 47%.

The Enzymatic Conversion of Dephospho-CoA into CoA

According to the present invention, an increased conversion of pantothenate into CoA can be achieved by the recombinant expression of an enzyme catalyzing the enzymatic conversion of dephospho-CoA into CoA, preferably by making use of a dephospho-CoA kinase.

In a preferred embodiment, the dephospho-CoA kinase is an enzyme which is classified as EC 2.7.1.24. Dephospho-CoA kinases (EC 2.7.1.24) are enzymes which catalyze the following reaction:

ATP+3'-dephospho-CoA=ADP+CoA

This enzyme is known from a variety of organisms, including eukaryotic and prokaryotic organisms such as plants, animals and bacteria. The enzyme has, e.g., been described in *Anas platyrhynchos, Aquifex aeolicus, Columba* sp., *Corynebacterium ammoniagenes, Escherichia coli* (UniProt accession number P0A619), *Haemophilus influenzae* (UniProt accession number P44920), *Homo sapiens, Legionella pneumophila* (UniProt accession number Q5ZVH3), *Micrococcus luteus, Mycobacterium tuberculosis, Rattus norvegicus, Saccharomyces cerevisiae, Streptomyces peucetius* (UniProt accession number D5MBE3), *Sus scrofa* and *Thermus thermophilus*. In bacteria and yeast, the dephospho-CoA kinase is termed CoaE and Cab5, respectively. This enzyme is also referred to as YacE; see FIG. 5 for a summary.

In a preferred embodiment, the pantothenate kinase (EC 2.7.1.24) is the *E. coli*-derived enzyme encoded by coaE (SEQ ID NO:19) or the *Saccharomyces cerevisiae*-derived enzyme encoded by cab5 (SEQ ID NO:20). Thus, in a preferred embodiment of the present invention, the dephospho-CoA kinase (EC 2.7.1.24) is an enzyme comprising the amino acid sequence of SEQ ID NO: 19 or SEQ ID NO:20 or a sequence which is at least n % identical to SEQ ID NO: 19 or SEQ ID NO:20 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting dephospho-CoA into CoA. As regards the determination of the sequence identity, the same applies as has been set forth above. The structure of the *E. coli*-derived dephospho-CoA kinase (EC 2.7.1.24) has been described (O'Toole et al., Protein Science 12 (2003)).

Increasing the Yield and Flux of Acetyl-CoA

In preferred embodiments, the recombinant organism or microorganism of the present invention is further characterized by
a) having phosphoketolase activity;
b) (i) having a diminished or inactivated Embden-Meyerhof-Parnas pathway (EMPP) by inactivation of the gene(s) encoding phosphofructokinase or by reducing phosphofructokinase activity as compared to a non-modified microorganism; or
   (ii) not possessing phosphofructokinase activity
and
c) (i) having a diminished or inactivated oxidative branch of the pentose phosphate pathway (PPP) by inactivation of the gene(s) encoding glucose-6-phosphate dehydrogenase or by reducing glucose-6-phosphate dehydrogenase activity as compared to a non-modified microorganism; or
   (ii) not possessing glucose-6-phosphate dehydrogenase activity.

A corresponding recombinant organism or microorganism has recently been described in WO 2013/007786. The disclosure of this document, in particular with respect to preferred embodiments of the enzymes described therein, is herewith incorporated by reference in its entirety. Accordingly, in preferred embodiments, it is preferable to use the enzymes selected from the preferred embodiments described in WO 2013/007786.

The term "phosphoketolase activity" as used in the present invention means an enzymatic activity that is capable of converting D-xylulose-5-phosphate into D-glyceraldehyde-3-phosphate according to the following reaction:

D-xylulose-5-phosphate+phosphate→D-glyceraldehyde-3-phosphate+acetyl-phosphate+water or that is capable to catalyze the above shown reaction and that is also able to convert D-fructose-6-phosphate to D-erythrose-4-phosphate according to the following reaction:

D-Fructose 6-phosphate+phosphate→acetyl phosphate+D-erythrose 4-phosphate+water

The former phosphoketolases are usually classified in EC 4.1.2.9 and the latter in EC 4.1.2.22. Both types of phosphoketolases can be employed in the scope of the present invention. This enzymatic activity can be measured by assays known in the art. An example for such an assay is given in WO 2013/007786.

In the context of the present invention, an organism or microorganism which has phosphoketolase activity can, e.g., be an organism or microorganism which naturally has phosphoketolase activity or an organism or microorganism that does not naturally have phosphoketolase activity and has been genetically modified to express a phosphoketolase or an organism or microorganism which naturally has phosphoketolase activity and which has been genetically modified, e.g. transformed with a nucleic acid, e.g. a vector, encoding a phosphoketolase in order to increase the phosphoketolase activity in said microorganism. Organisms or microorganisms that inherently, i.e. naturally, have phosphoketolase activity are known in the art and any of them can be used in the context of the present invention. It is also possible in the context of the present invention that the organism or microorganism is an organism or microorganism which naturally does not have phosphoketolase activity but which is genetically modified so as to comprise a nucleotide sequence allowing the expression of a phosphoketolase. Similarly, the organism or microorganism may also be an organism or microorganism which naturally has phosphoketolase activity but which is genetically modified so as to enhance the phosphoketolase activity, e.g. by the introduction of an exogenous nucleotide sequence encoding a phosphoketolase. The genetic modification of organisms or microorganisms to express an enzyme of interest will be described in detail below.

The phosphoketolase expressed in the organism or microorganism according to the invention can be a naturally occurring phosphoketolase or it can be a phosphoketolase which is derived from a naturally occurring phosphoketolase, e.g. by the introduction of mutations or other alterations which, e.g., alter or improve the enzymatic activity, the stability, etc. Accordingly, in a preferred embodiment, the recombinant organism or microorganism of the present invention is an organism or microorganism which has been genetically modified to have an increased phosphoketolase activity. Methods for modifying and/or improving the desired enzymatic activities of proteins are well-known to the person skilled in the art and include, e.g., random mutagenesis or site-directed mutagenesis and subsequent selection of enzymes having the desired properties or approaches of the so-called "directed evolution" as described in more detail further below.

The organism or microorganism according to the present invention is preferably further characterised by having a diminished or inactivated Embden-Meyerhof-Parnas pathway (EMPP) by inactivation of the gene(s) encoding a phosphofructokinase or by reducing the phosphofructokinase activity as compared to a non-modified organism or microorganism or by not possessing phosphofructokinase activity. Thus, the organism or microorganism is either an organism or microorganism which naturally has an EMPP including phosphofructokinase activity but which has been modified, in particular genetically modified, so that the phosphofructokinase activity is either completely abolished or so that it is reduced compared to the corresponding non-modified organism or microorganism, or the organism or microorganism is an organism or microorganism which naturally does not possess a phosphofructokinase activity.

The "phosphofructokinase activity" means an enzymatic activity that converts ATP and fructose-6-phosphate to ADP and fructose-1,6-bisphosphate (EC 2.7.1.11). This enzymatic activity can be measured by assays known in the art as, for example, described by Kotlarz et al. (Methods Enzymol. (1982) 90, 60-70).

The term "an organism or microorganism which is characterised by having a diminished or inactivated Embden-Meyerhof-Parnas pathway (EMPP) by inactivation of the gene(s) encoding a phosphofructokinase or by reducing the phosphofructokinase activity as compared to a non-modified organism or microorganism" preferably refers to an organism or microorganism in which the inactivation of the gene(s) encoding a phosphofructokinase or the reduction of the phosphofructokinase activity as compared to a non-modified organism or microorganism is achieved by a genetic modification of the organism or microorganism which leads to said inactivation or reduction.

In a preferred embodiment, the recombinant organism or microorganism of the present invention is a recombinant organism or microorganism that has an inactivated Embden-Meyerhof-Parnas pathway (EMPP) by inactivation of the gene(s) encoding a phosphofructokinase. The inactivation of the gene(s) encoding a phosphofructokinase in the context of the present invention means that the gene(s) coding for phosphofructokinase which are present in the organism or microorganism is (are) inactivated so that they are no longer expressed and/or do not lead to the synthesis of functional phosphofructokinase. Inactivation can be achieved by many different ways known in the art. The inactivation can, e.g., be achieved by the disruption of the gene(s) encoding the phosphofructokinase or by clean deletion of said gene(s) through the introduction of a selection marker. Alternatively, the promoter of the gene(s) encoding the phosphofructokinase can be mutated in a way that the gene is no longer transcribed into mRNA. Other ways to inactivate the gene(s) encoding the phosphofructokinase known in the art are: to express a polynucleotide encoding RNA having a nucleotide sequence complementary to the transcript of the phosphofructokinase gene(s) so that the mRNA can no longer be translated into a protein, to express a polynucleotide encoding RNA that suppresses the expression of said gene(s) through RNAi effect; to express a polynucleotide encoding RNA having an activity of specifically cleaving a transcript of said gene(s); or to express a polynucleotide encoding RNA that suppresses expression of said gene(s) through co-suppression effect. These polynucleotides can be incorporated into a vector, which can be introduced into the organism or microorganism by transformation to achieve the inactivation of the gene(s) encoding the phosphofructokinase.

The term "inactivation" in the context of the present invention preferably means complete inactivation, i.e. that the organism or microorganism does not show phosphofructokinase activity. This means in particular that the organism or microorganism does not show phosphofructokinase activity independent from the used growth conditions.

Preferably, "inactivation" means that the gene(s) encoding phosphofructokinase which are present in the organism or microorganism are genetically modified so as to prevent the expression of the enzyme. This can be achieved, e.g. by deletion of the gene or parts thereof wherein the deletion of parts thereof prevents expression of the enzyme, or by disruption of the gene either in the coding region or in the promoter region wherein the disruption has the effect that no protein is expressed or a dysfunctional protein is expressed.

In a preferred embodiment, the recombinant organism or microorganism of the present invention is a recombinant organism or microorganism that has a diminished Embden-Meyerhof-Parnas pathway (EMPP) by reducing the phosphofructokinase activity as compared to a non-modified organism or microorganism. Preferably, this reduction is achieved by a genetic modification of the organism or microorganism. This can be achieved e.g., by random mutagenesis or site-directed mutagenesis of the promoter and/or the enzyme and subsequent selection of promoters and/or enzymes having the desired properties or by complementary nucleotide sequences or RNAi effect as described above.

In the context of the present invention, a "reduced activity" means that the expression and/or the activity of an enzyme, in particular of the phosphofructokinase, in the genetically modified organism or microorganism is at least 10%, preferably at least 20%, more preferably at least 30% or 50%, even more preferably at least 70% or 80% and particularly preferred at least 90% or 100% lower than in the corresponding non-modified organism or microorganism. Methods for measuring the level of expression of a given protein in a cell are well known to the person skilled in the art. Assays for measuring the reduced enzyme activity of a phosphofructokinase are known in the art.

In another embodiment the organism or microorganism according to the present invention is an organism or microorganism which does not possess a phosphofructokinase activity. This preferably means that such an organism or microorganism naturally does not possess a phosphofructokinase activity. This means that such an organism or microorganism does naturally not contain in its genome a nucleotide sequence encoding an enzyme with phosphofructokinase activity. Examples for such microorganisms are *Zymomonas mobilis* (J. S. Suo et al., Nat. Biotechnol. 23:63 (2005)) and *Ralstonia eutropha* (C. Fleige et al., Appl. Microb. Cell Physiol. 91:769 (2011)).

The organism or microorganism according to the present invention is preferably further characterised by having a diminished or inactivated oxidative branch of the pentose phosphate pathway (PPP) by inactivation of the gene(s) encoding a glucose-6-phosphate dehydrogenase or by reducing the glucose-6-phosphate dehydrogenase activity as compared to a non-modified organism or microorganism or by not possessing glucose-6-phosphate dehydrogenase activity. Thus, the organism or microorganism is either an organism or microorganism which naturally has a PPP including glucose-6-phosphate dehydrogenase activity but which has been modified, in particular genetically modified, so that the glucose-6-phosphate dehydrogenase activity is either completely abolished or so that it is reduced compared to the corresponding non-modified organism or microorganism, or the organism or microorganism is an organism or microorganism which naturally does not possess a glucose-6-phosphate dehydrogenase activity.

The "glucose-6-phosphate dehydrogenase activity" means an enzymatic activity that converts glucose-6-phosphate and NADP$^+$ to 6-phosphoglucono-δ-lactone and NADPH (EC 1.1.1.49). This enzymatic activity can be measured by assays known in the art as, for example, described by Noltmann et al. (J. Biol. Chem. (1961) 236, 1225-1230).

The term "an organism or microorganism which is characterised by having a diminished or inactivated oxidative branch of the pentose phosphate pathway (PPP) by inactivation of the gene(s) encoding a glucose-6-phosphate dehydrogenase or by reducing the glucose-6-phosphate dehydrogenase activity as compared to a non-modified organism or microorganism" preferably refers to an organism or microorganism in which the inactivation of the gene(s) encoding a glucose-6-phosphate dehydrogenase or the reduction of the glucose-6-phosphate dehydrogenase activity as compared to a non-modified organism or microorganism is achieved by a genetic modification of the organism or microorganism which leads to said inactivation or reduction.

In a preferred embodiment, the recombinant organism or microorganism of the present invention is a recombinant organism or microorganism that has an inactivated oxidative branch of the pentose phosphate pathway (PPP) by inactivation of the gene(s) encoding a glucose-6-phosphate dehydrogenase. The inactivation of the gene(s) encoding a glucose-6-phosphate dehydrogenase in the context of the present invention means that the gene(s) coding for glucose-6-phosphate dehydrogenase which is (are) present in the organism or microorganism is (are) inactivated so that they are no longer expressed and/or do not lead to the synthesis of functional glucose-6-phosphate dehydrogenase. Inactivation can be achieved by many different ways known in the art. The inactivation can, e.g., be achieved by the disruption of the gene(s) encoding the glucose-6-phosphate dehydrogenase or by clean deletion of said gene(s) through the introduction of a selection marker. Alternatively, the promoter of the gene(s) encoding the glucose-6-phosphate dehydrogenase can be mutated in a way that the gene(s) is/are no longer transcribed into mRNA. Other ways to inactivate the gene(s) encoding the phosphofructokinase known in the art are: to express a polynucleotide encoding RNA having a nucleotide sequence complementary to the transcript of the glucose-6-phosphate dehydrogenase gene(s) so that the mRNA can no longer be translated into a protein, to express a polynucleotide encoding RNA that suppresses the expression of said gene(s) through RNAi effect; to express a polynucleotide encoding RNA having an activity of specifically cleaving a transcript of said gene(s); or to express a polynucleotide encoding RNA that suppresses expression of said gene(s) through co-suppression effect. These polynucleotides can be incorporated into a vector, which can be introduced into the organism or microorganism by transformation to achieve the inactivation of the gene(s) encoding the glucose-6-phosphate dehydrogenase.

The term "inactivation" in the context of the present invention preferably means complete inactivation, i.e. that the organism or microorganism does not show glucose-6-phosphate dehydrogenase activity. This means in particular that the organism or microorganism does not show glucose-6-phosphate dehydrogenase activity independent from the used growth conditions.

Preferably, "inactivation" means that the gene(s) encoding glucose-6-phosphate dehydrogenase which are present in the organism or microorganism are genetically modified so as to prevent the expression of the enzyme. This can be achieved, e.g. by deletion of the gene or parts thereof wherein the deletion of parts thereof prevents expression of the enzyme, or by disruption of the gene either in the coding region or in the promoter region wherein the disruption has the effect that no protein is expressed or a dysfunctional protein is expressed.

In a preferred embodiment, the recombinant organism or microorganism of the present invention is a recombinant organism or microorganism that has a diminished oxidative branch of the pentose phosphate pathway (PPP) by reducing the glucose-6-phosphate dehydrogenase activity as compared to a non-modified organism or microorganism. Preferably, this reduction is achieved by a genetic modification of the organism or microorganism. This can be achieved e.g., by random mutagenesis or site-directed mutagenesis of the promoter and/or the enzyme and subsequent selection of promoters and/or enzymes having the desired properties or by complementary nucleotide sequences or RNAi effect as described above. A detailed description of genetic modification of organisms or microorganisms will be given further below.

In the context of the present invention, a "reduced activity" means that the expression and/or the activity of an enzyme, in particular of the glucose-6-phosphate dehydrogenase, in the genetically modified organism or microorganism is at least 10%, preferably at least 20%, more preferably at least 30% or 50%, even more preferably at least 70% or 80% and particularly preferred at least 90% or 100% lower than in the corresponding non-modified organism or microorganism. Methods for measuring the level of expression of a given protein in a cell are well known to the person skilled in the art. Assays for measuring the reduced enzyme activity of a glucose-6-phosphate dehydrogenase are known in the art.

In another embodiment the organism or microorganism according to the present invention is an organism or microorganism which does not possess a glucose-6-phosphate dehydrogenase activity. This preferably means that such an organism or microorganism naturally does not possess a glucose-6-phosphate dehydrogenase activity. This means that such an organism or microorganism does naturally not contain in its genome a nucleotide sequence encoding an enzyme with glucose-6-phosphate dehydrogenase activity. Examples for such microorganisms are *Acinetobacter baylyi* (Barbe et al., Nucl. Acids Res. 32 (2004), 5766-5779), archae of the hyperthermophilic phylum such as *Sulfolobus solfataricus* (Nunn et al., J. Biol. Chem. 285 (2010), 33701-33709), *Thermoproteus tenax*, *Thermoplasma acidophilum* and *Picrophilus torridus* (Reher and Schönheit, FEBS Lett. 580 (2006), 1198-1204).

In a further embodiment, the organism or microorganism according to the present invention is further characterised by having fructose-1,6-bisphosphate phosphatase activity, preferably when grown on glucose. Fructose-1,6-bisphosphate phosphatase is an enzyme participating in the gluconeogenesis hydrolyzing fructose-1,6-bisphosphate into fructose-6-phosphate and free phosphate. However, in basically all organisms in the presence of glucose, fructose-1,6-bisphosphate phosphatase activity is repressed and glucose is processed through EMPP (glycolysis). The organism or microorganism of the present invention, which has phosphoketolase activity and which does not possess phosphofructokinase activity or in which phosphofructokinase activity is reduced or whose gene encoding the phosphofructokinase is inactivated, the yield of acetyl-CoA by conversion of fructose-6-phosphate with the phosphoketolase (EC 4.1.2.9 or EC 4.1.2.22) can be enhanced by ensuring the presence of fructose-1,6-bisphosphate phosphatase activity, for example by derepression of the fructose-1,6-bisphosphate phosphatase in the presence of glucose. The presence of fructose-1,6-bisphosphate phosphatase activity results in the recycling of fructose-1,6-bisphosphate produced by fructose-1,6-bisphosphate aldolase into fructose-6-phosphate which can then again be converted via the phosphoketolase pathway to acetyl-CoA. Indeed, the product acetyl phosphate of phosphoketolase interconverts into acetyl-CoA through the action of the enzyme phosphate acetyltransferase EC 2.3.1.8. Thus, the recombinant organism or microorganism of the present invention is capable of producing acetyl-CoA from glucose at a stoichiometry approaching 3:1.

The term "fructose-1,6-bisphosphate phosphatase activity" means an enzymatic activity that converts fructose-1,6-bisphosphate and $H_2O$ to fructose-6-phosphate and phosphate (EC 3.1.3.11). This enzymatic activity can be measured by assays known in the art as, for example, described by Hines et al. (J. Biol. Chem. (2007) 282, 11696-11704). The terms "fructose-1,6-bisphosphate phosphatase activity" and "fructose-1,6-bisphosphate phosphatase" also cover enzymes which are bifunctional in the sense that they show a fructose-1-6-bisphosphate aldolase/phosphatase activity. Such bifunctional enzymes are expressed in most archaeal and deeply branching bacterial lineages and, in most cases, are heat-stable. Such enzymes are, for example, reported for *Thermococcus kodakaraensis, Sulfolobus tokodaii, Ignicoccus hospitalis, Cenarchaeum symbiosum, Sulfolobus solfataricas, Thermus thermophilus, Thermoproteus neutrophilus, Moorella thermoacetica* and many others (see, e.g., Say and Fuchs (Nature 464 (2010), 1077); Fushinobu et al. (Nature 478 (2011), 538; Du et al. (Nature 478 (2011), 534).

The term "fructose-1,6-bisphosphate phosphatase activity when grown on glucose" means that the organism or microorganism expresses an enzyme with fructose-1,6-bisphosphate phosphatase activity when the organism or microorganism is grown on glucose. "Grown on glucose" means that the organism or microorganism is grown in a medium which contains inter alia glucose as carbon source. Preferably, this term means that the organism or microorganism is grown in a medium containing glucose as sole carbon source.

In the context of the present invention, an organism or microorganism which has fructose-1,6-bisphosphate phosphatase activity, in particular when grown on glucose, can, for example, be an organism or microorganism which naturally has fructose-1,6-bisphosphate phosphatase activity, in particular when grown on glucose, or an organism or microorganism that does not naturally have fructose-1,6-bisphosphate phosphatase activity, in particular when grown on glucose, and that has been genetically modified to express a fructose-1,6-bisphosphate phosphatase, in particular when grown on glucose. It may also be an organism or microorganism which naturally has fructose-1,6-bisphosphate phosphatase activity, in particular when grown on glucose, and which has been genetically modified, e.g. transformed with a nucleic acid, e.g. a vector, encoding a fructose-1,6-bisphosphate phosphatase in order to increase the phosphoketolase activity in said organism or microorganism.

Organisms or microorganisms that inherently, i.e. naturally, have fructose-1,6-bisphosphate phosphatase activity, in particular when grown on glucose, are known in the art and any of them can be used in the context of the present invention.

It is also possible in the context of the present invention that the organism or microorganism is an organism or microorganism which naturally does not have fructose-1,6-bisphosphate phosphatase activity, in particular when grown on glucose, but which is genetically modified so as to be able to express a fructose-1,6-bisphosphate phosphatase, in particular, when grown on glucose. This can be achieved, e.g., by mutating the promoter of the gene encoding the fructose-1,6-bisphosphate phosphatase in a way that the gene is no longer repressed when the organism or microorganism is grown on glucose or the promoter can be replaced by another promoter e.g. a constitutive promoter which is not regulated when the organism or microorganism is grown on glucose.

Similarly, the organism or microorganism may also be a organism or microorganism which naturally has fructose-1,6-bisphosphate phosphatase activity, in particular when grown on glucose, but which is genetically modified so as to enhance/increase the fructose-1,6-bisphosphate phosphatase activity, in particular when grown on glucose, e.g. by the introduction of an exogenous nucleotide sequence encoding a fructose-1,6-bisphosphate phosphatase.

The genetic modification of organisms or microorganisms to express an enzyme of interest will be described in detail below.

The fructose-1,6-bisphosphate phosphatase according to the invention can be a naturally occurring fructose-1,6-bisphosphate phosphatase or it can be a fructose-1,6-bisphosphate phosphatase which is derived from a naturally occurring fructose-1,6-bisphosphate phosphatase, e.g. by the introduction of mutations or other alterations which, e.g., alter or improve the enzymatic activity, the stability, etc.

Methods for modifying and/or improving the desired enzymatic activities of proteins are well-known to the person skilled in the art and have been described above. The resulting fructose-1,6-bisphosphate phosphatase variants are then tested for their properties, e.g. enzymatic activity or regulation. Assays for measuring the enzyme activity of a fructose-1,6-bisphosphate phosphatase are known in the art. In one embodiment the fructose-1,6-bisphosphate phosphatase is an enzyme which is not regulated by feed-back inhibition.

In a preferred embodiment, the recombinant organism or microorganism has been genetically modified to have an increased fructose-1,6-bisphosphate phosphatase activity. This can be achieved e.g. by transforming the organism or microorganism with a nucleic acid encoding a fructose-1,6-bisphosphate phosphatase. A detailed description of genetic modification of organisms or microorganisms will be given further below.

In the context of the present invention, an "increased activity" means that the expression and/or the activity of an enzyme, in particular of the fructose-1,6-bisphosphate phosphatase, in the genetically modified organism or microorganism when grown on glucose is at least 10%, preferably at least 20%, more preferably at least 30% or 50%, even more preferably at least 70% or 80% and particularly preferred at least 90% or 100% higher than in the corresponding non-modified organism or microorganism when grown on glucose. In even more preferred embodiments the increase in expression and/or activity may be at least 150%, at least 200% or at least 500%. In particularly preferred embodiments the expression is at least 10-fold, more preferably at least 100-fold and even more preferred at least 1000-fold higher than in the corresponding non-modified organism or microorganism in particular when grown on glucose.

Methods for measuring the level of expression of a given protein in a cell are well known to the person skilled in the art. In one embodiment, the measurement of the level of expression is done by measuring the amount of the corresponding protein. Corresponding methods are well known to the person skilled in the art and include Western Blot, ELISA etc. In another embodiment the measurement of the level of expression is done by measuring the amount of the corresponding RNA. Corresponding methods are well known to the person skilled in the art and include, e.g., Northern Blot.

Methods for measuring the enzymatic activity of the fructose-1,6-bisphosphate are known in the art.

In another embodiment, the organism or microorganism according to the present invention is further characterised in that the EMPP is further diminished or inactivated by inactivation of the gene(s) encoding the glyceraldehyde 3-phosphate dehydrogenase or by reducing the glyceraldehyde 3-phosphate dehydrogenase activity as compared to a non-modified organism or microorganism. Further diminishing the EMPP at a step further downstream by diminishing or inactivating the glyceraldehyde 3-phosphate dehydrogenase ensures that none or almost none glyceraldehyde 3-phosphate that may be produced in the organism or microorganism will be processed via the glycolysis to acetyl-CoA whereby one carbon atom would be lost by the release of $CO_2$ in the last step catalysed by the pyruvate dehydrogenase. Therefore, blocking the EMPP by diminishing or inactivating the glyceraldehyde 3-phosphate dehydrogenase activity further ensures that the overall flux is directed towards the phosphoketolase.

The "glyceraldehyde 3-phosphate dehydrogenase activity" means an enzymatic activity that converts glyceraldehyde 3-phosphate, phosphate and $NAD^+$ to 3-phospho-D-glyceroyl phosphate and $NADH+H^+$ (EC 1.2.1.12). This activity can be measured by assays known in the art as, for example, described by D'Alessio et al. (J. Biol. Chem. (1971) 246, 4326-4333).

The term "an organism or microorganism which is characterised by having a further diminished or inactivated Embden-Meyerhof-Parnas pathway (EMPP) by inactivation of the gene(s) encoding a glyceraldehyde 3-phosphate dehydrogenase or by reducing the glyceraldehyde 3-phosphate dehydrogenase activity as compared to a non-modified organism or microorganism" preferably refers to an organism or microorganism in which the inactivation of the gene(s) encoding a glyceraldehyde 3-phosphate dehydrogenase or the reduction of the glyceraldehyde 3-phosphate dehydrogenase activity as compared to a non-modified organism or microorganism is achieved by a genetic modification of the organism or microorganism which leads to said inactivation or reduction.

In a preferred embodiment, the recombinant organism or microorganism of the present invention is a recombinant organism or microorganism in which the EMPP is further diminished or inactivated by inactivation of the gene(s) encoding the glyceraldehyde 3-phosphate dehydrogenase or by reducing the glyceraldehyde 3-phosphate dehydrogenase activity as compared to a non-modified organism or microorganism. The inactivation of the gene(s) encoding a glyceraldehyde 3-phosphate dehydrogenase in the context of the present invention means that the gene(s) coding for glyceraldehyde 3-phosphate dehydrogenase which is (are) present in the organism or microorganism is (are) inactivated so that they are no longer expressed and/or do not lead to the synthesis of functional glyceraldehyde 3-phosphate dehydrogenase. Inactivation can be achieved by many different ways known in the art. The inactivation can, e.g., be achieved by the disruption of the gene(s) encoding the glyceraldehyde 3-phosphate dehydrogenase or by clean deletion of said gene(s) through the introduction of a selection marker. Alternatively, the promoter of the gene encoding the glyceraldehyde 3-phosphate dehydrogenase can be mutated in a way that the gene(s) is/are no longer transcribed into mRNA. Other ways to inactivate the gene(s) encoding the glyceraldehyde 3-phosphate dehydrogenase known in the art are: to express a polynucleotide encoding RNA having a nucleotide sequence complementary to the transcript of the glyceraldehyde 3-phosphate dehydrogenase gene(s) so that the mRNA can no longer be translated into a protein, to express a polynucleotide encoding RNA that suppresses the expression of said gene(s) through RNAi effect; to express a polynucleotide encoding RNA having an activity of specifically cleaving a transcript of said gene(s); or to express a polynucleotide encoding RNA that suppresses expression of said gene(s) through co-suppression effect. These polynucleotides can be incorporated into a vector, which can be introduced into the organism or microorganism by transformation to achieve the inactivation of the gene(s) encoding the glyceraldehyde 3-phosphate dehydrogenase.

The term "inactivation" in the context of the present invention preferably means complete inactivation, i.e. that the organism or microorganism does not show glyceraldehyde 3-phosphate dehydrogenase activity. This means in particular that the organism or microorganism does not show glyceraldehyde 3-phosphate dehydrogenase activity independent from the used growth conditions.

Preferably, "inactivation" means that the gene(s) encoding glyceraldehyde 3-phosphate dehydrogenase which are present in the organism or microorganism are genetically modified so as to prevent the expression of the enzyme. This can be achieved, e.g. by deletion of the gene or parts thereof wherein the deletion of parts thereof prevents expression of the enzyme, or by disruption of the gene either in the coding region or in the promoter region wherein the disruption has the effect that no protein is expressed or a dysfunctional protein is expressed.

In a preferred embodiment, the recombinant organism or microorganism of the present invention is a recombinant organism or microorganism that has a diminished EMPP by reducing the glyceraldehyde 3-phosphate dehydrogenase activity as compared to a non-modified organism or microorganism. Preferably, this reduction is achieved by a genetic modification of the organism or microorganism. This can be achieved e.g., by random mutagenesis or site-directed mutagenesis of the promoter and/or the enzyme and subsequent selection of promoters and/or enzymes having the desired properties or by complementary nucleotide sequences or RNAi effect as described above. A detailed description of genetic modification of organism or microorganisms will be given further below.

In the context of the present invention, a "reduced activity" means that the expression and/or the activity of an enzyme, in particular of the glyceraldehyde 3-phosphate dehydrogenase, in the genetically modified organism or microorganism is at least 10%, preferably at least 20%, more preferably at least 30% or 50%, even more preferably at least 70% or 80% and particularly preferred at least 90% or 100% lower than in the corresponding non-modified organism or microorganism. Methods for measuring the level of expression of a given protein in a cell are well known to the person skilled in the art. Assays for measuring the reduced enzyme activity of a glyceraldehyde 3-phosphate dehydrogenase are known in the art.

In a more preferred embodiment, where the recombinant microorganism is a bacterium, the gene(s) encoding the PEP-dependent PTS transporter have been inactivated. In the context of the present invention, inactivation means that the gene(s) coding for PEP-dependent PTS transporter which is (are) present in the microorganism is (are) inactivated so that they are no longer expressed and/or do not lead to the synthesis of functional PEP-dependent PTS transporter. The inactivation of the gene(s) encoding the PEP-dependent PTS transporter should be such that the bacteria are no longer capable of transporting glucose via the PEP-dependent PTS transporter.

PEP-dependent PTS transporter (e.g. from *E. coli, B. subtilis*) are known in the art. An example for inactivation of the PEP-dependent PTS transporter is shown in the Example section below.

Inactivation can be achieved by many different ways known in the art. The inactivation can, e.g., be achieved by the disruption of the gene(s) encoding the PEP-dependent PTS transporter or by clean deletion of said gene(s) through the introduction of a selection marker. Alternatively, the promoter of the gene(s) encoding the PEP-dependent PTS transporter can be mutated in a way that the gene(s) is (are) no longer transcribed into mRNA. Other ways to inactivate the gene(s) encoding the PEP-dependent PTS transporter known in the art are: to express a polynucleotide encoding RNA having a nucleotide sequence complementary to the transcript of the PEP-dependent PTS transporter gene(s) so that the mRNA can no longer be translated into a protein, to express a polynucleotide encoding RNA that suppresses the expression of said gene(s) through RNAi effect; to express a polynucleotide encoding RNA having an activity of specifically cleaving a transcript of said gene(s); or to express a polynucleotide encoding RNA that suppresses expression of said gene(s) through co-suppression effect. These polynucleotides can be incorporated into a vector, which can be introduced into the microorganism by transformation to achieve the inactivation of the gene(s) encoding the PEP-dependent PTS transporter.

The present invention furthermore relates to the use of the recombinant organism or microorganism according to the present invention and as defined herein above for the production of isobutene.

The present invention furthermore relates to a method for the production of isobutene by culturing a recombinant organism or microorganism according to the present invention and as defined herein above in a suitable culture medium under suitable conditions. Suitable culture media and suitable culture conditions are known to the skilled person and are described in more detail further below.

The present invention furthermore relates to a method for the production of isobutene from acetyl-CoA in a recombinant organism or microorganism comprising:
(A) (i) enzymatically converting acetyl-CoA into acetoacetyl-CoA,
  (ii) enzymatically converting said produced acetoacetyl-CoA into 3-hydroxy-3-methylglutaryl-CoA,
  (iii) enzymatically converting said produced 3-hydroxy-3-methylglutaryl-CoA into 3-methylglutaconyl-CoA,
  (iv) enzymatically converting said produced 3-methylglutaconyl-CoA into 3-methylcrotonyl-CoA, and
  (v) enzymatically converting said produced 3-methylcrotonyl-CoA into isobutene by:
    (a) enzymatically converting 3-methylcrotonyl-CoA into 3-methylcrotonic acid which is then further enzymatically converted into said isobutene; or
    (b) enzymatically converting 3-methylcrotonyl-CoA into 3-hydroxy-3-methylbutyryl-CoA which is then further enzymatically converted into 3-hydroxy-3-methylbutyric acid which is then further enzymatically converted into 3-phosphonoxy-3-methylbutyric acid which is then further enzymatically converted into said isobutene;
(B) wherein said method further comprises:
  enzymatically providing acetyl-CoA from CoA,
(C) wherein said method further comprises providing coenzyme A (CoA) by the culturing of a recombinant organism or microorganism in a suitable culture medium under suitable conditions, wherein said recombinant organism or microorganism has an increased pool of coenzyme A (CoA) over the organism or microorganism from which it is derived due to;
  (i) increased uptake of pantothenate; and/or
  (ii) the increased conversion of pantothenate into CoA.

Preferably, the present invention relates to the above method wherein said acetyl-CoA is enzymatically provided by acetylating Coenzyme A (CoA) using acetate into acetyl-CoA by an acetyl-CoA synthetase In a more preferred embodiment, the present invention relates to the above method, wherein said increased uptake of pantothenate of (C)(i) is due to a recombinant expression of a pantothenate uptake transporter; and/or
wherein said increased conversion of pantothenate into CoA is due to the recombinant expression of at least one of the following (i) to (vi):
(i) an enzyme catalyzing the enzymatic conversion of pantothenate into 4'-phosphopantothenate, preferably a pantothenate kinase;
(ii) an enzyme catalyzing the enzymatic conversion of 4'-phosphopantothenate and L-cysteine into 4'-phosphopantothenoyl-L-cysteine, preferably a phosphopantothenoylcysteine synthase;
(iii) an enzyme catalyzing the enzymatic conversion of 4'-phosphopantothenoyl-L-cysteine into pantetheine-4-phosphate, preferably a 4'-phosphopantothenoylcysteine decarboxylase;
(iv) an enzyme catalyzing the enzymatic conversion of pantetheine-4-phosphate into dephospho-CoA, preferably a pantotheine-phosphate adenylyltransferase; and
(v) an enzyme catalyzing the enzymatic conversion of dephospho-CoA into CoA, preferably a dephospho-CoA kinase.

As regards the above-mentioned enzymatic conversions, the above-mentioned recombinant organisms or microorganisms or the above-mentioned enzymes, as regards preferred embodiments, the same applies to the method for the production of isobutene as has been set forth above for the recombinant organism or microorganism of the present invention.

In preferred embodiments, the present invention relates to any of the above-described methods wherein said method further comprises complementing the culture medium in which the organism or microorganism is cultured with pantothenate. Without being bound to theory, it is believed that complementing/supplementing the culture medium with pantothenate further increases the pool of CoA as pantothenate, as described above, is the starting molecule for the biosynthesis of CoA. Pantothenate is known to be taken up by virtually all known cells as there are corresponding pantothenate uptake transporters (see, e.g., Progress in Lipid Research 44:125.153 (2005)). The uptake of pantothenate according to the present invention can further be increased as described above by, e.g., expression of a recombinant pantothenate uptake transporter.

Hence, increasing the extracellular concentration of pantothenate in the culture medium further drives the claimed methods to an increase of the intracellular concentration of pantothenate in the recombinant organism or microorganism and, accordingly, leads to an increased production of CoA.

Indeed, a supplementation of a medium with panthothenate has recently been described (U.S. Pat. No. 8,143,035 B2; Vadali et al., Biotechnol. Prog. 20 (2004); Vadali et al., Metabolic Engineering 6 (2004)).

In preferred embodiments, the present invention relates to any of the above described microorganisms wherein the microorganism is a C1-fixing microorganism, preferably a recombinant C1-fixing microorganism as described in more detail in the following.

Moreover, in preferred embodiments, the present invention relates to any of the above more generally described uses and methods, wherein the microorganism is a C1-fixing microorganism, preferably a recombinant C1-fixing microorganism as described in more detail in the following.

The Use of C1-Fixing Bacteria for the Production of Isobutene

Nowadays, a huge need for technologies limiting the amount of Greenhouse Gas (GHG) emissions exists in order to decelerate the global warming of the earth. Concepts of Carbon Capture and Sequestration (CCS) and Carbon Capture and Utilization (CCU) are suitable to overcome these needs. While CCS solely focusses on the permanent storage of $CO_2$ underground to avoid the accumulation of $CO_2$ in the atmosphere, CCU has the potential to replace fossil feedstocks based chemical processes for the production of bulk chemicals such as isobutene. Gaseous feedstocks containing C1 carbon compounds can be obtained from different sources. They are for instance emitted at huge quantities by industrial facilities using combustion processes like the steel, the cement or the petrochemical industry. Other possible sources are the gasification of biomass like agricultural waste or wood residues but also the gasification of municipal solid waste has been considered as a potential source. This topic has been elucidated extensively in recent literature (Chauvy, et al., Applied Energy 236 (2019), 662); Kätelhön, et al., Proc Natl Acad Sci USA 116 (2019), 11187).

For CCU, either chemical or biological conversion processes are applicable. Chemical approaches like the Fischer-Tropsch process use industrial waste gas to produce a plethora of fuels and chemicals. Biological solutions apply gas fermentation using C1 fixing bacteria or algae. Among bacteria capable of C1 fixation, acetogens are of particular interest. Using the reductive acetyl-CoA pathway ("Wood-Ljungdahl" pathway) they are able to convert CO and/or $CO_2$ and $H_2$ to the central metabolic precursor acetyl-CoA which is mainly used to produce acetate. Under certain conditions, also alternative products like ethanol or 2,3-butanediol are produced. The most studied acetogens are probably *C. ljungdahlii* and *C. autothanogenum*. Further information about biotechnological applications of these and other acetogens can be found in recent reviews (Bengelsdorf, et al., Adv Appl Microbiol 103 (2018), 143; Diender, et al., Front Microbiol 6 (2015), 1275).

The use of *C. ljungdahlii* for the production of acetate and ethanol is, for example, described in U.S. Pat. Nos. 5,173,429 and 5,593,886 while the discovery of *C. autoethano-* *genum* as a microorganism displaying an elevated ethanol/acetate product ratio is described in WO2009/064200. The first reported genetic manipulation of an acetogen for the recombinant production of a chemical was the introduction of a butanol pathway from *Clostridium acetobutylicum* (Köpke, et al., Proc Natl Acad Sci USA 107 (2010), 13087). Since then, acetogens have been engineered for the improved production of their native fermentation products, such as ethanol or 2,3-butanediol (WO2009/151342 and WO2014/197746). Moreover, non-native pathways have been introduced enabling the production of acetone/isopropanol, 3-hydroxypropionic acid, terpenes, 1- or 2-butanol or propanol (WO2012/115527; WO2013/180581; WO2013/180584; WO2012/053905; WO2013/185123 and WO2014/036152).

Means for the production of isobutene in C1-fixing bacteria, namely *C. autoethanogenum* and *C. ljungdahlii* have also been described (WO2016/034691 and WO2017/066498), using different metabolic routes. WO2016/034691 discloses the use of a metabolic pathway with a 3-methylcrotonic acid intermediate, decarboxylation of which results in the production of isobutene, as in the pathway described in WO2017/085167.

The metabolic route disclosed in WO2017/066498 includes a 3-hydroxyisovaleric acid intermediate, as described by Gogerty and Bobik, Appl Environ Microbiol. 2010 December; 76(24):8004-10, van Leeuwen et al., 2012 February; 93(4):1377-87, WO 2010/001078, WO2012/052427, WO2012/052427, WO2012/052427 and WO2017/085167.

However, although various approaches have been described in the prior art for the production of C1-fixing bacteria, thereby allowing to use non organic renewable resources as raw material, there is still a need to improve efficiency and effectiveness of such methods in order to increase yield and make them commercially attractive.

The present invention meets this demand by providing in a further aspect the following:

A recombinant C1-fixing microorganism which is capable of enzymatically converting acetyl-CoA into isobutene, wherein in said C1-fixing microorganism:
(i) acetyl-CoA is enzymatically converted into acetoacetyl-CoA,
(ii) acetoacetyl-CoA is enzymatically converted into 3-hydroxy-3-methylglutaryl-CoA,
(iii) 3-hydroxy-3-methylglutaryl-CoA is enzymatically converted into 3-methylglutaconyl-CoA,
(iv) 3-methylglutaconyl-CoA is enzymatically converted into 3-methylcrotonyl-CoA,
(v) 3-methylcrotonyl-CoA is enzymatically converted into 3-methylcrotonic acid;
(vi) 3-methylcrotonic acid is enzymatically converted into isobutene by:
  (a) a 3-polyprenyl-4-hydroxybenzoate decarboxylase (UbiD) having an amino acid sequence as shown in SEQ ID NO:25 or an amino acid sequence having at least 60% sequence identity to SEQ ID NO:25 and having an activity in converting 3-methylcrotonic acid into isobutene; or
  (b) a UbiD-like decarboxylase having an amino acid sequence as shown in SEQ ID NO:26 or an amino acid sequence having at least 60% sequence identity to SEQ ID NO:26 and having an activity in converting 3-methylcrotonic acid into isobutene.

Thus, in the recombinant C1-fixing microorganism which is capable of enzymatically converting acetyl-CoA into isobutene, the conversion of 3-methylcrotonic acid into isobutene, in a C1-fixing bacterium, makes use of a 3-polyprenyl-4-hydroxybenzoate decarboxylase (UbiD) which is derived from *Hypocrea atroviridis* (UniProt Accession number G9NLP8) having the amino acid sequence shown in SEQ ID NO:25 (and amino acid sequences having at least 60% sequence identity to SEQ ID NO:25) or an UbiD-like decarboxylase which is derived from *Streptomyces* sp. (UniProt Accession number A0A0A8EV26) having the amino acid sequence shown in SEQ ID NO:26 (and amino acid sequences having at least 60% sequence identity to SEQ ID NO:26).

In a preferred embodiment, the decarboxylase which is derived from *Hypocrea atroviridis* is an enzyme comprising the amino acid sequence of SEQ ID NO:25 or a sequence which is at least n % identical to SEQ ID NO:25 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting 3-methylcrotonic acid into isobutene.

In a preferred embodiment, the decarboxylase which is derived from *Streptomyces* sp. is an enzyme comprising the amino acid sequence of SEQ ID NO:26 or a sequence which is at least n % identical to SEQ ID NO:26 with n being an integer between 10 and 100, preferably 10, 15, 20, 25, 30, 35, 40, 45, 50, 55, 60, 65, 70, 75, 80, 85, 90, 91, 92, 93, 94, 95, 96, 97, 98 or 99 and wherein the enzyme has the enzymatic activity of converting 3-methylcrotonic acid into isobutene.

In another preferred embodiment, the decarboxylase is a variant of the above decarboxylase derived from *Hypocrea atroviridis* having one or more amino acid modifications as disclosed in WO 2017/191239 wherein said enzyme has the enzymatic activity of converting 3-methylcrotonic acid into isobutene.

As regards the determination of the sequence identity, the following should apply:

When the sequences which are compared do not have the same length, the degree of identity either refers to the percentage of amino acid residues in the shorter sequence which are identical to amino acid residues in the longer sequence or to the percentage of amino acid residues in the longer sequence which are identical to amino acid residues in the shorter sequence. Preferably, it refers to the percentage of amino acid residues in the shorter sequence which are identical to amino acid residues in the longer sequence. The degree of sequence identity can be determined according to methods well known in the art using preferably suitable computer algorithms such as CLUSTAL.

When using the Clustal analysis method to determine whether a particular sequence is, for instance, at least 60% identical to a reference sequence default settings may be used or the settings are preferably as follows: Matrix: blosum 30; Open gap penalty: 10.0; Extend gap penalty: 0.05; Delay divergent: 40; Gap separation distance: 8 for comparisons of amino acid sequences. For nucleotide sequence comparisons, the Extend gap penalty is preferably set to 5.0.

In a preferred embodiment ClustalW2 is used for the comparison of amino acid sequences. In the case of pairwise comparisons/alignments, the following settings are preferably chosen: Protein weight matrix: BLOSUM 62; gap open: 10; gap extension: 0.1. In the case of multiple comparisons/alignments, the following settings are preferably chosen: Protein weight matrix: BLOSUM 62; gap open: 10; gap extension: 0.2; gap distance: 5; no end gap.

Preferably, the degree of identity is calculated over the complete length of the sequence.

The activity of an enzyme capable of converting 3-methylcrotonic acid into isobutene may be determined by methods known to the person skilled in the art. In one embodiment, this activity is determined as described in the Examples appended hereto. In a particular embodiment this activity can be measured by incubating the enzyme, preferably a cell lysate containing the overexpressed recombinant protein, in vitro. Alternatively, a purified enzyme can be used or an in vivo assay.

More specifically, the activity of the decarboxylase for the conversion of 3-methylcrotonic acid into isobutene can be assessed by an enzymatic in vitro assay based on purified proteins and on the detection of isobutene by gas chromatography. The turnover rate of the enzyme to be assessed may be examined as outlined in the following: Michaelis-Menten $k_{cat}$ and $K_m$ steady state kinetic constants for the reaction of conversion of 3-methylcrotonic acid into isobutene may be determined using the following protocol:

The enzymatic assay for quantifying the conversion of 3-methylcrotonic acid into isobutene is carried out in a 2 ml glass vial at 30° C. in a 50 mM potassium phosphate pH 7.5 buffer; 20 mM NaCl, 3 mM MgCl$_2$, 5 mM DTT, 0.5 mg/ml of a purified enzyme of the decarboxylase to be tested, 100 µl of a lysate containing a FMN prenyltransferase (i.e., a Flavin prenyltransferase UbiX protein from *E. coli* expressed and prepared as outlined further below) as well as different concentrations of the substrate 3-methylcrotonic acid ranging from 0 to 128 mM. A control without a decarboxylase enzyme is performed in parallel. After 60 minutes, the reaction is stopped by incubating at 80° C. for 2 min. The rate of isobutene production is quantified by gas chromatography as follows.

The isobutene formed in the reaction headspace is analysed by gas chromatography (GC) equipped with a flame ionization detector (FID). For the GC headspace analysis, one ml of the headspace gas is separated in a Bruker GC-450 system equipped with a GS-alumina column (30 m×0.53 mm) (Agilent) using isothermal mode at 130° C. Nitrogen is used as carrier gas with a flow rate of 6 ml/min. The enzymatic reaction product is identified by comparison with an isobutene standard.

Under these GC conditions, the retention time of isobutene is 2.42 min. From the rate of isobutene production, and using the Michaelis-Menten approximation, the enzyme catalytic efficiency can then be calculated. The production rates of isobutene (mole of PV/mole enzyme/sec) are plotted as a function of the concentration of 3-methylcrotonic acid and the curve is fitted using the Michaelis Menten equation $(V=(V_{max}*(substrate))/(K_m+(substrate)))$ to extract the $k_{cat}$ ($s^{-1}$) and the $K_m$ values (mM).

As regards the above-mentioned enzymatic conversions of the recombinant C1-fixing microorganism, i.e., the enzymatic conversion of (i) acetyl-CoA into acetoacetyl-CoA, (ii) acetoacetyl-CoA into 3-hydroxy-3-methylglutaryl-CoA, (iii) 3-hydroxy-3-methylglutaryl-CoA into 3-methylglutaconyl-CoA, (iv) 3-methylglutaconyl-CoA into 3-methylcrotonyl-CoA, and (v) 3-methylcrotonyl-CoA i into 3-methylcrotonic acid, and as regards preferred embodiments of these conversions, the same applies as has been set forth above.

In a preferred embodiment, as regards (i), acetyl-CoA is enzymatically converted into acetoacetyl-CoA by the acetyl- CoA transferase from *Clostridium kluyverii* (encoded by the gene thlA3; NCBI Reference number EDK35683.1; UniProt Accession number A5N3I7).

In a preferred embodiment, as regards (ii), acetoacetyl-CoA is enzymatically converted into 3-hydroxy-3-methyl-glutaryl-CoA by the hydroxymethylglutaryl-CoA synthase from *Enterococcus faecalis* (encoded by the gene mvaS; NCBI Reference number WP_002357756.1; UniProt Accession number Q9FD71).

In a preferred embodiment, as regards (iii), 3-hydroxy-3-methylglutaryl-CoA is enzymatically converted into 3-methylglutaconyl-CoA by the enoyl-CoA hydratase/isomerase from *Pseudomonas* sp. UW4 (ECH) (encoded by the gene PputUW4_01474; NCBI Reference number WP_015094072.1; UniProt Accession number K9NHK2).

In a preferred embodiment, as regards (iv), 3-methylglutaconyl-CoA is enzymatically converted into 3-methylcrotonyl-CoA by the glutaconate CoA-transferase from *Myxococcus xanthus* (AibA/B) (encoded by the gene MXAN_4264 or MXAN_4265; NCBI Reference number WP_011554268.1 or WP_011554267.1; UniProt Accession number Q1 D413 or Q1D414).

In a preferred embodiment, as regards (v), 3-methylcrotonyl-CoA is enzymatically converted into 3-methylcrotonic acid by the Acyl-CoA thioesterase (encoded by the gene tesB; NCBI Reference number AAC73555.1; UniProt Accession number P0AGG2).

In a preferred embodiment, as regards (vi), the flavin cofactor (FMN or FAD) is modified into the corresponding (modified) flavin-derived cofactor by the flavin prenyl transferase from *Escherichia coli* (encoded by the gene ubiX; NCBI Reference number WP_000825700.1; UniProt Accession number P0AG03).

The nature of the C1-fixing microorganism is not particularly limited as long as it is a microorganism which is capable of using carbon monoxide (CO) and gaseous substrates comprising CO like, e.g., syngas, as the source of carbon and energy.

Syngas or synthesis gas is a gas mixture consisting primarily of $H_2$, CO, and very often some $CO_2$. Correspondingly naturally occurring (or genetically modified) microorganisms that are capable of utilizing CO and converting it into acetyl-CoA are known in the art. These organisms are often referred to as acetogenic microorganisms or acetogens (sometimes also termed carboxydotrophic, acetogenic microorganisms). These microorganisms use the Wood-Ljungdahl pathway to fix CO and/or $CO_2$ and convert it into acetyl-CoA. Examples of such microorganisms belong to the family Clostridiae and are, e.g., described in WO 2009/094485; WO 2012/05905; WO 2013/180584; US 2011/0236941; PNAS 107(29):13087-13092 (2010); Current Opinion in Biotechnology 23:364-381 (2012); Applied and Environmental Microbiology 77(15):5467-5475 (2011).

In certain embodiments, the C1-fixing microorganism is selected from the group of carboxydotrophic acetogenic bacteria. In preferred embodiments, the microorganism is selected from the group comprising *Carboxydothermus ferrireducens, Carboxydothermus hydrogenoformans, Clostridium autoethanogenum, Clostridium ljungdahlii, Clostridium ragsdalei, Clostridium carboxidivorans, Clostridium drakei, Clostridium scatologenes, Clostridium aceticum, Clostridium formicoaceticum, Clostridium magnum, Delsufitobacterium hafniense, Butyribacterium methylotrophicum, Acetobacterium woodii, Alkalibaculum bacchii, Blautia producta, Eubacterium limosum, Moorella thermoacetica, Moorella thermautotrophica, Sporomusa ovata, Sporomusa silvacetica, Sporomusa sphaeroides, Oxobacter pfennigii, Thermincola potens* (optimal growth temperature between 30-37° C. for the mesophilic and between 55-65° C. for the thermophilic strains) and strictly anaerobe (Tanner et al., Int J Syst Bacteriol 1993, 43: 232-236; Abrini et al., Arch Microbiol 1994, 4: 345-351; WO 2008/028055). Moreover, they all share the same major phylogenetic traits, such as same pH range (pH 4-7.5, with an optimal initial pH of 5.5-6), strong autotrophic growth on CO containing gases with similar growth rates, and a similar metabolic profile with ethanol and acetic acid as main fermentation end product, and small amounts of 2,3-butanediol and lactic acid formed under certain conditions (Tanner et al., Int J Syst Bacteriol 1993, 43: 232-236; Abrini et al., Arch Microbiol 1994, 4: 345-351; WO 2008/028055). Indole production was observed with all three species as well. However, the species differentiate in substrate utilization of various sugars (e.g., rhamnose, arabinose), acids (e.g., gluconate, citrate), amino acids (e.g., arginine, histidine), or other substrates (e.g., betaine, butanol). Moreover, some of the species were found to be auxotroph to certain vitamins (e.g. thiamine, biotin) while others were not.

In one embodiment, the C1-fixing, carboxydotrophic acetogenic microorganism is selected from the group consisting of *Clostridium autoethanogenum, Clostridium ljungdahlii, Clostridium ragsdalei, Clostridium carboxidivorans, Clostridium drakei, Clostridium scatologenes, Butyribacterium limosum, Butyribacterium methylotrophicum, Acetobacterium woodii, Alkalibaculum bacchii, Blautia producta, Eubacterium limosum, Moorella thermoacetica, Moorella thermautotrophica, Oxobacter pfennigii*, and *Thermoanaerobacter kiuvi*.

In one particular embodiment, the C1-fixing microorganism is selected from the group of carboxydotrophic Clostridia comprising *Clostridium autoethanogenum, Clostridium ljungdahlii, Clostridium ragsdalei, Clostridium carboxidivorans, Clostridium drakei, Clostridium scatologenes, Clostridium aceticum, Clostridium formicoaceticum*, and *Clostridium magnum*.

In one embodiment, the microorganism is selected from a cluster of carboxydotrophic Clostridia comprising the species *C. autoethanogenum, C ljungdahlii*, and *C. ragsdalei* and related isolates. These include but are not limited to strains *C. autoethanogenum* JAI-1$^T$ (DSM10061) (Abrini, et al., Arch Microbiol 1994, 4: 345-351), *C. autoethanogenum* LBS1560 (DSM19630) (WO2009/064200), *C. autoethanogenum* LBS1561 (DSM23693), *C. ljungdahlii* PETC$^T$ (DSM13528=ATCC 55383) (Tanner, et al., Int J Syst Bacteriol 1993, 43: 232-236), *C. ljungdahlii* 'EM-2 (ATCC 55380) (U.S. Pat. No. 5,593,886), *C. ljungdahlii* C-01 (ATCC 55988) (U.S. Pat. No. 6,368,819), *C. ljungdahlii* 0-52 (ATCC 55989) (U.S. Pat. No. 6,368,819), or *C. ragsdalei* P11$^T$ (ATCC BAA-622) (WO 2008/028055), and related isolates such as *C. coskatii* (US patent 2011/0229947), *Clostridium* sp. MT351 (Michael, et al., J. Biotech Res. 4: 1-12) and mutant strains thereof such as *C. ljungdahlii* OTA-1 (Tirado-Acevedo O. Production of Bioethanol from Synthesis Gas Using *Clostridium ljungdahlii*. PhD thesis, North Carolina State University, 2010).

These strains form a subcluster within the Clostridial rRNA cluster I (Collins et al., 1994), having at least 99% identity on 16S rRNA gene level, although being distinct species as determined by DNA-DNA reassociation and DNA fingerprinting experiments (WO 2008/028055, US patent 2011/0229947).

The strains of this cluster are defined by common characteristics, having both a similar genotype and phenotype, and they all share the same mode of energy conservation and fermentative metabolism. The strains of this cluster lack cytochromes and conserve energy via an Rnf complex.

All strains of this cluster have a genome size of around 4.2 MBps and a GC composition of around 32% mol (Abrini et al., Arch Microbiol 1994, 4: 345-351; Kopke et al., (2011) Curr. Opin. Biotechnol. 22: 320-325 and Appl. Environ. Microbiol. 77:5467-75; Tanner et al., Int J Syst Bacteriol 1993, 43: 232-236) (WO 2008/028055; US patent 2011/0229947), and conserved essential key gene operons encoding for enzymes of Wood-Ljungdahl pathway (Carbon monoxide dehydrogenase, Formyl-tetrahydrofolate synthetase, Methylene-tetrahydrofolate dehydrogenase, Formyl-tetrahydrofolate cyclohydrolase, Methylene-tetrahydrofolate reductase, 5-methyltetrahydrofolate:corrinoid/iron-sulfur protein co-methyltransferase and Carbon monoxide dehydrogenase/Acetyl-CoA synthase), hydrogenase, formate dehydrogenase, Rnf complex (rnfCDGEAB), pyruvate:ferredoxin oxidoreductase, aldehyde:ferredoxin oxidoreductase (Kopke et al., (2011) Curr. Opin. Biotechnol. 22: 320-325 and Appl. Environ. Microbiol. 77:5467-75). The organization and number of Wood-Ljungdahl pathway genes, responsible for gas uptake, has been found to be the same in all species, despite differences in nucleic and amino acid sequences (Kopke et al., (2011) Curr. Opin. Biotechnol. 22: 320-325 and Appl. Environ. Microbiol. 77:5467-75).

The strains all have a similar morphology and size (logarithmic growing cells are between 0.5-0.7×3-5 µm), are mesophilic (optimal growth temperature between 30-37° C.) or thermophilic and are strictly anaerobe (Abrini et al., 1994 cited above; Tanner et al., 1993 cited above; WO 2008/028055). Moreover, they all share the same major phylogenetic traits, such as same pH range (pH 4-7.5, with an optimal initial pH of 5.5-6), strong autotrophic growth on CO containing gases with similar growth rates, and a metabolic profile with ethanol and acetic acid as main fermentation end product, with small amounts of 2,3-butanediol and lactic acid formed under certain conditions (Abrini et al., 1994 cited above; Kopke et al., 2011 cited above; Tanner et al., 1993 cited above) However, the species differentiate in substrate utilization of various sugars (e.g. rhamnose, arabinose), acids (e.g. gluconate, citrate), amino acids (e.g. arginine, histidine), or other substrates (e.g. betaine, butanol). Some of the species were found to be auxotroph to certain vitamins (e.g. thiamine, biotin) while others were not. Reduction of carboxylic acids into their corresponding alcohols has been shown in a range of these organisms (Perez, Richter, Loftus, & Angenent, 2012).

The traits described are therefore not specific to one organism like *C. autoethanogenum* or *C. ljungdahlii*, but rather general traits for carboxydotrophic, ethanol-synthesizing Clostridia. Thus, the invention can be anticipated to work across these strains, although there may be differences in performance.

The recombinant C1-fixing microorganism, preferably the C1-fixing, carboxydotrophic acetogenic microorganism of the invention may be prepared from a parental C1-fixing microorganism, preferably carboxydotrophic acetogenic microorganism and one or more nucleic acid molecules encoding an enzyme/transporter as defined above using any number of techniques known in the art for producing recombinant microorganisms. By way of example only, transformation (including transduction or transfection) may be achieved by electroporation, electrofusion, ultrasonication, polyethylene glycol-mediated transformation, conjugation, or chemical and natural competence. Suitable transformation techniques are described for example in Sambrook J, Fritsch E F, Maniatis T: Molecular Cloning: A laboratory Manual, Cold Spring Harbour Labrotary Press, Cold Spring Harbour, 1989.

As regards C1-fixing microorganisms, preferably the C1-fixing, carboxydotrophic acetogenic microorganisms, electroporation has been described for several carboxydotrophic acetogens as *C. ljungdahlii* (Kopke et al., 2011 cited above; Leang, Ueki, Nevin, & Lovley, 2012) (PCT/NZ2011/000203; WO2012/053905), *C. autoethanogenum* (PCT/NZ2011/000203; WO2012/053905), *Acetobacterium woodii* (Stratz, Sauer, Kuhn, & Diirre, 1994) or *Moorella thermoacetica* (Kita et al., 2012) and is a standard method used in many Clostridia such as *C. acetobutylicum* (Mermelstein, Welker, Bennett, & Papoutsakis, 1992), *C. cellulolyticum* (Jennert, Tardif, Young, & Young, 2000) or *C. thermocellum* (M V Tyurin, Desai, & Lynd, 2004). Electrofusion has been described for acetogenic *Clostridium* sp. MT351 (Tyurin and Kiriukhin, 2012).

Moreover, the present invention provides a use of the C1-fixing microorganism as defined above for the production of isobutene.

Further, the present invention provides a method for the production of isobutene by culturing a C1-fixing microorganism as defined above in a suitable culture medium under suitable conditions.

The C1-fixing microorganism as well as the method according to the present invention are in particular useful for large scale production of isobutene in vivo, in particular for a commercial production. Thus, the present invention relates to a method for large scale production, in particular the commercial production of isobutene wherein said method comprises the steps as described above.

As regards the above-mentioned enzymatic conversions, the above-mentioned recombinant organisms or microorganisms or the above-mentioned enzymes, as regards preferred embodiments, the same applies to the use of the C1-fixing microorganism and to the method for the production of isobutene by culturing a C1-fixing microorganism as has been set forth above for the recombinant organism or microorganism of the present invention.

In preferred embodiments, the present invention relates to any of the above-described methods wherein said method further comprises recovering of the produced isobutene. For example, when an organism or microorganism according to the present invention, preferably the C1-fixing microorganism as defined above, expressing the necessary enzymes is cultured in a suitable culture medium the isobutene can be recovered from the fermentation off-gas by methods known to the person skilled in the art.

The method according to the invention can be carried out in culture using a recombinant organism or microorganism according to the present invention, preferably the C1-fixing microorganism as defined above, producing the enzymes described above for the conversions according to the present invention as described herein above or a transporter as described herein above. A method which employs an organism or microorganism, preferably the C1-fixing microorganism as defined above, for carrying out a method according to the invention is referred to as an "in vivo" method.

It is possible to use an organism or microorganism, preferably the C1-fixing microorganism as defined above, according to the present invention can be an organism or microorganism which naturally produces the enzymes/transporters described above or an organism or microorganism, preferably the C1-fixing microorganism as defined above, which had been genetically modified so that it expresses (including overexpresses) one or more of such enzymes/ transporters. Thus, the organism or microorganism can be an engineered organism or microorganism which expresses enzymes for the conversions of the above described conversions or a transporter as described above, i.e., which has in its genome a nucleotide sequence encoding such enzymes/transporters and which has been modified to overexpress them. The expression may occur constitutively or in an induced or regulated manner.

In another embodiment the organism or microorganism, preferably the C1-fixing microorganism as defined above, can be an organism or microorganism which has been genetically modified by the introduction of one or more nucleic acid molecules containing nucleotide sequences encoding one or more enzymes for the conversions described above or a transporter as described above. The nucleic acid molecule can be stably integrated into the genome of the organism or microorganism or may be present in an extrachromosomal manner, e.g. on a plasmid.

Such a genetically modified organism or microorganism can, e.g., be an organism or microorganism that does not naturally express such enzymes/transporters and which has been genetically modified to express such enzymes/transporters or an organism or microorganism which naturally expresses such enzymes/transporters and which has been genetically modified, e.g. transformed with a nucleic acid, e.g. a vector, encoding the respective enzyme(s)/transporter(s), and/or insertion of a promoter in front of the endogenous nucleotide sequence encoding the enzyme/transporter in order to increase the respective activity in said organism or microorganism.

However, the invention preferably excludes naturally occurring organisms or microorganisms as found in nature expressing an enzyme/transporter as described above at levels as they exist in nature. Instead, the organism or microorganism of the present invention, preferably the C1-fixing microorganism as defined above, and employed in a method of the present invention is preferably a non-naturally occurring organism or microorganism, whether it has been genetically modified to express (including overexpression) an exogenous enzyme/transporter not normally existing in its genome or whether it has been engineered to overexpress an exogenous enzyme/transporter.

Thus, the proteins and (micro)organisms employed in connection with the present invention are preferably non-naturally occurring proteins or (micro)organisms, i.e. they are proteins or (micro)organisms which differ significantly from naturally occurring proteins or organism or microorganism and which do not occur in nature. As regards the enzymes/transporters, they are preferably variants of naturally occurring enzymes/transporters which do not as such occur in nature. Such variants include, for example, mutants, in particular prepared by molecular biological methods, which show improved properties, such as a higher enzyme activity, higher substrate specificity, higher temperature resistance, higher transporter capacity and the like. As regards the (micro)organisms, preferably the C1-fixing microorganism as defined above, they are preferably genetically modified organisms as described herein above which differ from naturally occurring organisms due to a genetic modification. Genetically modified organisms are organisms which do not naturally occur, i.e., which cannot be found in nature, and which differ substantially from naturally occurring organisms due to the introduction of a foreign nucleic acid molecule.

By overexpressing an exogenous or endogenous enzyme/transporter as described herein above, the concentration of the enzyme/transporter is substantially higher than what is found in nature, which can then unexpectedly force the reaction of the present invention which uses a non-natural for the respective enzyme/transporter. Preferably, the concentration of the overexpressed enzyme/transporter is at least 5%, 10%, 20%, 30% or 40% of the total host cell protein.

A "non-natural" substrate is understood to be a molecule that is not acted upon by the respective enzyme in nature, even though it may actually coexist in the organism or microorganism along with the endogenous enzyme. This "non-natural" substrate is not converted by the organism or microorganism in nature as other substrates are preferred (e.g. the "natural substrate"). Thus, the present invention contemplates utilizing a non-natural substrate with the enzymes described above in an environment not found in nature.

Thus, it is also possible in the context of the present invention that the organism or microorganism, preferably the C1-fixing microorganism as defined above, is an organism or microorganism which naturally does not have the respective enzyme/transporter activity but which is genetically modified so as to comprise a nucleotide sequence allowing the expression of a corresponding enzyme/transporter. Similarly, the organism or microorganism, preferably the C1-fixing microorganism as defined above, may also be an organism or microorganism which naturally has the respective enzyme/transporter activity but which is genetically modified so as to enhance such an activity, e.g. by the introduction of an exogenous nucleotide sequence encoding a corresponding enzyme/transporter or by the introduction of a promoter for the endogenous gene encoding the enzyme/transporter to increase endogenous production to overexpressed (non-natural) levels.

If an organism or microorganism, preferably a C1-fixing microorganism as defined above, is used which naturally expresses a corresponding enzyme/transporter, it is possible to modify such an organism or microorganism so that the respective activity is overexpressed in the organism or microorganism. This can, e.g., be achieved by effecting mutations in the promoter region of the corresponding gene or introduction of a high expressing promoter so as to lead to a promoter which ensures a higher expression of the gene. Alternatively, it is also possible to mutate the gene as such so as to lead to an enzyme/transporter showing a higher activity.

In one embodiment, the organism or microorganism according to the invention, preferably the C1-fixing microorganism as defined above, is an organism or microorganism which has been genetically modified to contain a foreign nucleic acid molecule encoding at least one enzyme/transporter described. The term "foreign" or "exogenous" in this context means that the nucleic acid molecule does not naturally occur in said organism or microorganism. This means that it does not occur in the same structure or at the same location in the organism or microorganism. In one preferred embodiment, the foreign nucleic acid molecule is a recombinant molecule comprising a promoter and a coding sequence encoding the respective enzyme/transporter in which the promoter driving expression of the coding sequence is heterologous with respect to the coding sequence. "Heterologous" in this context means that the promoter is not the promoter naturally driving the expression of said coding sequence but is a promoter naturally driving expression of a different coding sequence, i.e., it is derived from another gene, or is a synthetic promoter or a chimeric promoter. Preferably, the promoter is a promoter heterologous to the organism or microorganism, i.e., a promoter which does naturally not occur in the respective organism or microorganism. Even more preferably, the promoter is an inducible promoter. Promoters for driving expression in different types of organisms, in particular in organism or microorganisms, are well known to the person skilled in the art.

In a further embodiment the nucleic acid molecule is foreign to the organism or microorganism in that the encoded enzyme/transporter is not endogenous to the microorganism, i.e. is naturally not expressed by the organism or microorganism when it is not genetically modified. In other words, the encoded enzyme/transporter is heterologous with respect to the organism or microorganism. The foreign nucleic acid molecule may be present in the organism or microorganism in extrachromosomal form, e.g. as a plasmid, or stably integrated in the chromosome. A stable integration is preferred. Thus, the genetic modification can consist, e.g. in integrating the corresponding gene(s) encoding the enzyme(s)/transporter(s) into the chromosome, or in expressing the enzyme(s)/transporter(s) from a plasmid containing a promoter upstream of the enzyme-coding or transporter-coding sequence, the promoter and coding sequence preferably originating from different organisms, or any other method known to one of skill in the art.

The term "microorganism" in the context of the present invention refers to bacteria, as well as to fungi, such as yeasts, and also to algae and archaea. In one preferred embodiment, the microorganism is a bacterium. In principle any bacterium can be used. Preferred bacteria to be employed in the present invention are bacteria of the genus *Bacillus, Clostridium, Corynebacterium, Pseudomonas, Zymomonas* or *Escherichia*. In a particularly preferred embodiment the bacterium belongs to the genus *Escherichia* and even more preferred to the species *Escherichia coli*. In another preferred embodiment the bacterium belongs to the species *Pseudomonas putida* or to the species *Zymomonas mobilis* or to the species *Corynebacterium glutamicum* or to the species *Bacillus subtilis*.

It is also possible to employ an extremophilic bacterium such as *Thermus thermophilus*, or anaerobic bacteria from the family Clostridiae.

In another particularly preferred embodiment, as outlined in detail above, the microorganism is a microorganism which is capable using carbon monoxide (CO) and gaseous substrates comprising CO like, e.g., syngas, as the source of carbon and energy. Syngas or synthesis gas is a mixture of CO and $CO_2$ as well as $H_2$. Thus, in a particularly preferred embodiment, the microorganism is a C1-fixing microorganism as defined above. As mentioned above, corresponding naturally occurring (or genetically modified) microorganisms that are capable of utilizing CO and converting it into acetyl-CoA are known in the art. These organisms are often referred to as acetogenic microorganisms (sometimes also termed carboxydotrophic, acetogenic microorganisms) and are referred to "C1-fixing microorganisms" herein. These microorganisms use the Wood-Ljungdahl pathway to fix CO and convert it into acetyl-CoA. Examples of such microorganisms belong to the family Clostridiae and are, e.g., described in WO 2009/094485; WO 2012/05905; WO 2013/180584; US 2011/0236941; PNAS 107(29):13087-13092 (2010); Current Opinion in Biotechnology 23:364-381 (2012); Applied and Environmental Microbiology 77(15): 5467-5475 (2011).

In another preferred embodiment the microorganism is a fungus, more preferably a fungus of the genus *Saccharomyces, Schizosaccharomyces, Aspergillus, Trichoderma, Kluyveromyces, Clostridium* or *Pichia* and even more preferably of the species *Saccharomyces cerevisiae, Schizosaccharomyces pombe, Aspergillus niger, Trichoderma reesei, Kluyveromyces marxianus, Kluyveromyces lactis, Pichia pastoris, Pichia torula* or *Pichia utilis*.

In another embodiment, the present invention makes use of a photosynthetic microorganism expressing at least one enzyme for the conversion according to the invention as described above. Preferably, the microorganism is a photosynthetic bacterium, or a microalgae. In a further embodiment the microorganism is an algae, more preferably an algae belonging to the diatomeae.

It is also conceivable to use in accordance with the present invention a combination of microorganisms, preferably of C1-fixing microorganisms as defined above, wherein different microorganisms express different enzymes as described above. The genetic modification of microorganisms to express an enzyme of interest will also be further described in detail below.

In a preferred embodiment, the organism, preferably the microorganism, more preferably the C1-fixing microorganism as defined above, of the present invention is an organism which is capable of consuming glucose.

In a preferred embodiment, the organism, preferably the microorganism, more preferably the C1-fixing microorganism as defined above, of the present invention is an organism which is capable of consuming fructose.

In a preferred embodiment, the organism, preferably the microorganism, more preferably the C1-fixing microorganism as defined above, of the present invention is an organism which is capable of consuming xylose.

In a preferred embodiment, the organism, preferably the microorganism, more preferably the C1-fixing microorganism as defined above, of the present invention is an organism which is capable of consuming mannose.

In a preferred embodiment, the organism, preferably the microorganism, more preferably the C1-fixing microorganism as defined above, of the present invention is an organism which is capable of consuming more than one sugar. Preferably, said more than one sugar comprises sucrose, glucose, mannose and/or xylose. In a more preferred embodiment, the organism, preferably the microorganism, more preferably the C1-fixing microorganism as defined above, of the present invention is an organism which is capable of consuming two or more sugars selected from the group consisting of sucrose, glucose, mannose and xylose. Organisms and/or microorganisms which are capable of consuming glucose, fructose, xylose and/or mannose do naturally occur and are known in the art.

In a preferred embodiment, the organism, preferably the microorganism, more preferably the C1-fixing microorganism as defined above, of the present invention is an organism which is capable of consuming CO and/or syngas. In another preferred embodiment, the organism, preferably the microorganism, more preferably the C1-fixing microorganism as defined above, of the present invention is an organism which is capable of consuming a mixture of CO and/or $CO_2$ as well as $H_2$.

In another embodiment, said organism and/or microorganism is genetically modified in order to be capable of consuming glucose, fructose, xylose, mannose and/or CO (or syngas) and/or genetically modified in order to increase the organism's and/or microorganism's capability of consuming glucose, fructose, xylose, mannose and/or CO (or syngas). Corresponding genetic modifications are known in the art.

In another preferred embodiment, the organism, preferably the microorganism, more preferably the C1-fixing microorganism as defined above, of the present invention is an organism which is capable of consuming sugar through a Phosphotransferase Transport System (PTS).

In a preferred embodiment, the organism, preferably the microorganism, more preferably the C1-fixing microorganism as defined above, of the present invention is an organism which is capable of consuming sugar through a non-Phosphotransferase Transport System (non-PTS).

Organisms and/or microorganisms which are capable of consuming sugar through a Phosphotransferase Transport System (PTS) and/or through a non-Phosphotransferase Transport System (non-PTS) are known in the art.

In another embodiment, said organism and/or microorganism is genetically modified in order to be capable of consuming sugar through a Phosphotransferase Transport System (PTS) or through a non-Phosphotransferase Transport System (non-PTS). In another preferred embodiment, said organism and/or microorganism is genetically modified in order to increase the organism's and/or microorganism's capability of consuming sugar through a Phosphotransferase Transport System (PTS) or through a non-Phosphotransferase Transport System (non-PTS). Corresponding genetic modifications are known in the art.

In another preferred embodiment, the organism, preferably the microorganism, more preferably the C1-fixing microorganism as defined above, of the present invention is an organism having a diminished or inactivated Phosphotransferase Transport System (PTS). Such an organism, preferably a microorganism, may preferably be genetically modified by deletion or inactivation (a) gene(s) of said Phosphotransferase Transport System (PTS). Corresponding genetic modifications are known in the art.

In another preferred embodiment, the organism, preferably the microorganism, more preferably the C1-fixing microorganism as defined above, of the present invention is an organism having an enhanced non-Phosphotransferase Transport System (non-PTS) for sugar uptake. Such an organism, preferably a microorganism, may preferably be genetically modified by overexpression (a) gene(s) of said non-Phosphotransferase Transport System (non-PTS) for sugar uptake. Corresponding genetic modifications are known in the art.

In another preferred embodiment, the organism, preferably the microorganism, more preferably the C1-fixing microorganism as defined above, of the present invention is an organism having a diminished or inactivated Phosphotransferase Transport System (PTS) and an enhanced non-Phosphotransferase Transport System (non-PTS) for sugar uptake.

In another preferred embodiment, the organism, preferably the microorganism, more preferably the C1-fixing microorganism as defined above, of the present invention is an organism which is capable of consuming sucrose through a non-Phosphotransferase Transport System (non-PTS).

In another preferred embodiment, the organism, preferably the microorganism, more preferably the C1-fixing microorganism as defined above, of the present invention is an organism consuming sucrose, wherein said organism, preferably said microorganism, has genetically been modified by the introduction of at least one gene of a non-Phosphotransferase Transport System (non-PTS). Without being bound to theory, such an organism and/or microorganism has genetically been modified by introducing a gene selected from the group consisting of cscA, cscB, and cscK from *Escherichia coli* W (M. Bruschi et al., Biotechnology Advances 30 (2012) 1001-1010).

In another preferred embodiment, the organism, preferably the microorganism, more preferably the C1-fixing microorganism as defined above, of the present invention is an organism which has genetically been modified to have a diminished or inactivated Phosphotransferase Transport System (PTS) and an overexpression of at least one gene selected from the group consisting of galP, glk and glf.

In a preferred embodiment, the organism, preferably the microorganism, more preferably the C1-fixing microorganism as defined above, of the present invention is an organism which is genetically modified in order to avoid the leakage of acetyl-CoA, thereby increasing the intracellular concentration of acetyl-CoA. Genetic modifications leading to an increase in the intracellular concentration of acetyl-CoA are known in the art. Such an organism, preferably a microorganism, may preferably be genetically modified by deleting or inactivating the following genes:

ΔackA (acetate kinase), Δldh (lactate dehydrogenase), ΔadhE (alcohol dehydrogenase), ΔfrdB and/or ΔfrdC (fumarate reductase and fumarate dehydrogenase).

In another embodiment, the method of the invention comprises the step of providing the organism, preferably the microorganism, more preferably the C1-fixing microorganism as defined above, of the present invention in the form of a (cell) culture, preferably in the form of a liquid cell culture, a subsequent step of cultivating the organism, preferably the microorganism, in a fermenter (often also referred to a bioreactor) under suitable conditions allowing the expression of the respective enzyme(s)/transporter(s) and further comprising the step of effecting an enzymatic conversion of a method of the invention as described herein above. Suitable fermenter or bioreactor devices and fermentation conditions are known to the person skilled in the art. A bioreactor or a fermenter refers to any manufactured or engineered device or system known in the art that supports a biologically active environment. Thus, a bioreactor or a fermenter may be a vessel in which a chemical/biochemical reaction like the method of the present invention is carried out which involves organisms, preferably microorganisms and/or biochemically active substances, i.e., the enzyme(s)/transporter(s) described above derived from such organisms or organisms harbouring the above described enzyme(s)/transporter(s). In a bioreactor or a fermenter, this process can either be aerobic or anaerobic. These bioreactors are commonly cylindrical, and may range in size from litres to cubic metres, and are often made of stainless steel. In this respect, without being bound by theory, the fermenter or bioreactor may be designed in a way that it is suitable to cultivate the organisms, preferably microorganisms, in, e.g., a batch-culture, fed-batch-culture, perfusion culture or chemostate-culture, all of which are generally known in the art. The culture medium can be any culture medium suitable for cultivating the respective organism or microorganism. When carried out by making use of an organism or microorganism, the method according to the present invention may, e.g. be designed as a continuous fermentation culturing method or as a batch culture or any suitable culture method known to the person skilled in the art.

In a preferred embodiment the method according to the present invention also comprises the step of recovering the isobutene produced by the method. For example, when the method according to the present invention is carried out in vivo by fermenting a corresponding organism or microorganism, preferably the C1-fixing microorganism as defined above, expressing the necessary enzymes/transporters, the isobutene can be recovered from the fermentation off-gas by methods known to the person skilled in the art.

The enzymes and transporters used according to the invention can be naturally occurring enzymes or transporters or enzymes or transporters which are derived from naturally occurring enzymes, e.g., by the introduction of mutations or other alterations which, e.g., alter or improve the enzymatic activity, the stability, etc.

Methods for modifying and/or improving the desired enzymatic activities of proteins and the activity/capacity of transporters are well-known to the person skilled in the art and include, e.g., random mutagenesis or site-directed mutagenesis and subsequent selection of enzymes/transporters having the desired properties or approaches of the so-called "directed evolution".

For example, for genetic modification in prokaryotic cells, a nucleic acid molecule encoding a corresponding enzyme or transporter can be introduced into plasmids which permit mutagenesis or sequence modification by recombination of DNA sequences. Standard methods (see Sambrook and Russell (2001), Molecular Cloning: A Laboratory Manual, CSH Press, Cold Spring Harbor, NY, USA) allow base exchanges to be performed or natural or synthetic sequences to be added. DNA fragments can be ligated by using adapters and linkers complementary to the fragments. Moreover, engineering measures which provide suitable restriction sites or remove surplus DNA or restriction sites can be used. In those cases, in which insertions, deletions or substitutions are possible, in vitro mutagenesis, "primer repair", restriction or ligation can be used. In general, a sequence analysis, restriction analysis and other methods of biochemistry and molecular biology are carried out as analysis methods. The resulting enzyme or transporter variants are then tested for the desired activity, e.g., enzymatic activity, with an assay as described above and in particular for their increased enzyme activity and transporter activity/capacity, respectively.

As described above, the recombinant organism or microorganism, preferably the C1-fixing microorganism as defined above, of the present invention may be an organism or microorganism which has been genetically modified by the introduction of a nucleic acid molecule encoding a corresponding enzyme or transporter. Thus, in a preferred embodiment, the organism or microorganism is a recombinant organism or microorganism which has been genetically modified to have an increased activity of at least one enzyme described above for the conversions according to the present invention or to have an increased activity/capacity of at least one above-described transporter. This can be achieved e.g. by transforming the organism or microorganism with a nucleic acid encoding a corresponding enzyme/transporter. Preferably, the nucleic acid molecule introduced into the microorganism is a nucleic acid molecule which is heterologous with respect to the organism or microorganism, i.e. it does not naturally occur in said organism or microorganism.

In the context of the present invention, an "increased activity" or "improved activity" means that the expression and/or the activity of an enzyme/transporter in the genetically modified organism or microorganism is at least 10%, preferably at least 20%, more preferably at least 30% or 50%, even more preferably at least 70% or 80% and particularly preferred at least 90% or 100% higher than in the corresponding non-modified organism or microorganism. In even more preferred embodiments the increase in expression and/or activity may be at least 150%, at least 200% or at least 500%. In particularly preferred embodiments the expression is at least 10-fold, more preferably at least 100-fold and even more preferred at least 1000-fold higher than in the corresponding non-modified organism or microorganism.

The term "increased"/"improved" expression/activity also covers the situation in which the corresponding non-modified organism or microorganism does not express a corresponding enzyme/transporter so that the corresponding expression/activity in the non-modified organism or microorganism is zero. Preferably, the concentration of the overexpressed enzyme/transporter is at least 5%, 10%, 20%, 30%, or 40% of the total host cell protein.

Methods for measuring the level of expression of a given protein in a cell are well known to the person skilled in the art. Examples have already been described above.

In the context of the present invention the term "recombinant" means that the organism or microorganism, preferably the C1-fixing microorganism as defined above, is genetically modified so as to contain a nucleic acid molecule encoding an enzyme/transporter as defined above as compared to a wild-type or non-modified organism or microorganism. A nucleic acid molecule encoding an enzyme/transporter as defined above can be used alone or as part of a vector.

The nucleic acid molecules can further comprise expression control sequences operably linked to the polynucleotide comprised in the nucleic acid molecule. The term "operatively linked" or "operably linked", as used throughout the present description, refers to a linkage between one or more expression control sequences and the coding region in the polynucleotide to be expressed in such a way that expression is achieved under conditions compatible with the expression control sequence.

Expression comprises transcription of the heterologous DNA sequence, preferably into a translatable mRNA. Regulatory elements ensuring expression in fungi as well as in bacteria, are well known to those skilled in the art. They encompass promoters, enhancers, termination signals, targeting signals and the like. Examples are given further below in connection with explanations concerning vectors.

Promoters for use in connection with the nucleic acid molecule may be homologous or heterologous with regard to its origin and/or with regard to the gene to be expressed. Suitable promoters are for instance promoters which lend themselves to constitutive expression. However, promoters which are only activated at a point in time determined by external influences can also be used. Artificial and/or chemically inducible promoters may be used in this context.

The vectors can further comprise expression control sequences operably linked to said polynucleotides contained in the vectors. These expression control sequences may be suited to ensure transcription and synthesis of a translatable RNA in bacteria or fungi.

In addition, it is possible to insert different mutations into the polynucleotides by methods usual in molecular biology (see for instance Sambrook and Russell (2001), Molecular Cloning: A Laboratory Manual, CSH Press, Cold Spring Harbor, NY, USA), leading to the synthesis of polypeptides possibly having modified biological properties. The introduction of point mutations is conceivable at positions at which a modification of the amino acid sequence for instance influences the biological activity or the regulation of the polypeptide.

Moreover, mutants possessing a modified substrate or product specificity can be prepared. Preferably, such mutants show an increased activity. Alternatively, mutants can be prepared the catalytic activity of which is abolished without losing substrate binding activity.

Furthermore, the introduction of mutations into the polynucleotides encoding an enzyme/transporter as defined above allows the gene expression rate and/or the activity of the enzymes/transporters encoded by said polynucleotides to be reduced or increased.

For genetically modifying bacteria or fungi, the polynucleotides encoding an enzyme/transporter as defined above or parts of these molecules can be introduced into plasmids which permit mutagenesis or sequence modification by recombination of DNA sequences. Standard methods (see Sambrook and Russell (2001), Molecular Cloning: A Laboratory Manual, CSH Press, Cold Spring Harbor, NY, USA) allow base exchanges to be performed or natural or synthetic sequences to be added. DNA fragments can be connected to each other by applying adapters and linkers to the fragments. Moreover, engineering measures which provide suitable restriction sites or remove surplus DNA or restriction sites can be used. In those cases, in which insertions, deletions or substitutions are possible, in vitro mutagenesis, "primer repair", restriction or ligation can be used. In general, a sequence analysis, restriction analysis and other methods of biochemistry and molecular biology are carried out as analysis methods.

Thus, in accordance with the present invention a recombinant organism or microorganism, preferably the C1-fixing microorganism as defined above, can be produced by genetically modifying fungi or bacteria comprising introducing the above-described polynucleotides, nucleic acid molecules or vectors into a fungus or bacterium.

The polynucleotide encoding the respective enzyme/transporter is expressed so as to lead to the production of a polypeptide having any of the activities described above. An overview of different expression systems is for instance contained in Methods in Enzymology 153 (1987), 385-516, in Bitter et al. (Methods in Enzymology 153 (1987), 516-544) and in Sawers et al. (Applied Microbiology and Biotechnology 46 (1996), 1-9), Billman-Jacobe (Current Opinion in Biotechnology 7 (1996), 500-4), Hockney (Trends in Biotechnology 12 (1994), 456-463), Griffiths et al., (Methods in Molecular Biology 75 (1997), 427-440). An overview of yeast expression systems is for instance given by Hensing et al. (Antonie van Leuwenhoek 67 (1995), 261-279), Bussineau et al. (Developments in Biological Standardization 83 (1994), 13-19), Gellissen et al. (Antonie van Leuwenhoek 62 (1992), 79-93, Fleer (Current Opinion in Biotechnology 3 (1992), 486-496), Vedvick (Current Opinion in Biotechnology 2 (1991), 742-745) and Buckholz (Bio/Technology 9 (1991), 1067-1072).

Expression vectors have been widely described in the literature. As a rule, they contain not only a selection marker gene and a replication-origin ensuring replication in the host selected, but also a bacterial or viral promoter, and in most cases a termination signal for transcription. Between the promoter and the termination signal there is in general at least one restriction site or a polylinker which enables the insertion of a coding DNA sequence. The DNA sequence naturally controlling the transcription of the corresponding gene can be used as the promoter sequence, if it is active in the selected host organism. However, this sequence can also be exchanged for other promoter sequences. It is possible to use promoters ensuring constitutive expression of the gene and inducible promoters which permit a deliberate control of the expression of the gene. Bacterial and viral promoter sequences possessing these properties are described in detail in the literature. Regulatory sequences for the expression in microorganisms (for instance E. coli, S. cerevisiae) are sufficiently described in the literature. Promoters permitting a particularly high expression of a downstream sequence are for instance the T7 promoter (Studier et al., Methods in Enzymology 185 (1990), 60-89), lacUV5, trp, trp-lacUV5 (DeBoer et al., in Rodriguez and Chamberlin (Eds), Promoters, Structure and Function; Praeger, New York, (1982), 462-481; DeBoer et al., Proc. Natl. Acad. Sci. USA (1983), 21-25), Ip1, rac (Boros et al., Gene 42 (1986), 97-100). Inducible promoters are preferably used for the synthesis of polypeptides. These promoters often lead to higher polypeptide yields than do constitutive promoters. In order to obtain an optimum amount of polypeptide, a two-stage process is often used. First, the host cells are cultured under optimum conditions up to a relatively high cell density. In the second step, transcription is induced depending on the type of promoter used. In this regard, a tac promoter is particularly suitable which can be induced by lactose or IPTG (=isopropyl-ß-D-thiogalactopyranoside) (deBoer et al., Proc. Natl. Acad. Sci. USA 80 (1983), 21-25). Termination signals for transcription are also described in the literature.

The transformation of the host cell with a polynucleotide or vector as described above can be carried out by standard methods, as for instance described in Sambrook and Russell (2001), Molecular Cloning: A Laboratory Manual, CSH Press, Cold Spring Harbor, NY, USA; Methods in Yeast Genetics, A Laboratory Course Manual, Cold Spring Harbor Laboratory Press, 1990. The host cell is cultured in nutrient media meeting the requirements of the particular host cell used, in particular in respect of the pH value, temperature, salt concentration, aeration, antibiotics, vitamins, trace elements etc.

As mentioned above, the recombinant organism and microorganism, preferably the C1-fixing microorganism as defined above, as well as the method according to the present invention is in particular useful for large scale production of isobutene in vivo, in particular for a commercial production. The present invention describes novel means and ways to commercially and cost-effectively produce large quantities of isobutene which has not been obtainable to date. The generated large quantities of isobutene can then be further converted, in a commercial setting, to produce large quantities of, e.g., drop-in gasoline (e.g. isooctane, ETBE, MTBE), jet-fuel, cosmetics, chemicals, such as methacrylic acid, polyisobutene, or butyl rubber. As used herein, "large scale production", "commercial production" and "bioprocessing" of isobutene in a fermentation reactor or in vitro is carried out at a capacity greater than at least 100 liters, and preferably greater than at least 400 liters, or more preferably production of 1,000 liters of scale or more, even more preferably production of 5,000 liters of scale or more. As used herein, "large quantities" specifically excludes trace amounts that may be produced inherently in an organism or microorganism.

For example, in preferred embodiments, the yields for continuous cultures according to methods described herein are at least about 0.2 grams of isobutene per liter per day, at least about 0.3 grams of isobutene per liter per day, at least about 0.4 grams of isobutene per liter per day, at least about 0.5 grams of isobutene per liter per day, at least about 0.6 grams of isobutene per liter per day, at least about 0.7 grams of isobutene per liter per day, at least about 0.8 grams of isobutene per liter per day, or at least about 1.0 grams of isobutene per liter per day. In further embodiments, the yields for continuous cultures according to methods described herein are between about 0.3 grams and about 1.0 grams of isobutene per liter per day, between about 0.4 grams to about 1.0 grams of isobutene per liter per day, and between about 0.5 grams and about 1.0 grams of isobutene per liter per day. In other specific embodiments, the yields for continuous cultures according to methods described herein are between about 0.5 grams to about 0.75 grams of isobutene per liter per day. In other specific embodiments, the yields for continuous cultures according to methods described herein are between about 0.5 grams and about 1.5 grams of isobutene per liter per day.

In further embodiments, the yields for batch cultures according to methods described herein are at least about 2 grams per liter in batch culture, at least about 5 grams per liter in batch culture, at least about 10 grams per liter in batch culture, and at least about 15 grams per liter in batch culture. In some embodiments, the yields for batch cultures according to methods described herein are between about 2 grams and about 5 grams per liter in batch culture, between about 5 grams and about 10 grams per liter in batch culture, and still more preferably between about 10 grams and about 20 grams per liter in batch culture. In other specific embodiments, the yields for batch cultures according to methods described herein are between about 2.4 grams and about 4.8 grams per liter, and preferably between about 4.8 grams and about 9.4 grams per liter in batch culture, and still more preferably between about 9.4 grams and about 18.6 grams per liter in batch culture.

In additional embodiments, the concentration of the CoA in the organism or microorganism used to commercially produce isobutene is at least 0.1%, 0.2%, 0.3%, 0.4%, 0.5%, 0.6%, 0.7%, 0.8% 0.9%, 1.0% or 2.0% as compared to all other molecules found in the microoganism or organism.

As used herein, the term "about" is used to refer to an amount that is approximately, nearly, almost, or in the vicinity of being equal to or is equal to a stated amount, e.g., the state amount plus/minus about 5%, about 4%, about 3%, about 2% or about 1%.

FIG. 1: shows artificial pathways for isobutene production from acetyl-CoA via 3-methylcrotonic acid. Moreover, enzymatic recycling of metabolites which may occur during the pathway are shown in steps Xa, Xb, XI and XII.

FIG. 2: Chemical structure of Coenzyme A (CoA).

FIG. 3: shows the main routes of artificial pathway for isobutene production from acetyl-CoA via 3-methylcrotonyl-CoA and the two possible main routes from 3-methylcrotonyl-CoA into isobutene.

FIG. 4: shows the individual steps of the biosynthesis of Coenzyme A (CoA) from pantothenate.

FIG. 5: shows the key enzymes for the conversions from pantothenate to CoA and their respective names in bacteria, yeast and mammals. This Figure is taken from Martinez et al., Biochemical Society Transactions 42(4) (2014) 1112-1117 and supplemented.

Figure 6:
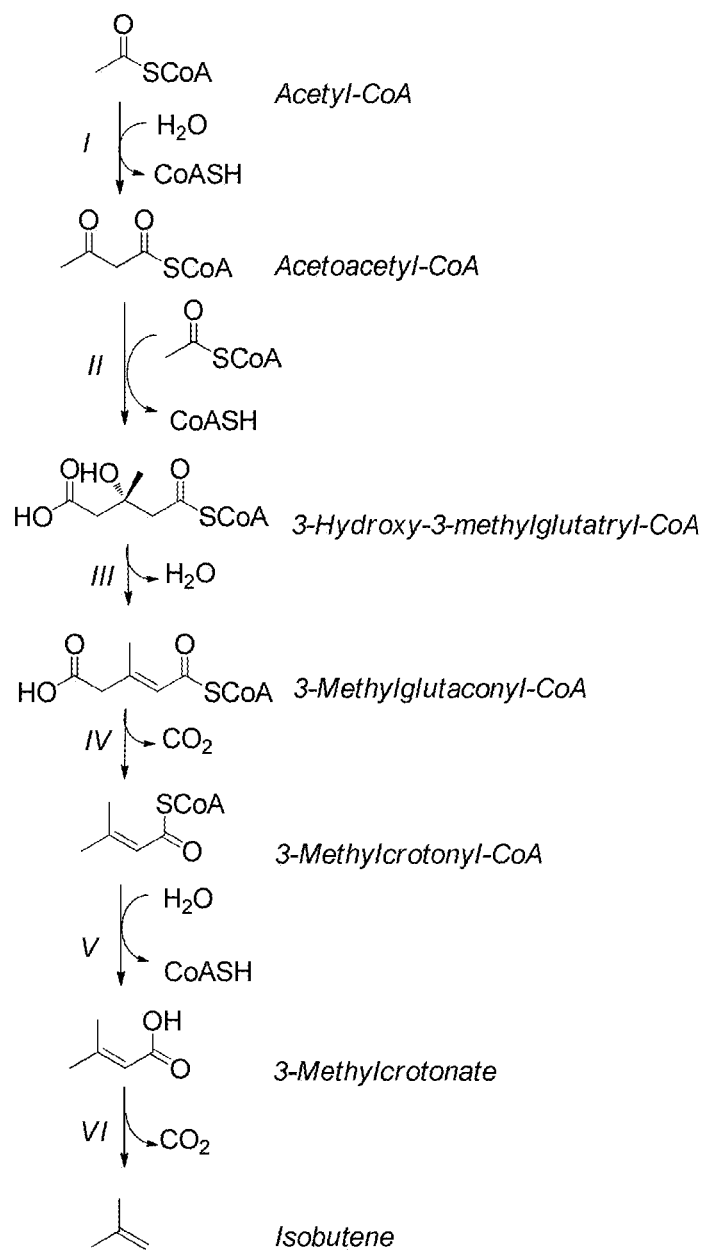

FIG. 6: Metabolic pathway for the biosynthesis of isobutene from acetyl-CoA via 3-methycrotonic acid, implemented in *Escherichia coli*.

Figure 7:
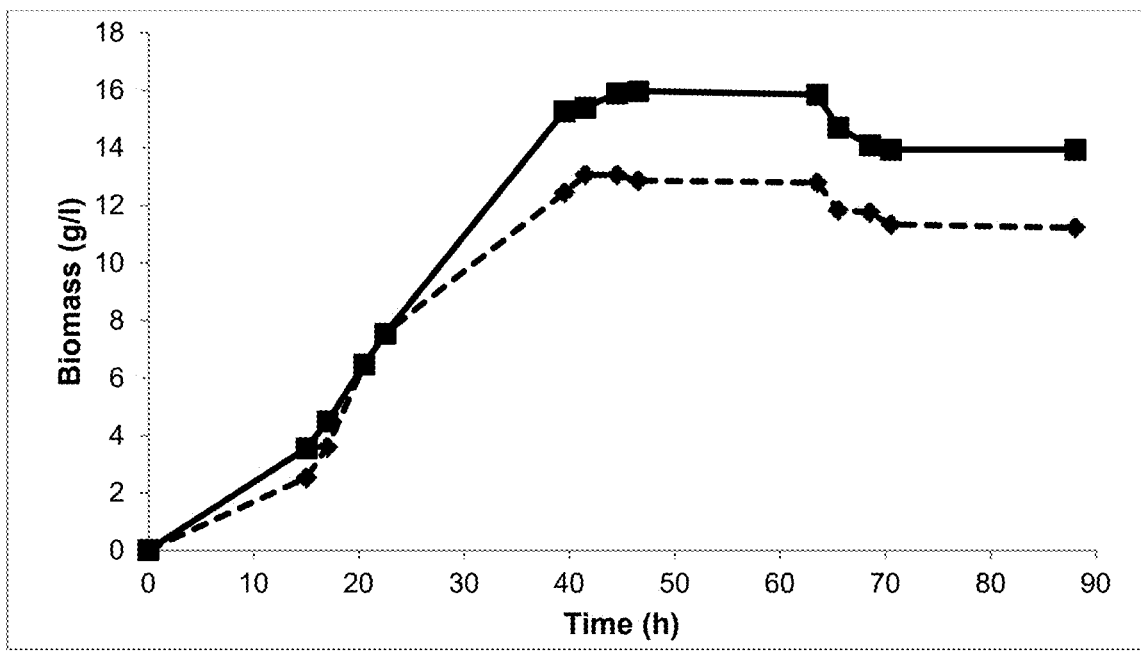

FIG. 7: shows the growth of strains E (– CoaA R106A, dotted line) and F (+ CoaA R106A, solid line). Both strains are described in Example 1.

Figure 8:
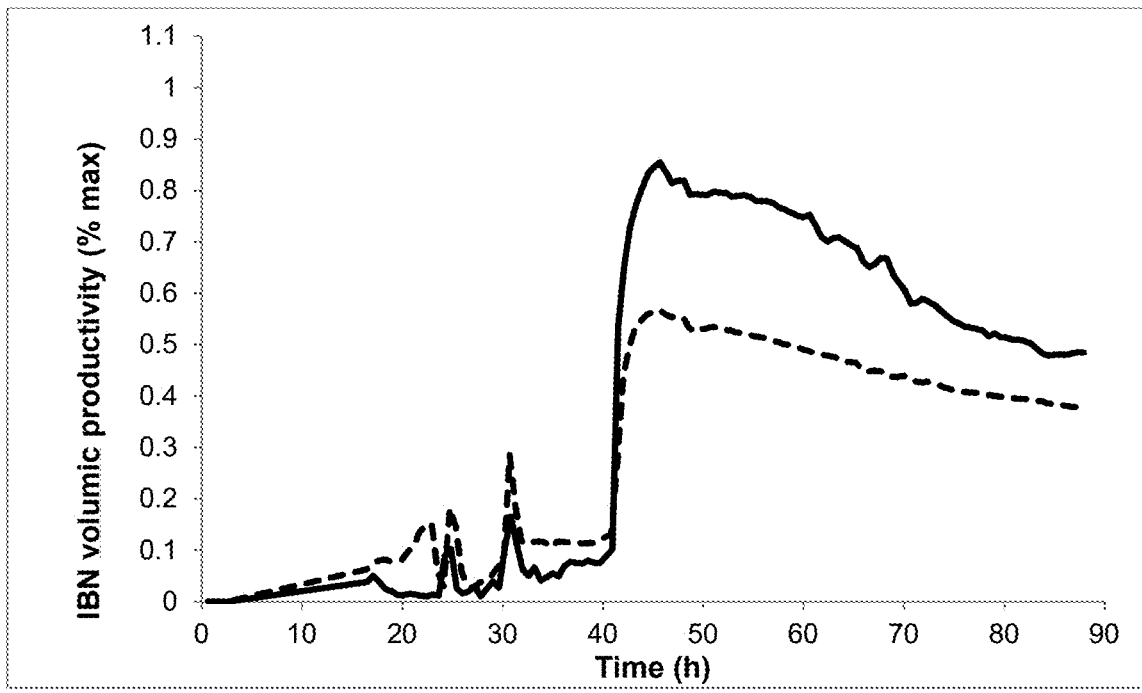

FIG. 8: shows a comparison of IBN volumetric productivities for strains E (– CoaA R106A, dotted line) and F (+ CoaA R106A, solid line). Both strains are described in Example 1. Volumic productivity is the mass of isobutene produced per unit of volume of fermentation broth, and per unit of time.

Figure 9:
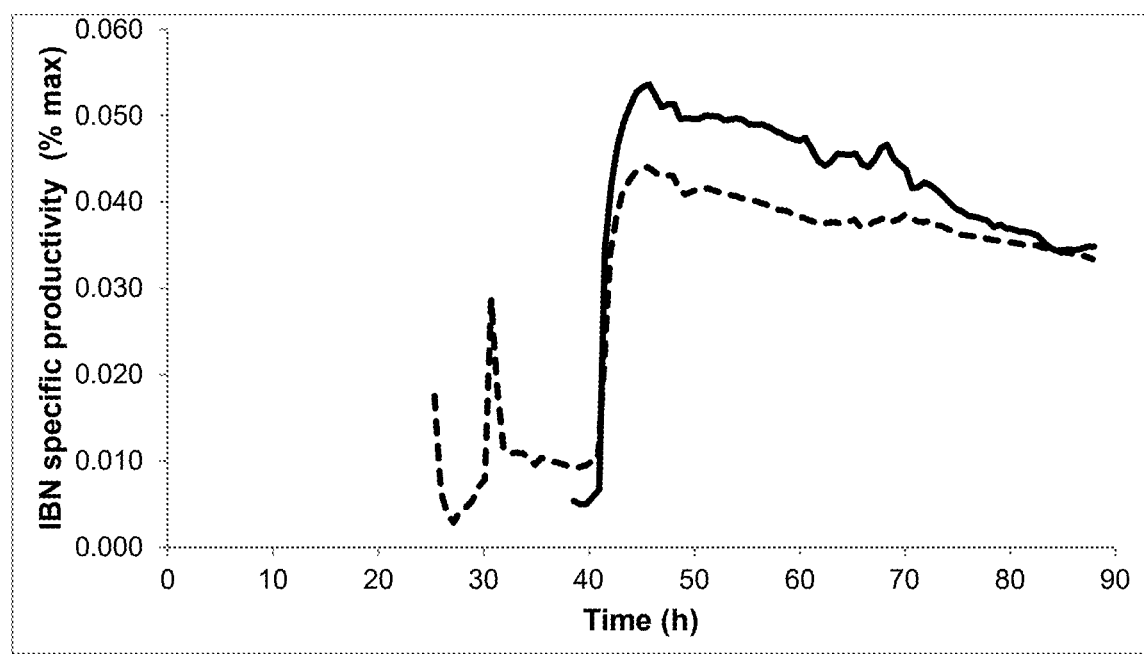

FIG. 9: shows a comparison of IBN specific productivities for strains E (– CoaA R106A, dotted line) and F (+ CoaA R106A, solid line). Both strains are described in Example 1. Specific productivity is the mass of isobutene produced per unit of biomass and per unit of time. Volumes were not measured during the entire growth phase. Therefore, specific productivities are not represented before t=25 h for strain E and t=39 h for strain F.

Figure 10:
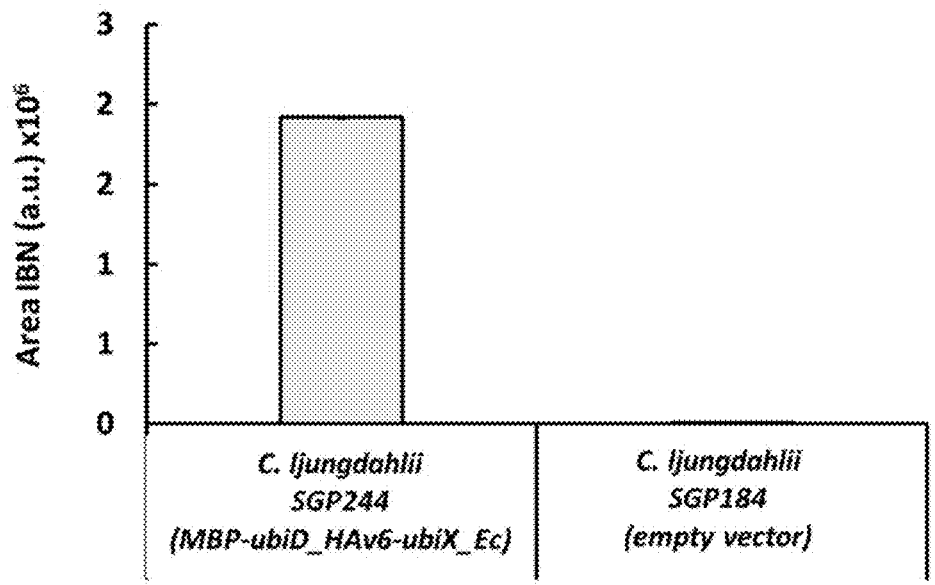

FIG. 10: shows a comparison of isobutene production at t=72h for *C. ljungdahlii* strain SGP244 (MBP-ubiD_HAv6-ubiX-Ec) containing 3-methylcrotonic acid decarboxylase and prenyl transferase (left bar), and *C. ljungdahlii* strain SGP184 (empty vector) harboring the corresponding empty vector (right bar). Both strains are described in Example 5.

Figure 11:
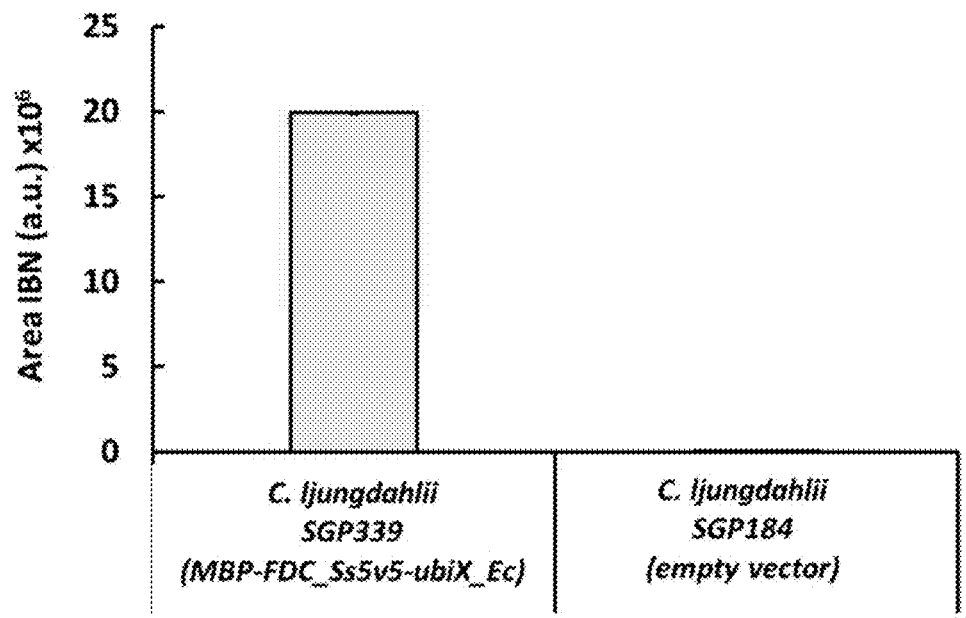

FIG. 11: shows a comparison of isobutene production at t=72h for *C. ljungdahlii* strain SGP339 (MBP-FDC Ss5v5-ubiX EC) containing the 3-methylcrotonic acid decarboxylase and prenyl transferase (left bar) and *C. ljungdahlii* strain SGP184 (empty vector) harboring the corresponding empty vector (right bar). Both strains are described in Example 6.

Figure 12:
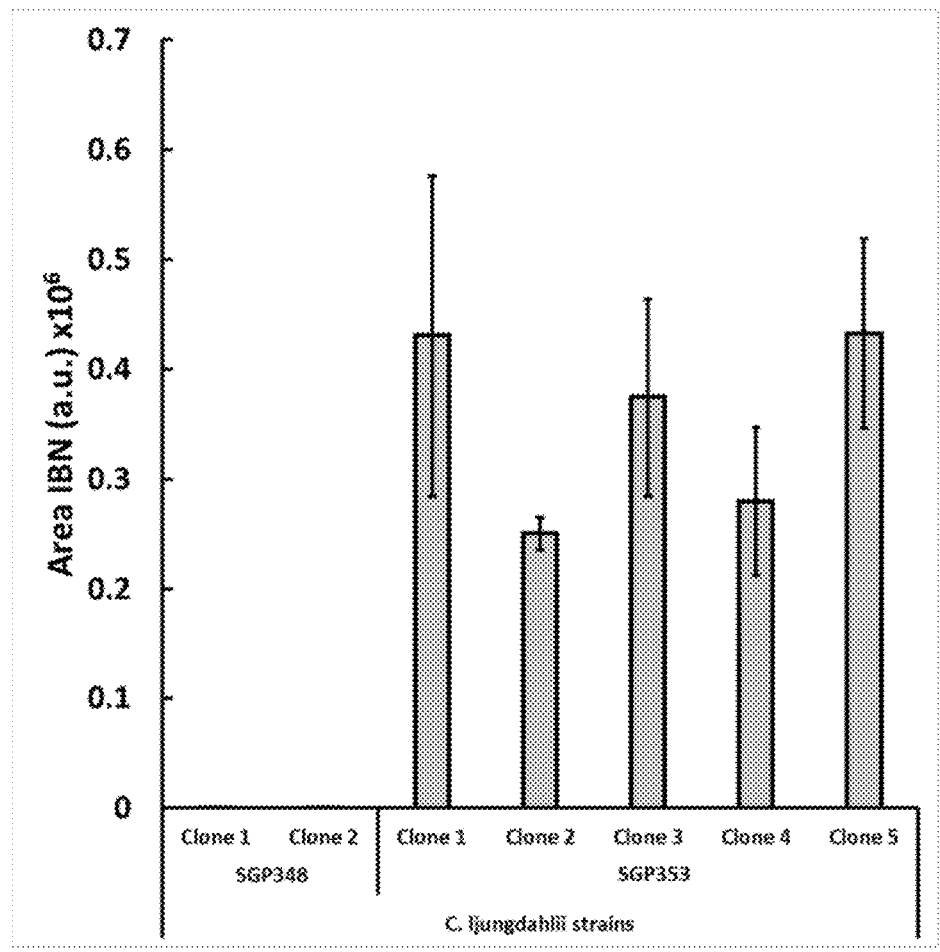

FIG. 12: shows a comparison of isobutene production after 6 days for *C. ljungdahlii* strain SGP353 containing the isobutene pathway listed in Table F (SGP353 clones 1-5, right), and *C. ljungdahlii* strain SGP348 harboring the corresponding empty vector (SGP clones 1 & 2, left). Both strains are described in Example 7.

Figure 13:
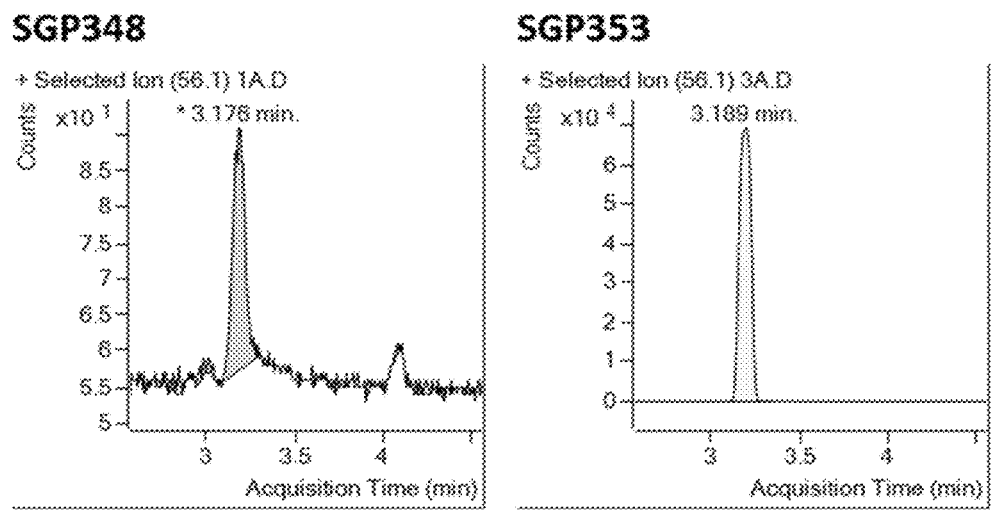

FIG. 13: shows a comparison of the GC-MS signals for the amount of isobutene obtained after 6 days from *C. ljungdahlii* strain SGP353 containing the isobutene pathway listed in Table F (right panel) and the strain containing the isobutene pathway listed in Table F, and *C. ljungdahlii* strain SGP348harboring the corresponding empty vector (left panel). Both strains are described in Example 7.

In this specification, a number of documents including patent applications are cited. The disclosure of these documents, while not considered relevant for the patentability of this invention, is herewith incorporated by reference in its entirety. More specifically, all referenced documents are incorporated by reference to the same extent as if each individual document was specifically and individually indicated to be incorporated by reference.

The invention will now be described by reference to the following examples which are merely illustrative and are not to be construed as a limitation of the scope of the present invention.

EXAMPLES

Example 1: Construction of a New *E. coli* Chassis for the Production of Isobutene Like most organisms, *E. coli* converts glucose into acetyl-CoA. A modified *E. coli* chassis has previously been described wherein the yield and flux of acetyl-CoA has been increased in order to optimize the yield of acetyl-CoA production (WO2013/007786). Therein, a bacterial chassis, strain A, was constructed with the following genotype:

MG1655 ΔptsHI ⇌ zwf_edd_eda ⇌ pfkA ⇌ pfkB

Plasmid-based overexpression of a PKT gene from phosphoketolase YP 003354041.1 from *Lactococcus lactis* in strain A resulted in strain B. This strain B is characterized in that the central carbon metabolism is "rewired", wherein a new, phosphoketolase-based carbon catabolic pathway repaces the inactivated Embden-Meyerhoff-Parnas pathway (EMPP), the pentose phosphate pathway (PPP), and the Entner Doudoroff pathway (EDP). Upon introduction of an acetone pathway into strain B, superior acetone yields were observed, as compared with wild type MG1655 strain expressing the same acetone pathway.

In order to construct a strain having a PKT pathway and being capable of growing robustly on sucrose as the carbon source, strain A was further engineered as described below.

A PKT gene was introduced into the chromosome of strain A at the kdgk locus (kdgK:: P1_RBST7_pkt). The resulting strain had the following genotype:

MG1655 ⇌ ptsHI ⇌ zwf_edd_eda ⇌ fkA ⇌ pfkB kdgK:: P1_RBST7_pkt

This strain was passaged for several months on minimal medium supplemented with glucose as carbon source, while clones or populations were continuously selected for having the highest growth rate, until a doubling time of less than 5 hours was reached.

In order to allow for efficient sucrose consumption, the CscA, CscB and CscK encoding genes were inserted into the chromosome within the zwf locus (Δzwf:: P1_cscA_cscB_cscK_FRT). CscA (Uniprot O86076; NCBI Reference Sequence WP_000194515.1), CscB (Uniprot Q7WZY9; NCBI Reference Sequence WP_001197025.1) and CscK (Uniprot Q7WZY7; NCBI Reference Sequence WP_001274885.1), coding for a sucrose hydrolase, a non-PTS sucrose permease, and a fructokinase, respectively, allow for the uptake of sucrose, its hydrolysis into glucose and fructose, and for the phosphorylation of fructose into fructose-6-phosphate, resulting in the efficient metabolization of fructose (for review, see Biotechnology Advances 32 (2014) 905-919). These modifications resulted in a strain having a PKT pathway, and capable of efficient growth on sucrose.

In order to further improve the sugar consumption, the glk (glucokinase gene, Uniprot P0A6V8; NCBI Reference Sequence: NP_416889.1) gene from E. coli was overexpressed by inserting an additional copy, under the control of the PN25 promoter at the pfkA locus.

The resulting strain is referred to as strain C hereafter.

Example 2: Construction of E. coli Strains for the Production of Isobutene from Acetyl-CoA This working example shows the production of isobutene by recombinant E. coli strains, expressing the genes: (i) constituting isobutene pathway. (ii) encoding pantothenate kinase, CoaA.

The enzymes used in this study to convert acetyl-CoA into isobutene (IBN) via 3-methylcrotonic acid (FIG. 6) are listed in Table A. The source of the pantothenate kinase was the coaA gene from E. coli MG1655 strain (Uniprot Accession Number: P0A6I3).

Expression of Isobutene Biosynthetic Pathway in E. coli

Strain C as described in Example 1 was used as a host microorganism.

All the listed genes were codon optimized for the expression in E. coli and synthesized either by GeneArt® (Thermofisher) or by Twist Bioscience, with the exception of the genes YdiI, UbiX and CoaA. The last ones were directly amplified from the genomic DNA of E. coli MG1655. The mutant of the CoaA (R106A) was then constructed by site-directed mutagenesis. The genes thIA and AibA/B were integrated in the bacterial chromosome into the ssrS and mgsA locus, respectively, resulting in strain D.

An expression vector containing the origin of replication pSC and a tetracycline resistance marker was used for the expression of the genes MvaS, ECH, YdiI and UbiD. The constructed vector was named pGB12762.

The modified version of pUC18 (New England Biolabs) containing a modified Multiple Cloning Site (pUC18 MCS) (WO 2013/007786) and an ampicilline resistance gene was used for the overexpression of the UbiX and YdiI genes (plasmid pGB6546) or for a combination of the UbiX, YdiI and CoaA (R106A) genes (plasmid pGB13095).

The different combinations of the plasmids described above were transformed by electroporation into strain D. The strains produced in this way, strains E and F, are summarized in Table B.

TABLE B

| Strain | Vectors |
| --- | --- |
| Strain E, expressing the whole IBN metabolic pathway, without overexpression of CoaA (R106A) on plasmid | pGB12762 + pGB6546 |
| Strain F, expressing the whole IBN metabolic pathway + CoaA (R106A) | pGB12762 + pGB13095 |

TABLE A

| Step | Enzyme | Gene | NCBI reference | Uniprot Accession number |
| --- | --- | --- | --- | --- |
| I | Acetyl-CoA transferase from Clostridium acetobulyticum | thIA | WP_010966157.1 | P45359 |
| II | Hydroxymethylglutaryl-CoA synthase from Enterococcus faecalis | mvaS | WP_002357756.1 | Q9FD71 |
| III | Enoyl-CoA hydratase/isomerase from Pseudomonas sp. UW4 (ECH) | PputUW4_01474 | WP_015094072.1 | K9NHK2 |
| IV | Glutaconate CoA-transferase from Myxococcus xanthus (AibA/B) | MXAN_4264 MXAN_4265 | WP_011554268.1 WP_011554267.1 | Q1D4I3 Q1D4I4 |
| V | 1,4-Dihydroxy-2-naphtoyl-CoA hydrolase from Escherichia coli | YdiI, menI | NP_416201.1 | P77781 |
| VI | Variant of UbiD-like decarboxylase decarboxylase from Streptomyces sp.769 (UbiD) (A241D-G402A-S403C-C404L-P406A-L448W) | GZL_07100 | | A0A0A8EV26 |
| | Flavin prenyl transferase from Escherichia coli (UbiX) | ubiX | WP_000825700.1 | P0AG03 |

Example 3: Growth of E. coli Strains and Production of Isobutene from Acetyl-CoA Pre-Culture Conditions The transformed cells were then plated on LB plates supplied with ampicillin (100 µg/ml) and tetracycline (10 µg/ml). Plates were incubated for 2 days at 30° C. Isolated colonies were used to inoculate LB medium supplemented with ampicillin, tetracycline and 50 mM glutamate. These pre-cultures were grown at 30° C. to reach an optical density of 0.6.

Growth Conditions

The fermentation was performed in a 1 L bioreactor with pH and temperature control (Multifors 2, Infors HT). Cells of the pre-cultures were used to inoculate 500 ml of the fermentation medium (Table C), complemented with ampicillin (100 µg/ml), tetracycline (10 µg/ml), thiamine (0.6 mM), glutamate (50 mM), pantothenate (5 mM), sucrose (1 g/l) and glycerol (5 g/1), to achieve an initial optical density ($OD_{600}$) of 0.05. During the growth phase temperature (T=32° C.), pH=6.5, and $pO_2$=5% were maintained constant. The feed of sucrose was maintained at 0.1 g/g DCW/h. The pulses addition of 5 g/L of yeast extract were done at 16, 24 and 30 h.

At the end of the growth phase (t=40 h) the cell densities were lower with strain E than with strain F, in the range of 13 g/l for strain E, and 15.5 g/l for strain F (FIG. 7)

IBN Production Phase

During this phase temperature, T=34° C., pH 6.5, and $pO_2$=5% were maintained constant. Sucrose feed was started at 0.30 g sucrose/g DCW/h and then adjusted according to the strain consumption. Glycerol concentration was maintained superior to 2 g/l.

The isobutene (IBN) production of strains E and F was analyzed continuously using a Gas Chromatograph 7890A (Agilent Technology), equipped with a Flame Ionization Detector (FID) to measure IBN. Volatile organic compounds were chromatographically separated on PoraBond Q column (25 m×0.25 mm×0.35 mm) (Agilent) and IBN was quantified using standard gas (Sigma).

FIG. 8 shows a comparison of the IBN volumic productivities (mass of IBN produced per unit of volume of fermentation broth and per unit of time) for strains E and F during the fermentation run. Volumic productivity (mass of IBN produced per unit of volume of fermentation broth and per unit of time) was significantly higher for strain F than for strain E over the entire production phase, with maximal volumic productivity for strain E being in the range of 66% of maximal volumic productivity achieved by strain F.

In addition, this higher volumic productivity was not due solely to the higher biomass concentration of strain F, but also to a higher production per unit of biomass. As shown in FIG. 9, specific productivity (mass of isobutene produced per unit of biomass and per unit of time) was higher with strain F as compared to reference strain E for most of the production phase (more precisely, from t=42 h through the end of the run). Maximal IBN specific productivity of strain E was in the range of 82% of the maximal specific productivity achieved by strain F.

TABLE C

Fermentation medium composition (derived from ZYM-5052 medium (Studier FW, Prot. Exp. Pur. 41, (2005), 207-234)).

| Products | Final concentration in bioreactor |
|---|---|
| Yeast Extract | 5 g/L |
| Tryptone | 10 g/L |
| Sodium sulfate, $Na_2SO_4$ | 0.71 g/L |
| Ammonium sulfate, $(NH_4)_2SO_4$ | 1.34 g/L |
| Potassium phosphate monobasic, $KH_2PO_4$ | 3.4 g/L |
| Sodium phosphate dibasic, $Na_2HPO_4$ | 4.45 g/L |
| Magnesium sulfate, $MgSO_4$ | 4 mM |
| 5000X Trace elements solution | 1X |
| Antifoam Struktol ® J 673 A (Struktol) | 80 µl/L |

Example 4: Quantification of Coenzyme A and its Thioester Intermediates

Extraction

120 µL of bacterial cultures is directly sampled from a fermenter and filtered through a membrane filter under vacuum. Immediately after filtration, the filter is put into an aluminum foil and immersed into liquid nitrogen in order to stop all metabolic reactions. Then, the aluminum foil containing the filter is stored at −80° C. until extraction. Intracellular metabolites are extracted (from the membrane filter) with 2 mL of a cold $MeOH/H_2O$ (80/20) mixture during 15 min at −80° C. in a Falcon tube. After this extraction time, the Falcon tube is centrifuged at −9° C. for 20 min. Then, the supernatants are removed and transferred to a new tube. A second extraction of the membrane filter is performed with 1 mL with the cold $MeOH/H_2O$ mixture following the same process as just described (except that both extraction time at −80° C. and centrifugation step are reduced to 5 min). The combined supernatant (ca. 3 mL) is filtered through a 0.2 µm syringe filter and 2.4 mL are evaporated to dryness by a Speed-Vac concentrator. Then, the dry extract is re-dissolved with 120 µL of $ACN/H_2O$ (50/50, v/v), filtered again through a 0.2 µm syringe filter and transferred into a HPLC vial for LC-MS analysis.

LC-MS Analysis

Analysis are carried out on a UHPLC system coupled to a Q-Exactive mass spectrometer (ThermoFisher Scientific, Massachusetts, USA) in negative ionization mode. For the LC part, a BEH amide column (1.7 µm, 2.1×100 mm, Waters) conditioned at 25° C. is used. The flow rate is set at 0.5 mL/min and 2 µL of samples are injected. The mobile phase consists of a binary gradient (A: ammonium formate (10 mM)+0.1% ammonium hydroxide and B: acetonitrile) starting with 95% B during 1.5 min then, decreasing to 55% B until 8.5 min and staying at 55% B during 2 min and then, go back to the initial conditions. The total analysis time is 19 min. At the mass level, analyzes are performed in Full MS+ddMS$^2$ mode in negative ionization mode. The set of ions between 80<m/z<1200 Da are considered and all ions with an intensity greater than 1e5 are fragmented with a collision energy of 35 eV in order to obtain additional structural information, if needed. Calibration curves of compounds of interest are recorded under the same LC/MS conditions. Data analysis is performed with Xcalibur v3.0.63 software (ThermoFisher Scientific). LC-MS characteristics of compounds of interest are summarized in the Table D.

TABLE D

LC-MS characteristics of Coenzyme A and its thioesters

| Compound[1] | Molecular formula | Molecular weight (g/mol) | RT (min) | m/z observed |
|---|---|---|---|---|
| CoA | $C_{21}H_{36}N_7O_{16}P_3S$ | 767.535 | 6.96 | 766.1096 $[M - H]^-$; 382.5509 $[M - H]^{2+}$ |
| AcCoA | $C_{23}H_{38}N_7O_{17}P_3S$ | 809.570 | 6.83 | 808.1204 $[M - H]^-$; 403.5561 $[M - H]^{2+}$ |
| AcAcCoA | $C_{25}H_{40}N_7O_{18}P_3S$ | 851.607 | 6.78 | 850.1310 $[M - H]^-$; 424.5618 $[M - H]^{2+}$ |
| HMG-CoA | $C_{27}H_{44}N_7O_{20}P_3S$ | 911.659 | 7.27 | 910.1526 $[M - H]^-$; 454.5722 $[M - H]^{2+}$ |
| MC-CoA | $C_{26}H_{42}N_7O_{17}P_3S$ | 849.635 | 6.53 | 848.1515 $[M - H]^-$; 423.5719 $[M - H]^{2+}$ |

[1]CoACoenzyme A; AcCoA: Acetyl-Coenzyme A; AcAcCoA: Acetoacetyl-Coenzyme A; HMG-CoA: 3-Hydroxy-3-Methylglutaryl-Coenzyme A; MC-CoA: 3-Methylcrotonyl-Coenzyme A HPLC Analysis Two LC methods are available to detect and quantify Coenzyme A derivative compounds.

The first LC method ("method 1") is performed by a HPLC 1260 system coupled to a Multiple Wavelength Detector (MWD) (Agilent, Santa Clara, USA). The separation is carried out by a Zorbax Eclipse coupled to a C18 column (3.5 μm, 4.6×100 mm, Agilent) conditioned at 30° C. The mobile phase consists of an isocratic elution with acetonitrile (5%) and a phosphate buffer (100 mM) at pH5 (95%) during 10 min. The flow rate is set at 1.5 mL/min and 5 μL of samples are injected.

The second method ("method 2") is performed with a HPLC 1260 system coupled to a Diode Array Detector (DAD) (Agilent, Santa Clara, USA). A ZorbaxsbAq column (5 μm, 4.6×250 mm, Agilent) conditioned at 30° C. is used to separate metabolites. 5 μL of samples is injected. The flow rate is set at 1.5 mL/min. The mobile phase consists of a binary gradient (A: Acetonitrile; and B: H2SO4 8.4 mM) starting with 100% B and then, decreasing to 30% B until 8 min and staying at 30% B during 1 min. During this 1 min at 30% B, the flow rate is increased to 2 mL/min. After 9 min, the binary gradient goes back to the initial conditions (i.e. 100% B and a flow rate at 1.5 mL/min) in 2 min and stays at 100% B during 3 min. The total run time is 14 min.

In both methods, the detection of metabolites of interest is performed at λ260 nm and calibrations curves of pure compounds are recorded under the respective LC conditions used. The ChemStation software (Agilent) is used for data analysis.

TABLE E

Retention time of Coenzyme A and its thioesters in HPLC-based quantification method

| Compound[1] | RT (min) |
|---|---|
| Method 1 | |
| CoA | 1.8 |
| AcCoA | 4.6 |
| AcAcCoA | 5.0 |
| HMG-CoA | 2.6 |
| MC-CoA | |
| Method 2 | |
| CoA | 3.9 |
| AcCoA | 4.2 |
| AcAcCoA | 4.2 |
| HMG-CoA | 4.2 |
| MC-CoA | 5.2 |

[1]CoA: Coenzyme A; AcCoA: Acetyl-Coenzyme A; AcAcCoA: Acetoacetyl-Coenzyme A; HMG-CoA: 3-Hydroxy-3-Methylglutaryl-Coenzyme A; MC-CoA: 3-Methylcrotonyl-Coenzyme A Example 5: Conversion of 3-methylcrotonic Acid into Isobutene by Recombinant *C. ljungdahlii* Expressing ubiDHav6

This working example shows the production of isobutene from 3-methylcrotonic acid by recombinant *C. jungdahlii* expressing the genes encoding (i) 3-methylcrotonic acid decarboxylase ubiD HAv6 and (ii) prenyl transferase ubiX. The 3-methylcrotonic acid decarboxylase converts 3-methylcrotonic acid to isobutene and is derived from *Hypocrea atroviridis* (*Trichoderma atroviride*) and further engineered for efficient IBN production. The prenyl transferase converts FMN to prenyl-FMN and thus provides the cofactor for the prenate decarboxylase. The source of this enzyme is *E. coli* MG1655.

Expression of 3-methylcrotonic Acid Decarboxylase and Prenyl Transferase in *C. ljungdahlii* DSM 13528

The genes were codon optimized for expression in *C. jungdahlii* and synthesized by Genscript. An expression vector containing the pCB102 replicon for maintenance in *C. Ijungdahlii* and an erythromycin resistance gene for selection was used for expression of the genes. The expression was driven by the promoter of thl gene of *C. acetobutylicum* ATCC 824 (in combination with a ribosome binding site from Bacteriophage T7) and terminated by rrnB Terminator from *E. coli* MG1655.

Culture Conditions

2YT Medium supplemented with 20 g/L fructose and 5 μg/mL clarithromycin was inoculated from cryo cultures of the transformed cells and pressurized with 2 bars of $CO_2$. The cells were grown until mid-exponential phase. The pH of the cultures was regulated to maintain the pH between 5 and 6. The cultivation was done in serum bottles at 150 rpm and 37° C. Cells were harvested by centrifugation and either stored at −80° C. or directly resuspended at an OD600 of 13 in PETC 1754 medium supplemented with 20 g/L of fructose. The cells were grown in glass vials for 72 h at 150 rpm and 37° C. The amount of IBN was determined by analyzing the Headspace via GC-MS.

The strain containing the 3-methylcrotonic acid decarboxylase and prenyl transferase (SGP244) was compared to a strain harboring the corresponding empty vector (SGP184) (FIG. 10). SGP244 showed a 201-fold increase in isobutene accumulation compared to SGP 184.

Example 6: Conversion of 3-methylcrotonic Acid into Isobutene by Recombinant *C. Ijungdahlii* Expressing FDCSs5v2

This working example shows the production of isobutene from 3-methylcrotonic acid by recombinant *C. jungdahlii* expressing the genes encoding (i) 3-methylcrotonic acid decarboxylase FDCSs5v2 and (ii) prenyl transferase ubiX. The 3-methylcrotonic acid decarboxylase converts 3-methylcrotonic acid to isobutene and is derived from *Streptomyces* sp. and further engineered for efficient IBN production. The prenyl transferase converts FMN to prenyl-FMN and thus provides the cofactor for the prenate decarboxylase. The source of this enzyme is *E. coli* MG1655.

Expression of 3-methylcrotonic Acid Decarboxylase and Prenyl Transferase in *C. ljungdahlii* DSM 13528

The genes were codon optimized for expression in *C. Ijungdahlii* and synthesized by Genscript. An expression vector containing the pCB102 replicon for maintenance in *C. ljungdahlii* and an erythromycin resistance gene for selection was used for expression of the genes. The expression was driven by the promoter of thl gene of *C. acetobutylicum* ATCC 824 (in combination with a ribosome binding site from Bacteriophage T7) and terminated by rrnB Terminator from *E. coli* MG1655.

Culture Conditions

2YT Medium supplemented with 20 g/L fructose and 5 µg/mL clarithromycin was inoculated from cryo cultures of the transformed cells and pressurized with 2 bars of $CO_2$. The cells were grown until mid-exponential phase. The pH of the cultures was regulated to maintain the pH between 5 and 6. The cultivation was done in serum bottles at 150 rpm and 37° C. Cells were harvested by centrifugation and either stored at −80° C. or directly resuspended at an OD600 of 13 in PETC 1754 medium supplemented with 20 g/L of fructose. The cells were grown in glass vials for 72 h at 150 rpm and 37° C. The amount of IBN was determined by analyzing the Headspace via GC-MS.

The strain containing the 3-methylcrotonic acid decarboxylase and prenyl transferase (SGP 339) was compared to a strain harboring the corresponding empty vector (SGP184) (FIG. 11). SGP339 showed a 2093-fold increase in isobutene accumulation compared to SGP 184.

Example 7: Construction of *C. ljungdahlii* Strains for the Production of Isobutene from a $CO/CO_2/H_2$ Gas Mixture Via Acetyl-CoA This working example shows the production of isobutene from C1 gas mixtures by recombinant *C. jungdahlii* expressing the genes constituting the isobutene pathway. The enzymes used in this study to convert acetyl-CoA into isobutene (IBN) via 3-methylcrotonic acid (FIG. 6) are listed in Table F.

TABLE F

| Step | Enzyme | Gene | NCBI reference | Uniprot Accession number |
|---|---|---|---|---|
| I | Acetyl-CoA transferase from *Clostridium kluyverii* | thlA3 | EDK35683.1 | A5N3I7 |
| II | Hydroxymethylglutaryl-CoA synthase from *Enterococcus faecalis* | mvaS | WP_002357756.1 | Q9FD71 |
| III | Enoyl-CoA hydratase/isomerase from *Pseudomonas* sp. UW4 (ECH) | PputUW4_01474 | WP_015094072.1 | K9NHK2 |
| IV | Glutaconate CoA-transferase from *Myxococcus xanthus* (AibA/B) | MXAN_4264 MXAN_4265 | WP_011554268.1 WP_011554267.1 | Q1D4I3 Q1D4I4 |
| V | Acyl-CoA thioesterase | tesB | AAC73555.1 | P0AGG2 |
| VI | Variant of UbiD-like decarboxylase from *Hypocrea atroviridis* (*Trichoderma atroviride*) (UbiD) with N-terminal MBP fusion | FDC1 | XP_013946967.1 | G9NLP8 |
|  | Flavin prenyl transferase from *Escherichia coli* (UbiX) | ubiX | WP_000825700.1 | P0AG03 |

Expression of Isobutene Biosynthetic Pathway in *C. Ijungdahlii* DSM 13528

The genes were codon optimized for expression in *C. Ijungdahlii* and synthesized by Genscript or IDT. An expression vector containing the pCB102 replicon for maintenance in *C. Ijungdahlii* and an erythromycin resistance gene for selection was used for expression of the genes which were divided into two operons. The expression of both operons was driven by the promoter of thl gene of *C. acetobutylicum* ATCC 824 and terminated by rrnB Terminator from *E. coli* MG1655.

Culture Conditions

For the preculture PETC1754 medium supplemented with 20 g/L fructose and 5 µg/mL clarithromycin was inoculated from cryo cultures of the transformed cells and pressurized with 2 bars of $CO_2$. The cells were grown over night in serum bottles at 150 rpm and 37° C. For the main culture PETC1754 medium supplemented with 5 µg/mL clarithromycin was inoculated from the preculture and pressurized with 2 bars of a gas mixture containing 55% CO, 25% H2 and 20% $CO_2$ (all vol %). The pH of the cultures was regulated to maintain the pH between 5 and 6 and the gas was refilled daily to maintain a pressure of 2 bars. The cultivation was done in serum bottles at 150 rpm and 37° C. for 6 days. The amount of IBN was determined by analyzing the Headspace via GC-MS.

The strain containing the isobutene pathway (SGP353) was compared to a strain harboring the corresponding empty vector (SGP348) (FIG. 12). While SGP353 produced a significant amount of isobutene, only traces could be found in SGP348 (FIG. 13). Thus, by introducing the isobutene pathway in *C. ljungdahlii* an 1971-fold increased signal was obtained for Isobutene compared to a strain without the isobutene pathway.

---

The invention claimed is:

1. A recombinant organism or microorganism which is capable of enzymatically converting acetyl-CoA into isobutene,
   (A) wherein in said organism or microorganism:
      (i) acetyl-CoA is enzymatically converted into acetoacetyl-CoA by one of, an acetyl-CoA carboxylase and an acetoacetyl-CoA synthase, or an acetyl-CoA acetyltransferase, optionally wherein said acetyl-CoA acetyltransferase is an acetyl-CoA transferase,
      (ii) acetoacetyl-CoA is enzymatically converted into 3-hydroxy-3-methylglutaryl-CoA by a 3-hydroxy-3-methylglutaryl-CoA synthase (HMG-CoA synthase),
      (iii) 3-hydroxy-3-methylglutaryl-CoA is enzymatically converted into 3-methylglutaconyl-CoA by one of a 3-methylglutaconyl-coenzyme A hydratase, a 3-hydroxy-3-methylglutaryl-coenzyme A dehydratase, a 3-hydroxyacyl-CoA dehydratase, or an enoyl-CoA hydratase,
      (iv) 3-methylglutaconyl-CoA is enzymatically converted into 3-methylcrotonyl-CoA by one of a methylcrotonyl-CoA carboxylase, a geranoyl-CoA carboxylase, a 3-methylglutaconyl-CoA decarboxylase, or a glutaconate CoA-transferase,
      (v) wherein said 3-methylcrotonyl-CoA is converted into isobutene by enzymatically converting said 3-methylcrotonyl-CoA into 3-methylcrotonic acid by one of a direct conversion by a CoA transferase or a thioester hydrolase, optionally wherein said thioester hydrolase is a 1.4-dihydroxy-2-naphthoyl CoA hydrolase or an acyl-CoA hydrolase, or a two-step conversion comprising conversion of said 3-methylcrotonyl-CoA into 3-methylcrotonyl-phosphate by a phosphate butyryltransferase or a phosphate acetyltransferase followed by conversion of said 3-methylcrotonyl-phosphate into said 3-methylcrotonic acid by a phosphotransferase, optionally wherein said phosphotransferase is a butyrate kinase, a branched-chain-fatty-acid kinase, a propionate kinase, or an acetate kinase, and said 3-methylcrotonic acid is enzymatically converted into said isobutene by a flavin mononucleotide (FMN)-dependent 3-methylcrotonic acid decarboxylase associated with an FMN prenyl transferase, optionally wherein said FMN-dependent 3-methylcrotonic acid decarboxylase is a 3-polyprenyl-4-hydroxybenzoate decarboxylase (UbiD) comprising the amino acid sequence of SEQ ID NO:25 or an UbiD-like decarboxylase comprising the amino acid sequence shown of SEQ ID NO:26 and said FMN prenyl transferase is a prenyl transferase ubiX (3-octaprenyl-4-hydroxybenzoate carboxy-lyase):
   and
   (B) wherein said recombinant organism or microorganism recombinantly expresses a pantothenate uptake transporter and has an increased pool of coenzyme A (CoA) over the corresponding organism or microorganism from which it is derived, due to an increased uptake of pantothenate due to a said recombinant expression of a said pantothenate uptake transporter.

2. The recombinant organism or microorganism of claim 1, further wherein said organism or microorganism:
   a) has phosphoketolase activity;
   b) (i) has a diminished or inactivated Embden-Meyerhof-Parnas pathway (EMPP) by inactivation of the gene(s) encoding phosphofructokinase or by reducing phosphofructokinase activity as compared to a non-modified microorganism, or
      (ii) does not possess phosphofructokinase activity;
   and
   c) (i) has a diminished or inactivated oxidative branch of the pentose phosphate pathway (PPP) by inactivation of the gene(s) encoding glucose-6-phosphate dehydrogenase or by reducing glucose-6-phosphate dehydrogenase activity as compared to a non-modified microorganism, or
      (ii) does not possessing glucose-6-phosphate dehydrogenase activity.

3. The recombinant organism or microorganism of claim 2, further wherein said organism or microorganism:
   d) has fructose-1,6-bisphosphate phosphatase activity.

4. The recombinant organism or microorganism of claim 2, wherein the EMPP is further diminished or inactivated by inactivation of the gene(s) encoding glyceraldehyde 3-phosphate dehydrogenase or by reducing glyceraldehyde 3-phosphate dehydrogenase activity as compared to a non-modified microorganism.

5. The recombinant organism or microorganism of claim 2 which has been genetically modified to have an increased phosphoketolase activity over the phosphoketolase activity of the corresponding non-modified organism or microorganism from which it is derived by overexpressing the phosphoketolase.

6. The recombinant organism or microorganism of claim 2, wherein said microorganism is a fungus.

7. The recombinant organism or microorganism of claim 2, wherein said microorganism is a bacterium.

8. The recombinant organism or microorganism of claim 7, wherein the gene(s) encoding the PEP-dependent PTS transporter has/have been inactivated.

* * * * *